(12) United States Patent
Zionpour et al.

(10) Patent No.: US 11,475,215 B2
(45) Date of Patent: Oct. 18, 2022

(54) DIGITAL PROCESSING SYSTEMS AND METHODS FOR DYNAMIC WORK DOCUMENT UPDATES USING EMBEDDED IN-LINE LINKS IN COLLABORATIVE WORK SYSTEMS

(71) Applicant: MONDAY.COM LTD., Tel Aviv (IL)

(72) Inventors: Ron Zionpour, Kfar Sirkin (IL); Tal Haramati, Tel Aviv (IL); Roy Mann, Tel Aviv (IL)

(73) Assignee: Monday.com Ltd., Tel Aviv (IL)

( * ) Notice: Subject to any disclaimer, the term of this patent is extended or adjusted under 35 U.S.C. 154(b) by 0 days.

(21) Appl. No.: 17/565,526

(22) Filed: Dec. 30, 2021

(65) Prior Publication Data
US 2022/0222431 A1 Jul. 14, 2022

Related U.S. Application Data

(63) Continuation of application No. PCT/IB2021/062440, filed on Dec. 29, 2021, and a
(Continued)

(51) Int. Cl.
*G06F 17/00* (2019.01)
*G06F 40/186* (2020.01)
(Continued)

(52) U.S. Cl.
CPC .......... *G06F 40/186* (2020.01); *G06F 40/134* (2020.01); *G06F 40/30* (2020.01)

(58) Field of Classification Search
CPC ....... G06F 40/186; G06F 40/134; G06F 40/30
See application file for complete search history.

(56) References Cited

U.S. PATENT DOCUMENTS 5,479,602 A 12/1995 Baecker et al.
5,517,663 A 5/1996 Kahn
(Continued)

FOREIGN PATENT DOCUMENTS

CN 107422666 A 12/2017
CN 107623596 A 1/2018
(Continued)

OTHER PUBLICATIONS

Anupam, V., et al, "Personalizing the Web Using Site Descriptions", Proceedings of the Tenth International Workshop on Database and Expert Systems Applications, ISBN: 0-7695-0281-4, DOI: 10.1109/DEXA.1999.795275, Jan. 1, 1999, pp. 732-738. (Year: 1999 ).*
(Continued)

*Primary Examiner* — Laurie A Ries
(74) *Attorney, Agent, or Firm* — Finnegan, Henderson, Farabow, Garrett & Dunner LLP

(57) ABSTRACT

Systems, methods, and computer-readable media for embedding within an electronic word processing document are disclosed. The systems and methods may involve accessing the electronic word processing document, wherein the electronic word processing document contains text; detecting an in-line object inserted into the text at a particular location, the in-line object including a URL-based rule linked to a portion of the text; executing the URL-based rule to retrieve internet located data corresponding to the URL-based rule; and inserting the retrieved internet-located data into the text at the particular location.

24 Claims, 16 Drawing Sheets

Related U.S. Application Data continuation-in-part of application No. PCT/IB2021/000297, filed on Apr. 28, 2021, and a continuation-in-part of application No. PCT/IB2021/000090, filed on Feb. 11, 2021, and a continuation-in-part of application No. PCT/IB2021/000024, filed on Jan. 14, 2021.

(60) Provisional application No. 63/273,453, filed on Oct. 29, 2021, provisional application No. 63/273,448, filed on Oct. 29, 2021, provisional application No. 63/233,925, filed on Aug. 17, 2021.

(51) Int. Cl.
*G06F 40/30* (2020.01)
*G06F 40/134* (2020.01)

(56) References Cited

U.S. PATENT DOCUMENTS

| | | |
|---|---|---|
| 5,682,469 A | 10/1997 | Linnett |
| 5,696,702 A | 12/1997 | Skinner et al. |
| 5,726,701 A | 3/1998 | Needham |
| 5,787,411 A | 7/1998 | Groff et al. |
| 5,880,742 A | 3/1999 | Rao et al. |
| 5,933,145 A | 8/1999 | Meek |
| 6,016,553 A | 1/2000 | Schneider et al. |
| 6,023,695 A | 2/2000 | Osborn et al. |
| 6,167,405 A | 12/2000 | Rosensteel, Jr. et al. |
| 6,169,534 B1 | 1/2001 | Raffel et al. |
| 6,185,582 B1 | 2/2001 | Zellweger et al. |
| 6,195,794 B1 | 2/2001 | Buxton |
| 6,266,067 B1 | 7/2001 | Owen et al. |
| 6,275,809 B1 | 8/2001 | Tamaki et al. |
| 6,377,965 B1 | 4/2002 | Hachamovitch et al. |
| 6,385,617 B1 | 5/2002 | Malik |
| 6,460,043 B1 | 10/2002 | Tabbara et al. |
| 6,496,832 B2 | 12/2002 | Chi et al. |
| 6,509,912 B1 | 1/2003 | Moran et al. |
| 6,522,347 B1 | 2/2003 | Tsuji et al. |
| 6,527,556 B1 | 3/2003 | Koskinen |
| 6,606,740 B1 | 8/2003 | Lynn et al. |
| 6,636,242 B2 | 10/2003 | Bowman-Amuah |
| 6,647,370 B1 | 11/2003 | Fu et al. |
| 6,661,431 B1 | 12/2003 | Stuart et al. |
| 7,027,997 B1 | 4/2006 | Robinson et al. |
| 7,043,529 B1 | 5/2006 | Simonoff |
| 7,054,891 B2 | 5/2006 | Cole |
| 7,237,188 B1 | 6/2007 | Leung |
| 7,249,042 B1 | 7/2007 | Doerr et al. |
| 7,272,637 B1 | 9/2007 | Himmelstein |
| 7,379,934 B1 | 5/2008 | Forman et al. |
| 7,383,320 B1 | 6/2008 | Silberstein et al. |
| 7,415,664 B2 | 8/2008 | Aureglia et al. |
| 7,461,077 B1 | 12/2008 | Greenwood |
| 7,489,976 B2 | 2/2009 | Adra |
| 7,685,152 B2 | 3/2010 | Chivukula et al. |
| 7,707,514 B2 | 4/2010 | Forstall et al. |
| 7,710,290 B2 | 5/2010 | Johnson |
| 7,770,100 B2 | 8/2010 | Chamberlain et al. |
| 7,827,476 B1 | 11/2010 | Roberts et al. |
| 7,916,157 B1 | 3/2011 | Kelley et al. |
| 7,954,064 B2 | 5/2011 | Forstall et al. |
| 8,046,703 B2 | 10/2011 | Busch et al. |
| 8,078,955 B1 | 12/2011 | Gupta |
| 8,082,274 B2 | 12/2011 | Steinglass et al. |
| 8,108,241 B2 | 1/2012 | Shukoor |
| 8,136,031 B2 | 3/2012 | Massand |
| 8,151,213 B2 | 4/2012 | Weitzman et al. |
| 8,223,172 B1 | 7/2012 | Miller et al. |
| 8,286,072 B2 | 10/2012 | Chamberlain et al. |
| 8,365,095 B2 | 1/2013 | Bansal et al. |
| 8,375,327 B2 | 2/2013 | Lorch et al. |
| 8,386,960 B1 | 2/2013 | Eismann et al. |
| 8,423,909 B2 | 4/2013 | Zabielski |
| 8,548,997 B1 | 10/2013 | Wu |
| 8,560,942 B2 | 10/2013 | Fortes et al. |
| 8,566,732 B2 | 10/2013 | Louch et al. |
| 8,572,173 B2 | 10/2013 | Briere et al. |
| 8,578,399 B2 | 11/2013 | Khen et al. |
| 8,601,383 B2 | 12/2013 | Folting et al. |
| 8,620,703 B1 | 12/2013 | Kapoor et al. |
| 8,738,414 B1 | 5/2014 | Nagar et al. |
| 8,812,471 B2 | 8/2014 | Akita |
| 8,819,042 B2 | 8/2014 | Samudrala et al. |
| 8,862,979 B2 | 10/2014 | Hawking |
| 8,863,022 B2 | 10/2014 | Rhodes et al. |
| 8,869,027 B2 | 10/2014 | Louch et al. |
| 8,937,627 B1 | 1/2015 | Otero et al. |
| 8,938,465 B2 | 1/2015 | Messer |
| 8,954,871 B2 | 2/2015 | Louch et al. |
| 9,007,405 B1 | 4/2015 | Eldar et al. |
| 9,015,716 B2 | 4/2015 | Fletcher et al. |
| 9,026,897 B2 | 5/2015 | Zarras |
| 9,043,362 B2 | 5/2015 | Weissman et al. |
| 9,129,234 B2 | 9/2015 | Campbell et al. |
| 9,172,738 B1 | 10/2015 | daCosta |
| 9,239,719 B1 | 1/2016 | Feinstein et al. |
| 9,244,917 B1 | 1/2016 | Sharma et al. |
| 9,253,130 B2 | 2/2016 | Zaveri |
| 9,286,246 B2 | 3/2016 | Saito et al. |
| 9,292,587 B2 | 3/2016 | Kann et al. |
| 9,336,502 B2 | 5/2016 | Mohammad et al. |
| 9,342,579 B2 | 5/2016 | Cao et al. |
| 9,361,287 B1 | 6/2016 | Simon et al. |
| 9,390,059 B1 | 7/2016 | Gur et al. |
| 9,424,287 B2 | 8/2016 | Schroth |
| 9,424,333 B1 | 8/2016 | Bisignani et al. |
| 9,430,458 B2 | 8/2016 | Rhee et al. |
| 9,449,031 B2 | 9/2016 | Barrus et al. |
| 9,495,386 B2 | 11/2016 | Tapley et al. |
| 9,558,172 B2 | 1/2017 | Rampson et al. |
| 9,613,086 B1 | 4/2017 | Sherman |
| 9,635,091 B1 | 4/2017 | Laukkanen et al. |
| 9,679,456 B2 | 6/2017 | East |
| 9,727,376 B1 | 8/2017 | Bills et al. |
| 9,760,271 B2 | 9/2017 | Persaud |
| 9,798,829 B1 | 10/2017 | Baisley |
| 9,811,676 B1 * | 11/2017 | Gauvin ............... G06F 21/6209 |
| 9,866,561 B2 | 1/2018 | Psenka et al. |
| 9,870,136 B2 | 1/2018 | Pourshahid |
| 10,043,296 B2 | 8/2018 | Li |
| 10,067,928 B1 | 9/2018 | Krappe |
| 10,176,154 B2 | 1/2019 | Ben-Aharon et al. |
| 10,235,441 B1 | 3/2019 | Makhlin et al. |
| 10,255,609 B2 | 4/2019 | Kinkead et al. |
| 10,282,405 B1 | 5/2019 | Silk et al. |
| 10,282,406 B2 | 5/2019 | Bissantz |
| 10,311,080 B2 | 6/2019 | Folting et al. |
| 10,347,017 B2 | 7/2019 | Ruble et al. |
| 10,372,706 B2 | 8/2019 | Chavan et al. |
| 10,380,140 B2 | 8/2019 | Sherman |
| 10,445,702 B1 | 10/2019 | Hunt |
| 10,452,360 B1 | 10/2019 | Burman et al. |
| 10,474,317 B2 | 11/2019 | Ramanathan et al. |
| 10,489,391 B1 | 11/2019 | Tomlin |
| 10,489,462 B1 | 11/2019 | Rogynskyy et al. |
| 10,496,737 B1 | 12/2019 | Sayre et al. |
| 10,528,599 B1 | 1/2020 | Pandis et al. |
| 10,534,507 B1 | 1/2020 | Laukkanen et al. |
| 10,540,152 B1 | 1/2020 | Krishnaswamy et al. |
| 10,540,434 B2 | 1/2020 | Migeon et al. |
| 10,564,622 B1 | 2/2020 | Dean et al. |
| 10,573,407 B2 | 2/2020 | Ginsburg |
| 10,628,002 B1 | 4/2020 | Kang et al. |
| 10,698,594 B2 | 6/2020 | Sanches et al. |
| 10,706,061 B2 | 7/2020 | Sherman et al. |
| 10,719,220 B2 | 7/2020 | Ouellet et al. |
| 10,740,117 B2 | 8/2020 | Ording et al. |
| 10,747,950 B2 | 8/2020 | Dang et al. |
| 10,748,312 B2 | 8/2020 | Ruble et al. |
| 10,754,688 B2 | 8/2020 | Powell |
| 10,761,691 B2 | 9/2020 | Anzures et al. |
| 10,795,555 B2 | 10/2020 | Burke et al. |

(56) References Cited

U.S. PATENT DOCUMENTS

| | | |
|---|---|---|
| 10,817,660 B2 | 10/2020 | Rampson et al. |
| D910,077 S | 2/2021 | Naroshevitch et al. |
| 10,963,578 B2 | 3/2021 | More et al. |
| 11,042,363 B1 | 6/2021 | Krishnaswamy et al. |
| 11,042,699 B1 | 6/2021 | Sayre et al. |
| 11,048,714 B2 | 6/2021 | Sherman et al. |
| 11,243,688 B1* | 2/2022 | Remy ............... H04L 63/0442 |
| 2001/0008998 A1 | 7/2001 | Tamaki et al. |
| 2001/0032248 A1 | 10/2001 | Krafchin |
| 2002/0075309 A1 | 6/2002 | Michelman et al. |
| 2002/0082892 A1 | 6/2002 | Raffel et al. |
| 2002/0138528 A1 | 9/2002 | Gong et al. |
| 2003/0033196 A1 | 2/2003 | Tomlin |
| 2003/0041113 A1 | 2/2003 | Larsen |
| 2003/0051377 A1 | 3/2003 | Chirafesi, Jr. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0135558 A1 | 7/2003 | Bellotti et al. |
| 2003/0187864 A1 | 10/2003 | McGoveran |
| 2003/0200215 A1 | 10/2003 | Chen et al. |
| 2004/0032432 A1 | 2/2004 | Baynger |
| 2004/0098284 A1 | 5/2004 | Petito et al. |
| 2004/0133441 A1 | 7/2004 | Brady et al. |
| 2004/0138939 A1 | 7/2004 | Theiler |
| 2004/0172592 A1 | 9/2004 | Collie et al. |
| 2004/0212615 A1 | 10/2004 | Uthe |
| 2004/0215443 A1 | 10/2004 | Hatton |
| 2004/0268227 A1 | 12/2004 | Brid |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0165600 A1 | 7/2005 | Kasravi et al. |
| 2005/0171881 A1 | 8/2005 | Ghassemieh et al. |
| 2005/0257204 A1 | 11/2005 | Bryant et al. |
| 2005/0278297 A1 | 12/2005 | Nelson |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0015806 A1 | 1/2006 | Wallace |
| 2006/0031148 A1 | 2/2006 | O'Dell et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0090169 A1 | 4/2006 | Daniels et al. |
| 2006/0106642 A1 | 5/2006 | Reicher et al. |
| 2006/0107196 A1 | 5/2006 | Thanu et al. |
| 2006/0111953 A1 | 5/2006 | Setya |
| 2006/0129415 A1 | 6/2006 | Thukral et al. |
| 2006/0136828 A1 | 6/2006 | Asano |
| 2006/0173908 A1 | 8/2006 | Browning et al. |
| 2006/0190313 A1 | 8/2006 | Lu |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0250369 A1 | 11/2006 | Keim |
| 2006/0253205 A1 | 11/2006 | Gardiner |
| 2006/0287998 A1 | 12/2006 | Folting et al. |
| 2006/0294451 A1 | 12/2006 | Kelkar et al. |
| 2007/0033531 A1* | 2/2007 | Marsh ............... G06F 16/951 |
| | | 707/E17.108 |
| 2007/0050322 A1 | 3/2007 | Vigesaa et al. |
| 2007/0050379 A1 | 3/2007 | Day et al. |
| 2007/0073899 A1 | 3/2007 | Judge et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0186173 A1 | 8/2007 | Both et al. |
| 2007/0220119 A1 | 9/2007 | Himmelstein |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034314 A1 | 2/2008 | Louch et al. |
| 2008/0059312 A1* | 3/2008 | Gern ............... G06Q 30/0277 |
| | | 705/14.72 |
| 2008/0065460 A1 | 3/2008 | Raynor |
| 2008/0077530 A1 | 3/2008 | Banas et al. |
| 2008/0104091 A1 | 5/2008 | Chin |
| 2008/0126389 A1 | 5/2008 | Mush et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0195948 A1 | 8/2008 | Bauer |
| 2008/0209318 A1* | 8/2008 | Allsop ............... G06Q 30/06 |
| | | 715/700 |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons |
| 2009/0006171 A1 | 1/2009 | Blatchley et al. |
| 2009/0006283 A1 | 1/2009 | Labrie et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0077164 A1 | 3/2009 | Phillips et al. |
| 2009/0077217 A1 | 3/2009 | McFarland et al. |
| 2009/0083140 A1* | 3/2009 | Phan ............... G06Q 30/0254 |
| | | 705/14.52 |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0198715 A1 | 8/2009 | Barbarek |
| 2009/0248710 A1 | 10/2009 | McCormack et al. |
| 2009/0276692 A1 | 11/2009 | Rosner |
| 2009/0313201 A1 | 12/2009 | Huelsman et al. |
| 2009/0313537 A1 | 12/2009 | Fu et al. |
| 2009/0313570 A1 | 12/2009 | Po et al. |
| 2009/0319882 A1 | 12/2009 | Morrison et al. |
| 2009/0327240 A1 | 12/2009 | Meehan et al. |
| 2009/0327851 A1 | 12/2009 | Raposo |
| 2009/0327875 A1 | 12/2009 | Kinkoh |
| 2010/0017699 A1 | 1/2010 | Farrell et al. |
| 2010/0070895 A1 | 3/2010 | Messer |
| 2010/0083164 A1 | 4/2010 | Martin et al. |
| 2010/0088636 A1 | 4/2010 | Yerkes et al. |
| 2010/0095298 A1 | 4/2010 | Seshadrinathan et al. |
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0228752 A1 | 9/2010 | Folting et al. |
| 2010/0241477 A1 | 9/2010 | Nylander et al. |
| 2010/0241948 A1 | 9/2010 | Andeen et al. |

(56) References Cited

U.S. PATENT DOCUMENTS

| | | |
|---|---|---|
| 2010/0241990 A1 | 9/2010 | Gabriel et al. |
| 2010/0251090 A1 | 9/2010 | Chamberlain et al. |
| 2010/0257015 A1 | 10/2010 | Molander |
| 2010/0262625 A1 | 10/2010 | Pittenger |
| 2010/0287221 A1 | 11/2010 | Battepati et al. |
| 2010/0324964 A1 | 12/2010 | Callanan et al. |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0209150 A1* | 8/2011 | Hammond ......... G06Q 30/0256 718/100 |
| 2011/0219321 A1 | 9/2011 | Gonzalez et al. |
| 2011/0225525 A1 | 9/2011 | Chasman et al. |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036462 A1 | 2/2012 | Schwartz et al. |
| 2012/0079408 A1 | 3/2012 | Rohwer |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0124749 A1 | 5/2012 | Lewman |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0233533 A1 | 9/2012 | Yücel et al. |
| 2012/0246170 A1 | 9/2012 | Iantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0297307 A1 | 11/2012 | Rider et al. |
| 2012/0303262 A1 | 11/2012 | Alam et al. |
| 2012/0304098 A1 | 11/2012 | Kuulusa |
| 2012/0311496 A1 | 12/2012 | Cao et al. |
| 2013/0018952 A1 | 1/2013 | McConnell et al. |
| 2013/0018953 A1 | 1/2013 | McConnell et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0055113 A1 | 2/2013 | Chazin et al. |
| 2013/0086460 A1 | 4/2013 | Folting et al. |
| 2013/0090969 A1 | 4/2013 | Rivere |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0159832 A1 | 6/2013 | Ingargiola et al. |
| 2013/0159907 A1 | 6/2013 | Brosche et al. |
| 2013/0211866 A1 | 8/2013 | Gordon et al. |
| 2013/0238968 A1 | 9/2013 | Barrus |
| 2013/0262527 A1 | 10/2013 | Hunter |
| 2013/0268331 A1 | 10/2013 | Bitz et al. |
| 2013/0297468 A1 | 11/2013 | Hirsch et al. |
| 2013/0318424 A1 | 11/2013 | Boyd |
| 2014/0006326 A1 | 1/2014 | Bazanov |
| 2014/0019842 A1 | 1/2014 | Montagna et al. |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0068403 A1 | 3/2014 | Bhargav et al. |
| 2014/0074545 A1 | 3/2014 | Minder et al. |
| 2014/0108985 A1 | 4/2014 | Scott et al. |
| 2014/0109012 A1 | 4/2014 | Choudhary et al. |
| 2014/0115518 A1 | 4/2014 | Abdukalykov et al. |
| 2014/0129960 A1 | 5/2014 | Wang et al. |
| 2014/0136972 A1 | 5/2014 | Rodgers et al. |
| 2014/0137144 A1 | 5/2014 | Järvenpää et al. |
| 2014/0173401 A1 | 6/2014 | Oshlag et al. |
| 2014/0188748 A1 | 7/2014 | Cavoue et al. |
| 2014/0195933 A1 | 7/2014 | Rao DV |
| 2014/0214404 A1 | 7/2014 | Kalia et al. |
| 2014/0249877 A1 | 9/2014 | Hull et al. |
| 2014/0278638 A1 | 9/2014 | Kreuzkamp et al. |
| 2014/0278720 A1 | 9/2014 | Taguchi |
| 2014/0280287 A1 | 9/2014 | Ganti |
| 2014/0281868 A1 | 9/2014 | Vogel et al. |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0324497 A1 | 10/2014 | Verma et al. |
| 2014/0324501 A1 | 10/2014 | Davidow et al. |
| 2014/0365938 A1 | 12/2014 | Black et al. |
| 2014/0372932 A1 | 12/2014 | Rutherford et al. |
| 2015/0032686 A1 | 1/2015 | Kuchoor |
| 2015/0033131 A1 | 1/2015 | Peev et al. |
| 2015/0074721 A1 | 3/2015 | Fishman et al. |
| 2015/0074728 A1 | 3/2015 | Chai et al. |
| 2015/0095752 A1 | 4/2015 | Studer et al. |
| 2015/0106736 A1 | 4/2015 | Torman et al. |
| 2015/0125834 A1 | 5/2015 | Mendoza |
| 2015/0142829 A1 | 5/2015 | Lee et al. |
| 2015/0153943 A1 | 6/2015 | Wang |
| 2015/0154660 A1* | 6/2015 | Weald ................... G06F 40/143 705/14.73 |
| 2015/0169514 A1* | 6/2015 | Sah ....................... G06Q 30/02 715/234 |
| 2015/0169531 A1 | 6/2015 | Campbell et al. |
| 2015/0212717 A1 | 7/2015 | Nair et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0278699 A1 | 10/2015 | Danielsson |
| 2015/0281292 A1 | 10/2015 | Murayama |
| 2015/0295877 A1 | 10/2015 | Roman |
| 2015/0317590 A1 | 11/2015 | Karlson |
| 2015/0324453 A1 | 11/2015 | Werner |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0055134 A1 | 2/2016 | Sathish et al. |
| 2016/0055374 A1 | 2/2016 | Zhang et al. |
| 2016/0063435 A1 | 3/2016 | Shah et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0117308 A1 | 4/2016 | Haider et al. |
| 2016/0173122 A1 | 6/2016 | Akitomi et al. |
| 2016/0210572 A1 | 7/2016 | Shaaban et al. |
| 2016/0224532 A1 | 8/2016 | Miller et al. |
| 2016/0246490 A1 | 8/2016 | Cabral |

(56) References Cited

U.S. PATENT DOCUMENTS

| | | |
|---|---|---|
| 2016/0253982 A1 | 9/2016 | Cheung et al. |
| 2016/0275150 A1 | 9/2016 | Bournonnais et al. |
| 2016/0299655 A1 | 10/2016 | Migos et al. |
| 2016/0321235 A1 | 11/2016 | He et al. |
| 2016/0335302 A1 | 11/2016 | Teodorescu |
| 2016/0335303 A1 | 11/2016 | Madhalam et al. |
| 2016/0335731 A1 | 11/2016 | Hall |
| 2016/0335903 A1 | 11/2016 | Mendoza |
| 2016/0350950 A1 | 12/2016 | Ritchie et al. |
| 2017/0031967 A1 | 2/2017 | Chavan et al. |
| 2017/0041296 A1 | 2/2017 | Ford et al. |
| 2017/0052937 A1 | 2/2017 | Sirven et al. |
| 2017/0061342 A1 | 3/2017 | LoRe et al. |
| 2017/0061360 A1 | 3/2017 | Rucker et al. |
| 2017/0063722 A1 | 3/2017 | Cropper et al. |
| 2017/0075557 A1 | 3/2017 | Noble et al. |
| 2017/0090734 A1* | 3/2017 | Fitzpatrick .............. G06F 3/0486 |
| 2017/0091337 A1 | 3/2017 | Patterson |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0126772 A1 | 5/2017 | Campbell et al. |
| 2017/0132296 A1 | 5/2017 | Ding |
| 2017/0139874 A1 | 5/2017 | Chin |
| 2017/0139884 A1 | 5/2017 | Bendig et al. |
| 2017/0140219 A1* | 5/2017 | King .................. G06F 16/334 |
| 2017/0153771 A1 | 6/2017 | Chu |
| 2017/0177888 A1 | 6/2017 | Arora et al. |
| 2017/0185668 A1 | 6/2017 | Convertino et al. |
| 2017/0221072 A1 | 8/2017 | AthuluruTlrumala et al. |
| 2017/0228445 A1 | 8/2017 | Chiu et al. |
| 2017/0228460 A1 | 8/2017 | Amel |
| 2017/0236081 A1 | 8/2017 | Grady Smith et al. |
| 2017/0242921 A1 | 8/2017 | Rota |
| 2017/0270970 A1 | 9/2017 | Ho et al. |
| 2017/0272316 A1 | 9/2017 | Johnson et al. |
| 2017/0272331 A1 | 9/2017 | Lissack |
| 2017/0285879 A1 | 10/2017 | Pilkington et al. |
| 2017/0285890 A1 | 10/2017 | Dolman |
| 2017/0315683 A1 | 11/2017 | Boucher et al. |
| 2017/0351252 A1 | 12/2017 | Kleifges et al. |
| 2017/0372442 A1 | 12/2017 | Mejias |
| 2018/0025084 A1 | 1/2018 | Conlan et al. |
| 2018/0032570 A1 | 2/2018 | Miller et al. |
| 2018/0055434 A1 | 3/2018 | Cheung et al. |
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0081863 A1 | 3/2018 | Bathla |
| 2018/0081868 A1 | 3/2018 | Willcock et al. |
| 2018/0088989 A1 | 3/2018 | Nield et al. |
| 2018/0095938 A1 | 4/2018 | Monte |
| 2018/0096417 A1 | 4/2018 | Cook et al. |
| 2018/0109760 A1 | 4/2018 | Metter et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0210936 A1 | 7/2018 | Reynolds et al. |
| 2018/0225270 A1 | 8/2018 | Bhide et al. |
| 2018/0276417 A1 | 9/2018 | Cerezo |
| 2018/0293217 A1 | 10/2018 | Callaghan |
| 2018/0293669 A1 | 10/2018 | Jackson et al. |
| 2018/0329930 A1 | 11/2018 | Eberlein et al. |
| 2018/0357305 A1 | 12/2018 | Kinast et al. |
| 2018/0373434 A1 | 12/2018 | Switzer et al. |
| 2018/0373757 A1 | 12/2018 | Schukovets et al. |
| 2019/0005094 A1 | 1/2019 | Yi |
| 2019/0036989 A1 | 1/2019 | Eirinberg et al. |
| 2019/0050445 A1 | 2/2019 | Griffith et al. |
| 2019/0050812 A1 | 2/2019 | Boileau |
| 2019/0056856 A1 | 2/2019 | Simmons et al. |
| 2019/0065545 A1 | 2/2019 | Hazel et al. |
| 2019/0073350 A1 | 3/2019 | Shiotani |
| 2019/0095413 A1 | 3/2019 | Davis et al. |
| 2019/0108046 A1 | 4/2019 | Spencer-Harper et al. |
| 2019/0130611 A1 | 5/2019 | Black et al. |
| 2019/0138588 A1 | 5/2019 | Silk et al. |
| 2019/0138653 A1 | 5/2019 | Roller et al. |
| 2019/0155821 A1 | 5/2019 | Dirisala |
| 2019/0208058 A1 | 7/2019 | Dvorkin et al. |
| 2019/0236188 A1 | 8/2019 | McKenna |
| 2019/0251884 A1 | 8/2019 | Burns et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0026397 A1 | 1/2020 | Wohlstadter et al. |
| 2020/0042648 A1 | 2/2020 | Rao |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0247661 A1 | 8/2020 | Rao et al. |
| 2020/0301678 A1 | 9/2020 | Burman et al. |
| 2020/0301902 A1 | 9/2020 | Maloy et al. |
| 2020/0327244 A1 | 10/2020 | Blass et al. |
| 2020/0348809 A1 | 11/2020 | Drescher |
| 2020/0349320 A1 | 11/2020 | Owens |
| 2020/0356873 A1 | 11/2020 | Nawrocke et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2021/0019287 A1 | 1/2021 | Prasad et al. |
| 2021/0021603 A1 | 1/2021 | Gibbons |
| 2021/0042796 A1 | 2/2021 | Khoury et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0072883 A1 | 3/2021 | Migunova et al. |
| 2021/0084120 A1 | 3/2021 | Fisher et al. |
| 2021/0124872 A1 | 4/2021 | Lereya |
| 2021/0149553 A1 | 5/2021 | Lereya et al. |
| 2021/0150489 A1 | 5/2021 | Haramati et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0264220 A1* | 8/2021 | Wei .................. G06K 9/6269 |

FOREIGN PATENT DOCUMENTS

| | | |
|---|---|---|
| CN | 107885656 A | 4/2018 |
| CN | 112929172 A | 6/2021 |
| WO | WO 2004/100015 A2 | 11/2004 |
| WO | WO 2006/116580 A2 | 11/2006 |
| WO | WO 2017/202159 A1 | 11/2017 |
| WO | WO 2020/187408 A1 | 9/2020 |

OTHER PUBLICATIONS

U.S. Appl. No. 17/143,897, filed Jan. 7, 2021.
U.S. Appl. No. 17/143,603, filed Jan. 7, 2021.
U.S. Appl. No. 17/143,745, filed Jan. 7, 2021.
U.S. Appl. No. 17/143,482, filed Jan. 7, 2021.
U.S. Appl. No. 17/143,768, filed Jan. 7, 2021.
U.S. Appl. No. 17/143,677, filed Jan. 7, 2021.
U.S. Appl. No. 17/143,653, filed Jan. 7, 2021.
U.S. Appl. No. 17/143,916, filed Jan. 7, 2021.
U.S. Appl. No. 17/143,475, filed Jan. 7, 2021.

(56) References Cited

OTHER PUBLICATIONS

U.S. Appl. No. 17/143,865, filed Jan. 7, 2021.
U.S. Appl. No. 17/143,462, filed Jan. 7, 2021.
U.S. Appl. No. 17/143,470, filed Jan. 7, 2021.
U.S. Appl. No. 17/143,905, filed Jan. 7, 2021.
U.S. Appl. No. 17/143,798, filed Jan. 7, 2021.
U.S. Appl. No. 17/143,892, filed Jan. 7, 2021.
U.S. Appl. No. 17/243,716, filed Apr. 29, 2021.
U.S. Appl. No. 17/243,727, filed Apr. 29, 2021.
U.S. Appl. No. 17/232,978, filed Apr. 16, 2021.
U.S. Appl. No. 17/243,809, filed Apr. 29, 2021.
U.S. Appl. No. 17/243,901, filed Apr. 29, 2021.
U.S. Appl. No. 17/232,354, filed Apr. 16, 2021.
U.S. Appl. No. 17/243,898, filed Apr. 29, 2021.
U.S. Appl. No. 17/243,969, filed Apr. 29, 2021.
U.S. Appl. No. 17/243,742, filed Apr. 29, 2021.
U.S. Appl. No. 17/243,752, filed Apr. 29, 2021.
U.S. Appl. No. 17/232,754, filed Apr. 16, 2021.
U.S. Appl. No. 17/232,827, filed Apr. 16, 2021.
U.S. Appl. No. 17/243,763, filed Apr. 29, 2021.
U.S. Appl. No. 17/243,848, filed Apr. 29, 2021.
U.S. Appl. No. 17/243,934, filed Apr. 29, 2021.
U.S. Appl. No. 17/244,121, filed Apr. 29, 2021.
U.S. Appl. No. 17/243,807, filed Apr. 29, 2021.
U.S. Appl. No. 17/244,027, filed Apr. 29, 2021.
U.S. Appl. No. 17/244,157, filed Apr. 29, 2021.
U.S. Appl. No. 17/243,725, filed Apr. 29, 2021.
U.S. Appl. No. 17/243,737, filed Apr. 29, 2021.
U.S. Appl. No. 17/243,748, filed Apr. 29, 2021.
U.S. Appl. No. 16/453,065, filed Jun. 26, 2019.
U.S. Appl. No. 17/243,691, filed Apr. 29, 2021.
U.S. Appl. No. 17/243,722, filed Apr. 29, 2021.
U.S. Appl. No. 17/243,892, filed Apr. 29, 2021.
U.S. Appl. No. 17/243,977, filed Apr. 29, 2021.
U.S. Appl. No. 17/243,764, filed Apr. 29, 2021.
U.S. Appl. No. 17/243,837, filed Apr. 29, 2021.
U.S. Appl. No. 17/243,729, filed Apr. 29, 2021.
U.S. Appl. No. 17/243,802, filed Apr. 29, 2021.
U.S. Appl. No. 17/242,452, filed Apr. 28, 2021.
U.S. Appl. No. 17/243,891, filed Apr. 29, 2021.
U.S. Appl. No. 17/243,775, filed Apr. 29, 2021.
U.S. Appl. No. 17/243,731, filed Apr. 29, 2021.
U.S. Appl. No. 17/243,768, filed Apr. 29, 2021.
U.S. Appl. No. 16/502,679, filed Jul. 3, 2019.
U.S. Appl. No. 17/565,652, filed Dec. 30, 2021.
U.S. Appl. No. 17/565,699, filed Dec. 30, 2021.
U.S. Appl. No. 17/565,853, filed Dec. 30, 2021.
U.S. Appl. No. 17/565,880, filed Dec. 30, 2021.
U.S. Appl. No. 17/564,745, filed Dec. 29, 2021.
U.S. Appl. No. 17/565,614, filed Dec. 30, 2021.
U.S. Appl. No. 17/565,718, filed Dec. 30, 2021.
U.S. Appl. No. 17/565,843, filed Dec. 30, 2021.
U.S. Appl. No. 17/565,534, filed Dec. 30, 2021.
U.S. Appl. No. 17/565,801, filed Dec. 30, 2021.
U.S. Appl. No. 17/565,821, filed Dec. 30, 2021.
U.S. Appl. No. 17/565,780, filed Dec. 30, 2021.
Alessio et al., Monday.com Walkthrough 2018\All Features, Platforms & Thoughts, Mar. 1, 2018, pp. 1-55, 2018.
Rodrigo et al., Project Management with Monday.com: a 101 Introduction; Jul. 22, 2019, pp. 1-21, 2019.
International Search Report and Written Opinion of the International Searching Authority in PCT/IB2020/000658, dated Nov. 11, 2020 (12 pages).
International Search Report in PCT/IB2020/000974, dated May 3, 2021 (19 pages).
International Search Report in PCT/IB2021/000090 dated Jul. 27, 2021.
ShowMyPC, "Switch Presenter While Using ShowMyPC"; web archive.org; Aug. 20, 2016.
International Search Report and Written Opinion of the International Search Authority in PCT/IB2020/000024, dated May 3, 2021 (13 pages).
"Pivot table—Wikipedia"; URL: https://en.wikepedia .org/w/index.php?title=Pivot_table&oldid=857163289, originally retrieve on Oct. 23, 2019; retrieved on Jul. 16, 2021.
Vishal Singh, "A Theoretical Framework of a BIM-based Multi-Disciplinary Collaboration Platform", Nov. 5, 2020, Automation in Construction, 20 (2011), pp. 134-144 (Year: 2011).
Edward A. Stohr, Workflow Automation: Overview and Research Issues, 2001, Information Systems Frontiers 3:3, pp. 281-296 (Year: 2001).
International Search Report and Written Opinion of the International Search Authority in PCT/IB2021/000297, dated Oct. 12, 2021 (20 pages).
Dapulse.com "features".extracted from web.archive.or/web/20140918421/https://dapulse.com/features; Sep. 2014 (Year: 2014).
Stephen Larson et al., Introducing Data Mining Concepts Using Microsoft Excel's Table Analysis Tools, Oct. 2015, [Retrieved on Nov. 19, 2021], Retrieved from the internet: <URL: https://dl.acm.org/doi/pdf/10.5555/2831373.2831394> 3 Pages (127-129) (Year: 2015).
Isaiah Pinchas etal., Lexical Analysis Tool, May 2004, [Retrieved on Nov. 19, 2021], Retrieved from the internet: <URL: https://dl.acm.org/doi/pdf/10.1145/997140.997147> 9 Pages (66-74) (Year: 2004).

* cited by examiner

DIGITAL PROCESSING SYSTEMS AND METHODS FOR DYNAMIC WORK DOCUMENT UPDATES USING EMBEDDED IN-LINE LINKS IN COLLABORATIVE WORK SYSTEMS

CROSS-REFERENCE TO RELATED APPLICATIONS

This application is based on and claims benefit of priority of International Patent Application No. PCT/IB2021/062440 filed on Dec. 29, 2021, which claims priority to U.S. Provisional Patent Application No. 63/233,925, filed Aug. 17, 2021, U.S. Provisional Patent Application No. 63/273,448, filed Oct. 29, 2021, U.S. Provisional Patent Application No. 63/273,453, filed Oct. 29, 2021, International Patent Application No. PCT/IB2021/000024, filed on Jan. 14, 2021, International Patent Application No. PCT/IB2021/000090, filed on Feb. 11, 2021, and International Patent Application No. PCT/IB2021/000297, filed on Apr. 28, 2021, the contents of all of which are incorporated herein by reference in their entireties.

TECHNICAL FIELD

Embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

SUMMARY

One aspect of the present disclosure is directed to systems, methods, and computer readable media for embedding within an electronic word processing document, data derived from a source external to the electronic word processing document. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

Consistent with some disclosed embodiments, systems, methods, and computer readable media for embedding within an electronic word processing document, data derived from a source external to the electronic word processing document. Systems, methods, devices, and non-transitory computer readable media may involve at least one processor configured to: access the electronic word processing document, wherein the electronic word processing document contains text; detect an in-line object inserted into the text at a particular location, the in-line object including a URL-based rule linked to a portion of the text; execute the URL-based rule to retrieve internet located data corresponding to the URL-based rule; and insert the retrieved internet-located data into the text at the particular location.

DETAILED DESCRIPTION

Figure 1:
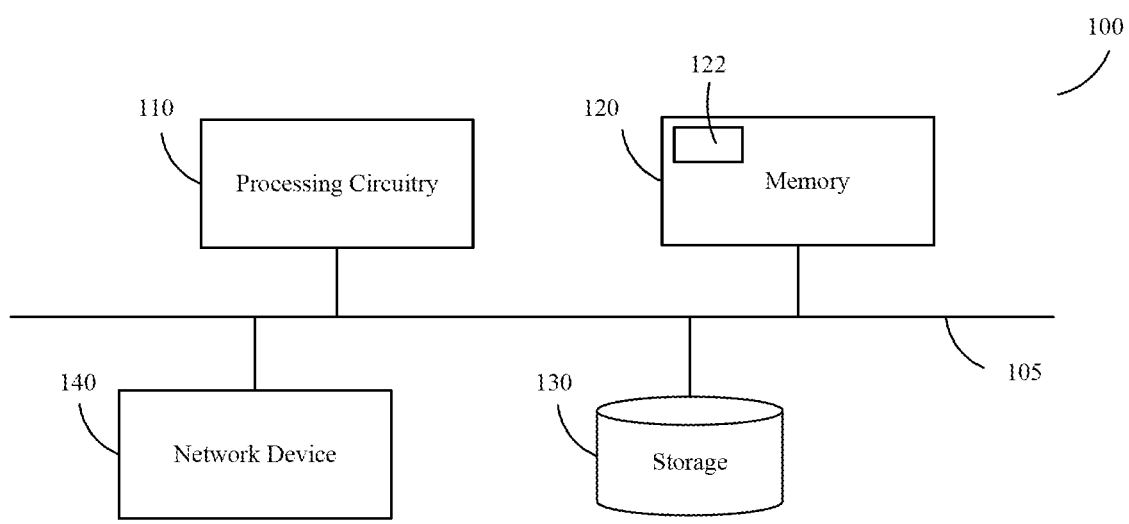
FIG. 1 is a block diagram of an exemplary computing device which may be employed in connection with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience, and form of the word "embodiment" as used herein is intended to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. The underlying platform may allow a user to structure a systems, methods, or computer readable media in many ways using common building blocks, thereby permitting flexibility in constructing a product that suits desired needs. This may be accomplished through the use of boards. A board may be a table configured to contain items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and/or a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or as an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, tablature may include any type of information, depending on intended use. When used in conjunction with a workflow management application, the tablature may include any information associated with one or more tasks, such as one or more status values, projects, countries, persons, teams, progress statuses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using, for example, static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Boards and widgets may be part of a platform that may enable users to interact with information in real time in collaborative work systems involving electronic collaborative word processing documents. Electronic collaborative word processing documents (and other variations of the term) as used herein are not limited to only digital files for word processing, but may include any other processing document such as presentation slides, tables, databases, graphics, sound files, video files or any other digital document or file. Electronic collaborative word processing documents may include any digital file that may provide for input, editing, formatting, display, and/or output of text, graphics, widgets, objects, tables, links, animations, dynamically updated elements, or any other data object that may be used in conjunction with the digital file. Any information stored on or displayed from an electronic collaborative word processing document may be organized into blocks. A block may include any organizational unit of information in a digital file, such as a single text character, word, sentence, paragraph, page, graphic, or any combination thereof. Blocks may include static or dynamic information, and may be linked to other sources of data for dynamic updates. Blocks may be automatically organized by the system, or may be manually selected by a user according to preference. In one embodiment, a user may select a segment of any information in an electronic word processing document and assign it as a particular block for input, editing, formatting, or any other further configuration.

An electronic collaborative word processing document may be stored in one or more repositories connected to a network accessible by one or more users through their computing devices. In one embodiment, one or more users may simultaneously edit an electronic collaborative word processing document. The one or more users may access the electronic collaborative word processing document through one or more user devices connected to a network. User access to an electronic collaborative word processing document may be managed through permission settings set by an author of the electronic collaborative word processing document. An electronic collaborative word processing document may include graphical user interface elements enabled to support the input, display, and management of multiple edits made by multiple users operating simultaneously within the same document.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
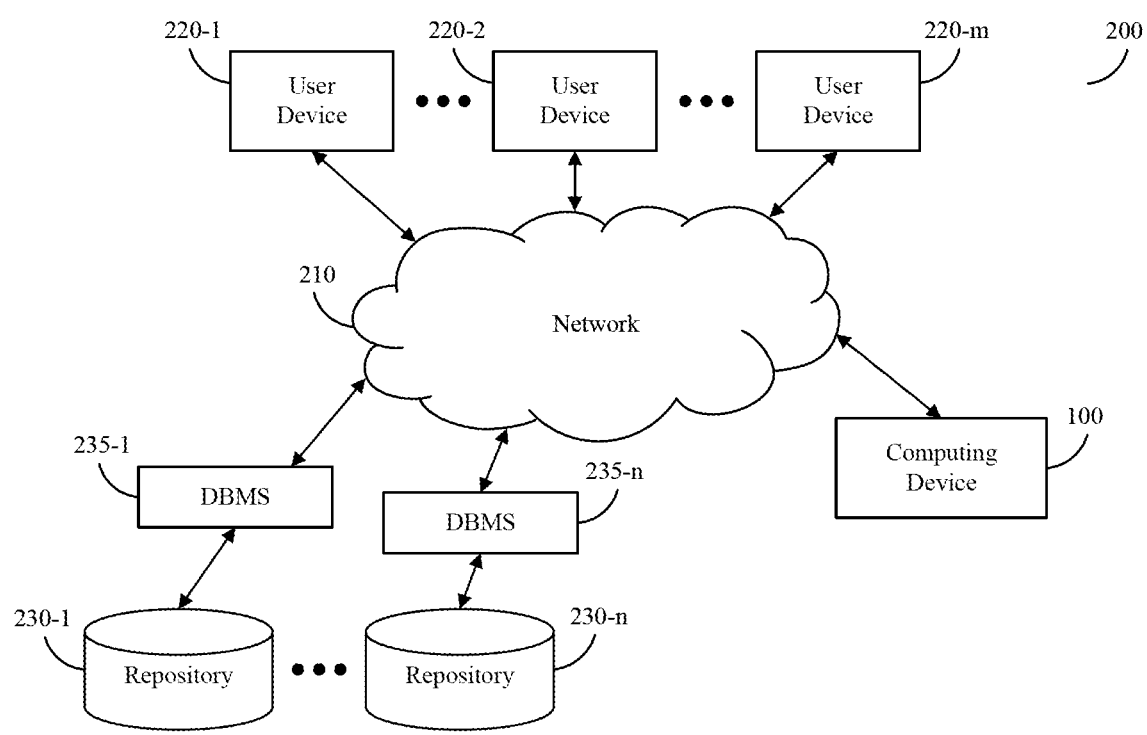
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-$m$, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-$n$, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-$n$. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Figure 3:
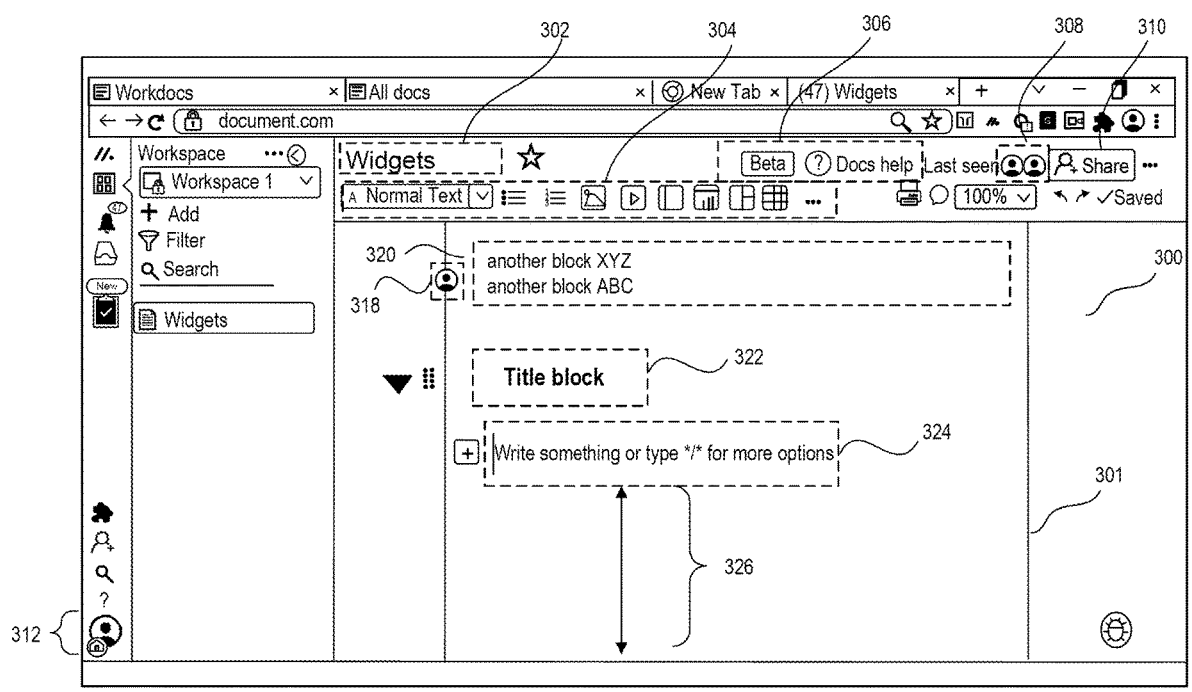
FIG. 3 illustrates an example of an electronic collaborative word processing document, consistent with some embodiments of the present disclosure.

FIG. 3 is an exemplary embodiment of a presentation of an electronic collaborative word processing document 301 via an editing interface or editor 300. The editor 300 may include any user interface components 302 through 312 to assist with input or modification of information in an electronic collaborative word processing document 301. For example, editor 300 may include an indication of an entity 312, which may include at least one individual or group of individuals associated with an account for accessing the electronic collaborative word processing document. User interface components may provide the ability to format a title 302 of the electronic collaborative word processing document, select a view 304, perform a lookup for additional features 306, view an indication of other entities 308 accessing the electronic collaborative word processing document at a certain time (e.g., at the same time or at a recorded previous time), and configure permission access 310 to the electronic collaborative word processing document. The electronic collaborative word processing document 301 may include information that may be organized into blocks as previously discussed. For example, a block 320 may itself include one or more blocks of information. Each block may have similar or different configurations or formats according to a default or according to user preferences. For example, block 322 may be a "Title Block" configured to include text identifying a title of the document, and may also contain, embed, or otherwise link to metadata associated with the title. A block may be pre-configured to display information in a particular format (e.g., in bold font). Other blocks in the same electronic collaborative word processing document 301, such as compound block 320 or input block 324 may be configured differently from title block 322. As a user inputs information into a block, either via input block 324 or a previously entered block, the platform may provide an indication of the entity 318 responsible for inputting or altering the information. The entity responsible for inputting or altering the information in the electronic collaborative word processing document may include any entity accessing the document, such as an author of the document or any other collaborator who has permission to access the document.

In electronic word processing systems, it may be beneficial to employ various word processing application configurations and non-word processing application configurations. In many instances, synthesizing information across multiple applications can be difficult due to dispersion of data and rigidness of electronic word processing applications. Therefore, there is a need for unconventional innovations for helping to seamlessly integrate non-word processing functionality into word processing applications.

Such unconventional approaches may enable computer systems to embed electronic non-word processing functionality directly into an electronic word processing document. By embedding non-word processing functionality directly into an electronic word processing document, this may synthesize multiple pieces and/or types of information, features, applications, and/or functionalities into a single electronic word processing document. This may, for example, be beneficial in situations where a user's screen space is limited, or where limited computing resources make it difficult to run many applications simultaneously. Moreover, embedding non-word processing functionality directly into an electronic word processing document may cause structured data to appear as unstructured data. In addition, such embedding may streamline communications, review and/or understandings by enabling non-word processing functionality to be stored, retrieved, and/or transmitted with an electronic word processing document. In some disclosed embodiments, dynamic data structures may be embedded into an electronic word processing document without sacrificing functionality of an electronic word processing application. Such dynamic data structures may present "live" features from any of a number of non-word processing applications. In some disclosed embodiments, a user may interact directly with one or more electronic non-word processing applications embedded within an electronic word processing document, rather than having to access and/or view these capabilities elsewhere. Moreover, in some disclosed embodiments, multiple users may interact with an electronic word processing document and an electronic non-word application embedded therein, without sacrificing functionality of either an electronic word processing application or the embedded electronic non-word processing application. In some embodiments, bringing electronic non-word processing application functionality into an electronic word processing document may increase the efficiency and operations of workflow management functionality.

Thus, the various embodiments the present disclosure describe at least a technological solution, based on improvement to operations of computer systems and platforms, to the technical challenge of integrating electronic non-word processing application functionality into electronic word processing documents.

Disclosed embodiments may involve systems, methods, and computer-readable media for embedding and running an electronic non-word processing application within an electronic word processing document. The systems and methods described herein may be implemented with the aid of at least one processor or non-transitory computer readable medium, such as a CPU, FPGA, ASIC, and/or any other processing structure(s) or storage medium, as described herein. For ease of discussion, when a method is described below, it is to be understood that aspects of the method apply equally to systems, devices, and computer-readable media. For example, some aspects of such a method may occur electronically on a device and/or over a network that is wired, wireless, or both. The method is not limited to a particular physical and/or electronic instrumentality, but rather may be accomplished using one or more differing instrumentalities.

An electronic non-word processing application, as used herein, may include a program, script, module, widget, instruction set, graphical interface, and/or any other computerized functionality different from word processing. In some embodiments, an electronic non-word processing application may be configured to perform functionality in response to inputs. Performing a functionality may include at least one processor carrying out commands, operations, or instructions stored in a repository or in any other storage medium. Performing the functionality may be triggered in response to receiving inputs. These inputs may include any signals or indications that meet a threshold for carrying out instructions to perform functionalities. For example, inputs may include information or instructions received manually from a computing device associated with a user, a signal associated with a change of information (e.g., a status change), or any other information that may be detected, received, or transmitted. For example, an electronic non-word processing application may, in response to receiving an input from a computing device associated with a user, perform functionalities such as changing stored data, changing or re-rendering displayed data (e.g., a visualization), constructing an API call (or other type of software call), transmitting a change to make to data (e.g., dynamically displayed data), or performing another operation associated with the electronic non-word processing application.

For example, a non-word processing document may include an application or a program, offered by an entity other than the provider of the word processing platform. At a user's discretion for example, such an application or program may be embedded or otherwise linked to the word processing document.

In some embodiments, an electronic non-word processing application may be configured to perform at least one non-word processing operation (e.g., an operation that an electronic word processing application may not be configured to perform), such as sending and/or receiving data using an API. Additionally or alternatively, an electronic non-word processing application may include at least one of a communications interface, a graphics presentation editor, a graphing application, a portal to a third-party application, and/or any other type of interface or application functionality. A communication interface may include display areas that display received or transmitted information and/or input areas for entering information to be transmitted to another entity (e.g., system, device, network). For example, a communication interface may include a chat window, chat service, email application, and/or a live dynamic visualization configurable by multiple devices and/or user accounts. A graphics presentation editor may include a visualization configuration utility program, one or more input areas configurable to receive commands to change a visualization, or any other tool configurable to change displayed visualizations, such as images, graphics, videos, colors, shapes, charts, graphs, widgets, or any other displayable indicator. A graphing application may include an application configurable to display at least one chart, graph, table, or other organizational layout of information. Such organizational layouts may include static or dynamic data structures. A portal may include a web-based platform, interface, credential authenticator, and/or code to establish a connection with another device. A third-party application may include any of the above-mentioned functionalities, a data-hosting service, and/or any program, script, module, widget, instruction set, graphical interface, or computer functionality defined by, hosted by, maintained by, or otherwise influenced by a party distinct from a party associated with an electronic word processing application, discussed in further detail below.

As used herein, an electronic word processing application may include a program, a script, a module, widget, instruction set, and/or any other computerized functionality different from word processing. In some embodiments, an electronic word processing application may be configured to perform at least one word processing operation, such as adding text, removing text, modifying text, moving or rearranging text, and/or any other operation to change a visual aspect of an electronic word processing document. An electronic word processing application may be associated with (e.g., cause display of, detect an input at) one or more interfaces. An electronic word processing application may also be associated with (e.g., cause display of, maintain, store data associated with) an electronic word processing document. An electronic non-word processing application and/or an electronic word processing application may run within a web browser, standalone application, widget, and/or any other software entity capable of execution by a processing device (e.g., processing circuitry 110). An electronic word processing document may include a file that is configurable to store text, a character, an image, a table, a graph, and/or any other displayable visualization or combination thereof. An electronic word processing document may be configurable to be displayed (e.g., by an electronic word processing application) in a visual form, for example within an interface.

Embedding an electronic non-word processing application within an electronic word processing document may, in some embodiments, include inserting data or a link within an electronic word processing document. Such embedding may be visible at the user interface level or may occur at the code level. In some embodiments, embedding may involve generating a data structure, storing information in a data structure, inserting a data structure into a file or application code, and/or rendering a display of information in the data structure within an interface (e.g., an interface hosted by the electronic non-word processing application) and/or electronic word processing document. In some embodiments, embedding an electronic non-word processing application within an electronic word processing document may include generating, receiving, and/or accessing code associated with the electronic non-word processing application (e.g., associated with a third party) and/or inserting instructions into the electronic word processing document, a file, an HTML, code set, or other code set associated with the electronic word processing application. For example, embedding the electronic non-word processing application within an electronic word processing document may include retrieving a link and inserting the link into a set of code associated with the electronic word processing document, which may cause the embedding of data associated with the link within the electronic word processing document. In some embodiments, embedding an electronic non-word processing application within an electronic word processing document may include determining a position within the electronic word processing document at which to embed the electronic non-word processing application. For example, the electronic word processing application may determine a location within the electronic word processing document selected by a user input (e.g., mouse click, gesture, cursor movement, or any other action by a user that results in a selection), and may determine a corresponding location within an electronic word processing document file or code, such as a location between portions of structured and/or structured data. The electronic word processing application may insert code, such as information from a data structure (e.g., with or without content data) at the determined location. Embedding the electronic non-word processing application within the electronic word processing application may include ignoring and/or removing a user interface element or other data structure associated with (e.g., generated by, maintained by) the electronic word processing application via an interface associated with the electronic word processing application or via a display of an electronic word processing document that may be opened by the electronic word processing application. Additionally or alternatively, embedding the electronic non-word processing application within the electronic word processing application may include configuring the embedded electronic non-word processing application to carry out its functionality without a user interface element or other data structure associated with the electronic word processing application. Running the electronic non-word processing application within the electronic word processing application and/or document may include executing instructions associated with both the electronic non-word processing application and the electronic word processing application. For example, at least one processor, which may operate a web browser, may execute instructions to carry out operations associated with the electronic non-word processing application and the electronic word processing application, such as simultaneously or near simultaneously.

Figure 4:
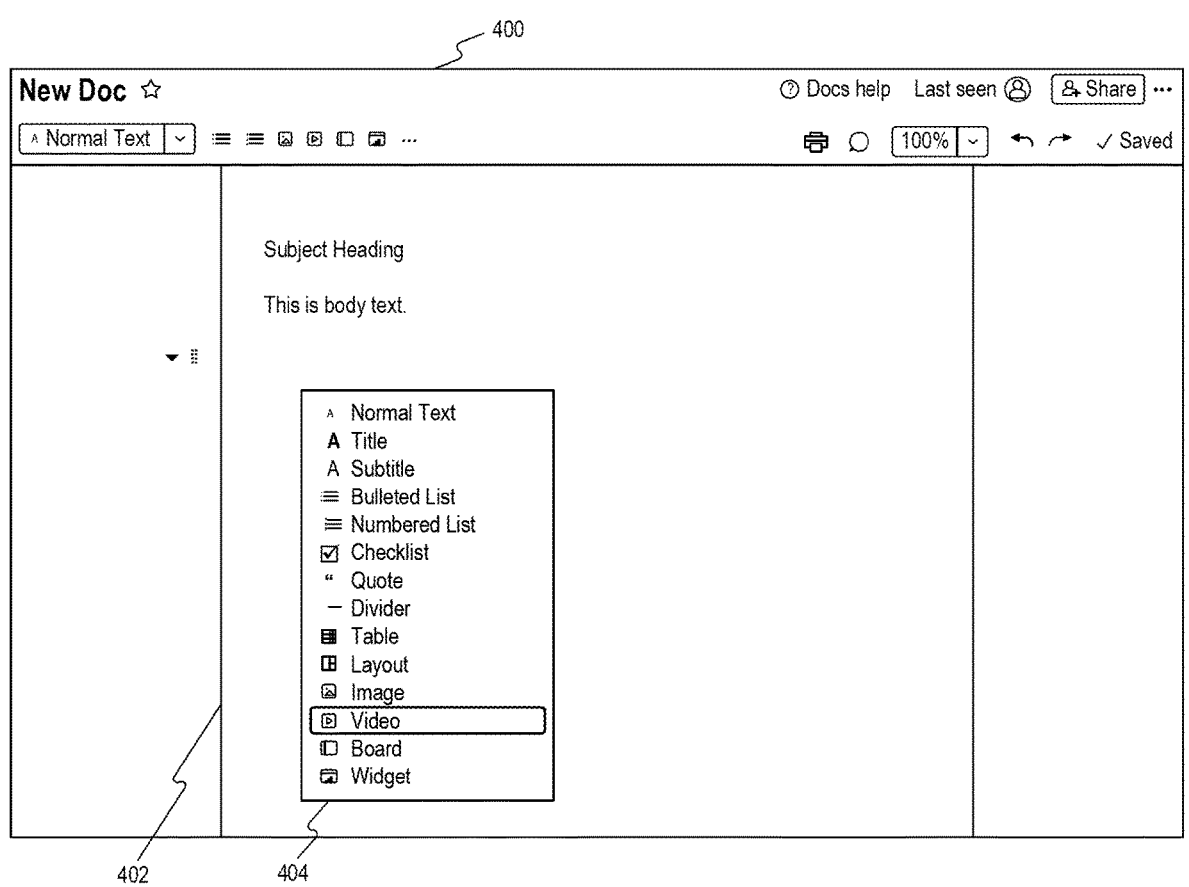
FIG. 4 illustrates an example of an electronic non-word processing application selection interface in a word processing document, consistent with some embodiments of the present disclosure.
Figure 5:
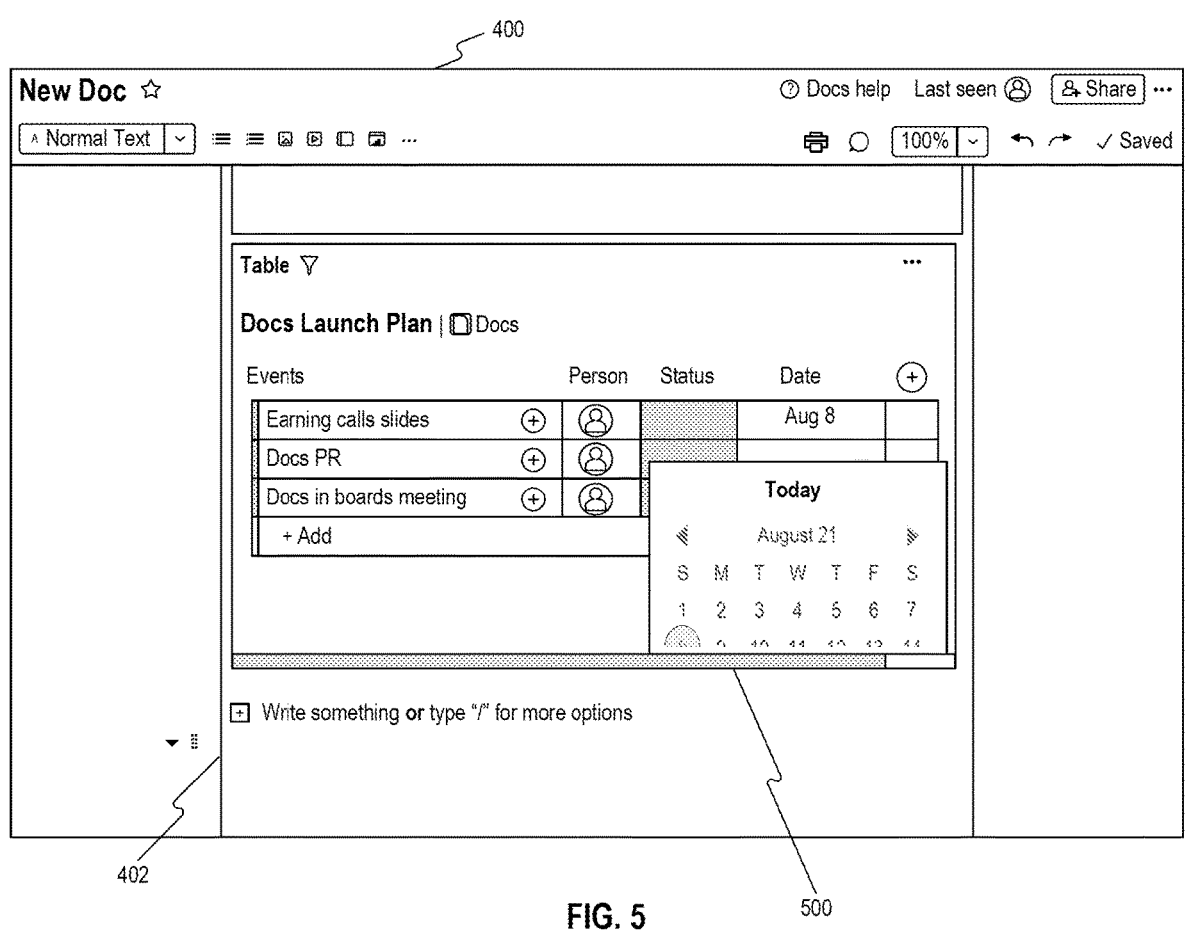
FIG. 5 illustrates an example of an electronic non-word processing application within a word processing document, consistent with some embodiments of the present disclosure.

For example, FIGS. 4 and 5 illustrate exemplary electronic word processing application interface 400. Electronic word processing application interface 400 may include presenting (e.g., render, display, encapsulate) an electronic word processing document 402. In the illustrated example of FIG. 4, electronic word processing document 402 includes exemplary text, though any text, character, image, table, graph, and/or any other visualization may exist within electronic word processing document 402. Consistent with some disclosed embodiments, electronic word processing document 402 may be configurable to include an embedded non-word processing application. In FIG. 5 for example, electronic non-word processing application 500 may be embedded within an electronic word processing application, operating the electronic word processing document 402. Electronic non-word processing application 500 may be configurable to perform non-word processing functionality (discussed further below), such as receiving inputs, transmitting data, and/or displaying data, which may be static or dynamic. For example, electronic non-word processing application 500 may include a dynamic graph, calendar, location tracker, or other live visualization. For example, electronic non-word processing application 500 may receive input (e.g., a click on an icon) from one or more user devices, as the electronic word processing document 402 is displayed at one or more devices, with electronic non-word processing application 500 embedded.

Consistent with some disclosed embodiments, the at least one processor may be configured to access an electronic word processing document. Accessing an electronic word processing document may include retrieving the electronic word processing document from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the electronic word processing document may include retrieving the electronic word processing document from a web browser cache. Additionally or alternatively, accessing the electronic word processing document may include accessing a live data stream of the electronic word processing document from a remote source. In some embodiments, accessing the electronic word processing document may include logging into an account having a permission to access the document. For example, accessing the electronic word processing document may be achieved by interacting with an indication associated with the electronic word processing document, such as an icon or file name, which may cause the system to retrieve (e.g., from a storage medium) a particular electronic word processing document associated with the indication.

Some embodiments may involve instances where the at least one processor may be configured to open an electronic word processing document within an electronic word processing application. Opening the electronic word processing document within an electronic word processing application may include initializing or displaying the electronic word processing document (e.g., the accessed electronic word processing document) within a program run by the electronic word processing application, and/or otherwise populating data from the electronic word processing document into an interface or program run by the electronic word processing application. For example, the electronic word processing application may retrieve the electronic word processing document from a storage medium and/or display the electronic word processing document within an interface. As previously discussed above, retrieving the electronic word processing document may be caused by instructions received from a computing device associated with a user for accessing a particular document. In some embodiments, the electronic word processing application may display the retrieved electronic word processing document according to one or more permissions associated with an entity (e.g., user, account, device, group, system, network) accessing the electronic word processing document. In some embodiments, the electronic word processing document may include one or more pieces of structured and/or unstructured data. In some embodiments, an interface, such as those described above, may be configured to receive at least one input from a user, such as within a distinct user interface element, or within the electronic word processing document. For example, an interface displaying the electronic word processing document may include one or more interactable interface elements, such as buttons, sliders, dials, or other visual interactable graphics. Additionally or alternatively, an interface displaying the electronic word processing document may be configured to permit a user to provide an input directly to the electronic word processing document itself. For example, the electronic word processing application may be configured to detect a user input to the electronic word processing document, such as text (e.g., based on an input from keyboard, touchscreen, mouse, or other input device), a table (e.g., based on a dragging motion input from a mouse), a request to cause display of selectable options (e.g., based on a mouse click or any other interaction that may cause the sending of the request), and/or any other detectable electronic signal. In some embodiments, the electronic word processing application may perform an operation in response to a detected input. For example, electronic word processing application may detect a mouse click on the electronic word processing document, and may cause display of a menu of options, such as options for selecting an electronic non-word processing application.

For example, as shown in FIG. 4, electronic word processing application interface 400 may display an electronic word processing document 402 (e.g., opened using an electronic word processing application) and render a display of the information contained in the electronic word processing document 402 (or lack of information if the document is empty or unpopulated). The electronic word processing application interface 400 may cause display of option menu 404, which may include one or more selectable graphical elements corresponding to respective electronic non-word processing applications. In some embodiments, option menu 404 may include one or more selectable graphical elements corresponding to configuration options which, when selected, may cause the display of one or more additional interfaces, which in turn may correspond to respective electronic non-word processing applications. The selected non-word processing applications may then be embedded at a particular location in the electronic word processing document 402. This particular location may be selected before causing the display of option menu 404 (e.g., according to a mouse click or other input within the electronic word processing document), or may be determined after the selection of an electronic non-word processing application to provide more efficient placement of electronic non-word processing applications.

Consistent with some disclosed embodiments, at least one processor may be configured to access an electronic non-word processing application. Accessing the electronic non-word processing application may involve retrieving data through any electrical medium such as one or more signals, instructions, operations, functions, databases, memories, hard drives, private data networks, virtual private networks, Wi-Fi networks, LAN or WAN networks, Ethernet cables, coaxial cables, twisted pair cables, fiber optics, public switched telephone networks, wireless cellular networks, BLUETOOTH™, BLUETOOTH LE™ (BLE), Wi-Fi, near field communications (NFC), and/or any other suitable communication method that provide a medium for exchanging data. Accessing the electronic non-word processing application may also involve constructing an API call, establishing a connection with a source of non-word processing application data (e.g., using an API or other application interface), authenticating a recipient of application data, transmitting an API call, receiving application data (e.g., dynamic data), and/or any other electronic operation that facilitates use of information associated with the electronic non-word processing application. Some embodiments may involve at least one processor configured to embed an electronic non-word processing application within an electronic word processing application in a manner enabling non-word processing functionality to occur from within the electronic word processing application. Embedding the electronic non-word processing application within the electronic word processing application may, in some embodiments, include inserting data or a link within an electronic word processing document. Such embedding may be visible at the user interface level or may occur at the code level. In some embodiments, embedding may involve generating a data structure, storing information in the data structure, and rendering a display of information in the data structure within an electronic word processing document at a particular location of the electronic word processing document or in association with the electronic word processing document, as discussed previously. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

A repository may store data such as an array, linked list, object, data field, chart, graph, graphical user interface, video, animation, iframe, HTML element (or element in any other markup language), and/or any other representation of data conveying information from an application. In some embodiments, the data structure may include metadata related to the data structure, which may assign a particular type or other identifier to the data structure, which may enable non-word processing functionality to occur within the embedded electronic non-word processing application, such as discussed further below. In some embodiments, embedding the electronic non-word processing application within the electronic word processing application may include inserting lines of code (e.g., HTML data) into a file or other software instance representing the electronic word processing document. For example, HTML, text may represent the electronic word processing document, and embedding the electronic non-word processing application within the electronic word processing application may include inserting lines of code into the HTML text to cause the electronic word processing document to source data (e.g., for rendering within the embedded electronic non-word processing application), which may be content data for an associated data structure. Non-word processing functionality may include a video playback operation, dynamic data generation, remote non-processing application data access, an interactable widget, an API operation, and/or any other display of data (e.g., through an interactable widget or interface) facilitated at least in part by an electronic non-word processing application. In some embodiments, embedding the electronic non-word processing application within the electronic word processing application may include inserting code associated with an API or software development toolkit (SDK) into the electronic word processing application and/or electronic word processing document.

Additionally or alternatively, an electronic word processing document may be divided into a plurality of blocks. As discussed herein, a block may include any organizational unit of information in a digital file, such as a single text character, word, sentence, paragraph, page, graphic, or any combination thereof. In some embodiments, an electronic word processing document may include one or more blocks and/or one or more non-block instances of data, which may include unstructured data (e.g., raw text). One or more of the blocks may have at least one separately adjustable permission setting. A separately adjustable permission setting may be set with respect to one block independent from (e.g., without influencing) a separately adjustable permission setting for another block. For example, a permission setting may include a parameter that may control the ability of a user, user account, device, system, or combination thereof to access a block, view a block, use a function associated with a block, edit a block, delete a block, move a block, re-size a block, influence a block, or perform any other operation relative to a block. Permission settings for a particular block in a document may be independent from the permission settings for other blocks located in the same document. For example, a first block may have restrictive permission settings that enable only the author of the document to edit the first block while a second block may have public permission settings that enable any user to edit the second block. As a result, an author of the document may edit both the first block and the second block while a second user (e.g., not an author of the document) would be prevented from making any edits or alterations to the first block and would only be able to do so for the second block. Blocks may be considered "divided" if they are differentiable in some way. For example, blocks may be differentiated by color, font, data type, presentation type or may be presented in differing areas of a display and/or in differing windows.

In some embodiments, an electronic non-word processing application may be embedded within a particular block. The electronic non-word processing application may be embedded within the particular block consistent with the embedding techniques described previously. For example, a block, described earlier herein, may be associated with a type identifier, which may indicate type of content data for the block and/or connect or associate the block with a particular non-word processing application (or other instance of software). The block may also include a set of metadata associated with the type, which may cause certain information to be displayed within the electronic non-word processing application embedded within the block. As a non-limiting example, a block may be of a video type, and may include metadata of a URL, which may cause a video (e.g., a type of electronic non-word processing application) associated with the URL to be embedded within, or otherwise associated with, the block. In some embodiments, when the electronic non-word processing application is embedded with a particular block, access to the electronic non-word processing application may be restricted to entities possessing permission for access to the particular block. Restricting access to entities possessing permission for access to a particular block may include performing a lookup of authorized entities in a repository with respect to the particular block and enabling the authorized entities to view and/or interact with the information contained in the particular block. In response to determining that an entity lacks authorization to access the particular block, the system may omit display of information in the particular block from the unauthorized entity or otherwise prevent the unauthorized entity from interacting with the information in the particular block. For example, the particular block may be associated with (e.g., may include metadata relating to) at least one account identifier, device identifier, network identifier, group identifier, user identifier, or other information delineating at least one criterion, which, when satisfied, causes access to information within the particular block (e.g., an instance of the electronic non-word processing application).

Figure 6:
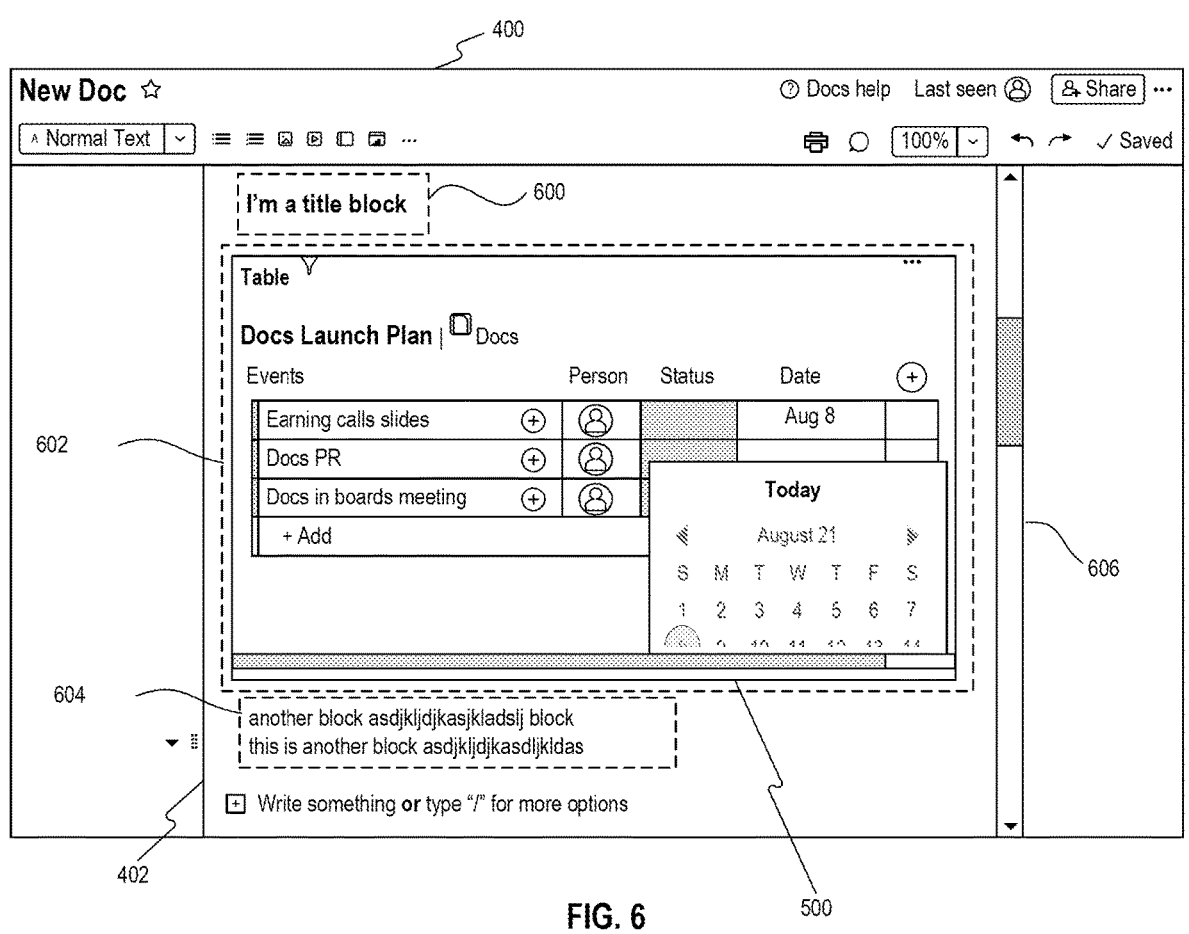
FIG. 6 illustrates an example of an electronic non-word processing application within a word processing document, consistent with some embodiments of the present disclosure.

For example, as shown in FIG. 6, electronic word processing application interface 400 may render one or more blocks within electronic word processing document 602. For example, electronic word processing application interface 400 may render, in a display, a first block 600, a second block 602, and a third block 604. Of course, any number of blocks (including zero blocks) may be rendered. In the example shown, electronic non-word processing application 500 may be rendered within second block 602. Of course, a first block 600, a second block 602, and/or a third block 604, as well as any other rendered blocks, may have an electronic non-word processing application (e.g., electronic non-word processing application 500) or any other type of digital information embedded, consistent with disclosed embodiments.

In some embodiments, embedding an electronic non-word processing application may include displaying a functional instance of the electronic non-word processing application interlineated between text of the electronic word processing document. A functional instance of the electronic non-word processing application may include the electronic non-word processing application itself, a program, routine, command, encapsulation, computer programming method, module, script, and/or any other operation of functionality of the electronic non-word processing application. For example, the electronic non-word processing application embedded in the electronic word processing application may be a widget capable of performing at least a subset of functions of an associated non-word processing application or entity (e.g., non-word processing functionality, discussed above). For example, the embedded electronic non-word processing application may include a data structure holding data content, which may be sourced from an external source using an API call, SDK command, subroutine, and/or any other communication that facilitates populating data content to a data structure associated with the electronic non-word processing application. To further illustrate this example without limitation, a geographical location tracking widget may be embedded in a word processing application, and may track a location of an object or entity (e.g., using data received in response to a communication), and may also be associated with a product or service management application. Additionally or alternatively, displaying the functional instance of the electronic non-word processing application may involve displaying the functional instance of the electronic non-word processing application interlineated between word processing elements other than text (e.g., a page break, a section break, a horizontal line, or other visual element displayed by the electronic word processing application) of the electronic word processing document. A display of a functional instance of the electronic non-word processing application interlineated between text may include rendering a display of an output from the electronic non-word processing application in-line with text in a manner that renders the display of the functional instance as part of the display of text. In this way, the display of the functional instance of the electronic non-word processing application may be rendered in a single line with text, between multiple lines or text, or a combination thereof. For example, at least one processor (e.g., processing circuitry 110) may render a display of information from a data structure (e.g., display a functional instance of the electronic non-word processing application) embedded within a portion of an electronic word processing document, such as between word processing elements (e.g., lines of text). For example, a functional instance of the electronic non-word processing application may be displayed and associated with a default size (e.g., height and width) within the electronic word processing document. Additionally or alternatively, a functional instance of the electronic non-word processing application may be resizable according to a user input (e.g., a click-and-drag action with a mouse). In some embodiments, different default sizes may be associated with different types of functional instances of electronic non-word processing applications. For example, a functional instance corresponding to video playback may have a larger default size than a functional instance corresponding to a dynamic calendar. As another example, if the display of the functional instance of the electronic non-word processing application is embedded in a single line of text, the system may be configured to render a size of that display to match the font size of the surrounding text. If the display of the word processing elements (lines of text) is sized to be size 12 font, the system may render the display of the functional instance of the electronic non-word processing application to be the same height of the size 12 font text. In another example, regardless of the display of the size of the functional instance of the electronic non-word processing application, the display thereof may be embedded in a position in the electronic word processing document such that when a scrolling action occurs, the display may stay in the same position relative to the surrounding text in which the display has been embedded. In this way, the display of the functional instance of the electronic non-word processing application may be displayed in an interlineated manner between text. The electronic non-word processing application data structure may accept an input (e.g., from an input device, from a remote device, from an event listener, or any other electrical and/or mechanical input device), retrieve data, change data, and/or present data (e.g., dynamic data).

For example, and as discussed above with respect to FIG. 6, electronic word processing application interface 400 may render one or more blocks within electronic word processing document 602. In the example shown in FIG. 6, second block 602, which includes a display of an electronic non-word processing application 500 embedded within it, may be rendered interlineated between a title, text block 600 and general text block 604.

In some embodiments, an electronic non-word processing functionality that occurs within the electronic word processing document may include at least one of sending or receiving data over a network. Sending or receiving data over a network may include transmitting, detecting, encoding, decoding, and/or parsing signals associated with information or instructions stored by local or remote repositories.

For example, at least one processor (e.g., processing circuitry) may cause one device (e.g., user device) to transmit data, which may be associated with the electronic non-word processing application, to another device (e.g., a data repository). For example, the transmitted data may include an instruction to add data, to change data, to reformat data, to refresh data, to update data, to remove data, and/or to alter displayed information (e.g., remove displayed data, add data to a displayed visualization, mask displayed data, present a notification, transition between interfaces, or otherwise change an appearance of a displayed visualization). The transmitted data may also include data to be used to carry out an instruction. For example, the transmitted data may include a link (e.g., a hyperlink) to add to a list of links according to a transmitted instruction. As another example, at least one processor (e.g., processing circuitry) may cause one device (e.g., a user device) to receive data, which may be associated with the electronic non-word processing application, from another device (e.g., a data repository). For example, the received data may include information related to an individual, group of persons, project, task, product, service, location, event, object, program, device, software, or other information related to the electronic non-word processing application. In some embodiments, the received data may be stored in a storage medium accessible by using the electronic non-word processing application, such as through an API. For example, a developer of a calendar widget may store data associated with calendar widgets in a storage medium. An entity may access, retrieve, and/or transmit stored data (e.g., stored within a data repository) in response to received data (e.g., data transmitted by the electronic non-word processing application and/or electronic word processing application).

Consistent with some disclosed embodiments, including those disclosed above, a network may include network 210, across which devices may send or receive data, such as user device 220-1 and repository 230-1 in FIG. 2. In some embodiments, a device may transmit or receive data according to instructions executed by a processing device, such as processing circuitry 110 as shown in FIG. 1. In some embodiments, signal transmissions may be sent or received using network device 140, and may travel through bus 105.

The electronic non-word processing application may present (e.g., within a data structure) data sourced (e.g., using a non-word processing application) from a server, database, or other storage medium, which may be associated with an entity (e.g., application, device, network, service, programming language, and/or any other software distinct from the electronic word processing document) that may be unassociated with and/or cannot access a word processing document. For example, the electronic non-word processing application may present data received from an entity (e.g., data repository 230-1) over a network. As an illustrative and non-limiting example, an embedded non-word processing application may be a calendar widget that detects a change to an event time zone and automatically updates a time zone shown within the calendar widget (e.g., non-word processing functionality).

In some embodiments, embedding an electronic non-word processing application may include presenting the electronic non-word processing application in a module window. A module window may include a defined area within a word processing document dedicated to display of a particular data structure and/or content data. For example, a module window may be associated with a width, height, aspect ratio, position indicator, and/or any other information delineating the module window's size or position within an electronic word processing document (e.g., represented in metadata associated with the module window). In some embodiments, a module window (or any other representation of the electronic non-word processing application within an electronic word document) may be positioned and/or sized according to one or more inputs initiated by a user (e.g., dragging an outline of the module window within the electronic word document using a mouse). The module window may be a defined area that is displayed over a word processing document or may be a defined area that is displayed within a word processing document.

Referring to FIGS. 5 and 6 as examples, a module window may exist (e.g., be generated and placed within) electronic word processing document 500. In some embodiments, electronic non-word processing application 500 may be displayed with a module window. A module window may be rendered between blocks, such as block 600 and block 604 in FIG. 6.

In some embodiments, a module window may be linked to a location within an electronic word processing document, such that during scrolling through the electronic word processing document, the module window scrolls with text of the electronic word processing document. Linking to a location within an electronic word processing document may include establishing a position within the electronic word processing document and associating (e.g., through a data structure, such as a table) the position with a module window (or other instance of an electronic non-word processing application), such as by associating an start point, end point, or other position indicator, which may be relative to a size or position within the document itself, relative to a coordinate system, relative to lines of text, relative to blocks, or relative to other information contained in the electronic word processing document. As mentioned above, a module window may have at least one position indicator delineating a position of the module window between word processing elements (e.g., text) within a word processing document. To further detail this example without limitation, a module window may be associated with metadata that delineates a start point and an end point for the module window within an electronic word processing document. Scrolling with text of the electronic word processing document may include moving a displayed version of the electronic word processing document (which may include text and a module window) upward, downward, to the left, to the right, or in any other direction. Scrolling may be initiated and/or terminated by a user input (e.g., scroll wheel action, mouse click on a displayed scroll bar).

In some embodiments, at least one processor may be configured to scroll within an electronic word processing document such that a functional instance of the electronic non-word processing application scrolls together with text within the electronic word processing document. For example, at least one processor may be configured to cause a displayed electronic word processing document, which may contain text and a module window (or other electronic non-word processing application functionality), to move along a display, with both the text and module window moving concurrently and maintain their relative positions to one another, as described in detail above. The electronic word processing application may cause the electronic word processing document to scroll in a direction (e.g., upward, downward, to the left, to the right), to cause different portions of the electronic word processing document to be displayed. In some embodiments, the electronic word processing application may cause the electronic word processing document to scroll in a direction indicated by an input device (e.g., keyboard, mouse, touchscreen, or other electrical and/or mechanical sensing device). In some embodiments, dynamic aspects of the electronic non-word processing application may be updated as the electronic word processing document is scrolled. For example, in situations where a data-tracking widget (e.g., a functional instance of the electronic non-word processing application) is embedded within the electronic word processing application, the widget's data may be updated, such as in response to a data change detected by an event listener, an API call, received new data, and/or any other data input to the electronic non-word processing application. In some embodiments, when data associated with an embedded electronic non-word processing application changes, the information displayed within the embedded electronic non-word processing application may change as well. In other words, a functional instance of an electronic non-word processing application embedded in an electronic word processing application may remain "live" or "dynamic" even as an electronic word document including the functional instance of an electronic non-word processing application is scrolled. Additionally or alternatively, dynamic aspects of the electronic non-word processing application may be updated while the electronic word processing application receives one or more inputs to the electronic word processing document (e.g., a user input of text). In some embodiments, scrolling within the electronic word processing document such that a functional instance of the electronic non-word processing application scrolls together with text within the electronic word processing document may occur in response to a scrolling command. A scrolling command may include an instruction to move a displayed electronic word processing document, non-word processing application displayed functionality, interface, or any other instruction associated with an intent to scroll and display addition information that may not have been displayed previously. A scrolling command may be received via a device such a mouse, keyboard, or other signal input device, and may be detected by the system, which may in turn cause a re-rendering of the display to render additional information in the document. For example, the electronic word processing application may receive a command to scroll through at least a portion of an electronic word document in response to an input received by a mouse (e.g., a scroll wheel motion, a click, a click-and-drag motion) or other input device.

FIG. 5 illustrates an example of an electronic non-word processing application 500 embedded within electronic word processing document 402. Electronic word processing application interface 400 may display both electronic word processing document 402 and electronic non-word processing application 500, while permitting inputs to both. Electronic non-word processing application 500 may include a buttons, slider, field, graphic, or other visualization, which may accept an input, as discussed above. Electronic non-word processing application 500 may perform a non-word processing operation based on the input. FIG. 6 illustrates an exemplary scrollbar region 606, which may include clickable arrows and/or a draggable scrollbar, which may cause electronic word processing document 402 to move in response to inputs at the scrollbar region 606. For example, when the electronic word processing document 402 is scrolled, electronic non-word processing application 500 and text, such as text displayed within blocks 600 and 604, may move synchronously, such that their relative positions with one another are maintained.

Consistent with some disclosed embodiments, at least one processor may be configured to receive at least one of the inputs. An input may involve an input from a user input device (e.g., a mouse, a keyboard, touchpad, VR/AR device, or any other electrical or electromechanical device from which signals may be provided) or non-user input (e.g., a sensor reading, an event listener detection, or other automatic computerized sensing of changed circumstances). In some embodiments, receiving at least one of the inputs may occur while the electronic non-word processing application is displayed within the electronic word processing application. The electronic non-word processing application being displayed within the electronic word processing application may include the electronic non-word processing application being displayed in-line (e.g., within an electronic word processing document), displayed in a hover display, displayed in an overlay, or otherwise presented within an interface associated with a word processing application. For example, a web browser or other form of software may display the electronic non-word processing application within the electronic word processing application while the electronic non-word processing application identifies an input (e.g., a mouse click within the electronic non-word processing application displayed within the electronic word processing application).

Some embodiments may involve at least one processor configured to cause functionality of an electronic non-word processing application to be displayed within an electronic word processing document presented by the electronic word processing application, which may include aspects discussed above with respect to embedding an electronic non-word processing application within an electronic word processing application in a manner enabling non-word processing functionality to occur from within the electronic word processing application. Causing functionality of an electronic non-word processing application to be displayed within an electronic word processing document presented by the electronic word processing application may include displaying a figure, graph, chart, diagram, map, table, icon, image, video, animation, text, or any other visual representation associated with functionality of the electronic non-word processing application. In some embodiments, causing functionality of the electronic non-word processing application to be displayed within the electronic word processing document presented by the electronic word processing application may occur in response to receiving at least one of the inputs, as discussed previously above. For example, the electronic non-word processing application may receive at least one of the inputs, such as a mouse click input commanding removal of a data element (e.g., a graphical depiction, an icon, a permission, a data linkage, an animation, and/or any other piece of information associated with the electronic non-word processing application), and may display removal of the data element within the electronic non-word processing application as it is displayed within the electronic word processing document. In some embodiments, functionality of the electronic non-word processing application to be displayed within the electronic word processing document presented by the electronic word processing application such that the functionality appears the same as if it had been displayed within the electronic non-word processing application separate from the electronic word processing document.

Consistent with some disclosed embodiments, the at least one processor may be further configured to store an electronic word processing document with an electronic non-word processing application embedded therein. Storing the electronic word processing document with the electronic non-word processing application embedded therein may include compiling the electronic non-word processing application and/or merging code, instructions, and/or data associated with the electronic word processing document and the electronic non-word processing application. Storing the electronic word processing document with the electronic non-word processing application embedded therein may also include storing the data and information associated thereof with the electronic word processing document such that the electronic non-word processing application may be accessed by any computing device that views, edits, retrieves, or otherwise accesses the electronic word processing document. Storing may also include storing data and information associated with the electronic non-word processing application in a repository such that it is linked (e.g., through code contained in one or more files, through a single data structure, according to data associations defined within a data structure) to the electronic word processing document such that when a computing device accesses the electronic word processing document, the data and information associated with the electronic non-word processing application may be automatically retrieved as well. For example, storing the electronic word processing document with the electronic non-word processing application embedded therein may involve adding a data structure (e.g., a block, discussed above) to the electronic word processing document. The data structure, or other functional instance of the electronic non-word processing application, may have metadata, content data, or other associated information used to determine its structure, content, size, position, layout, linkage to an external source, and/or any other information that informs the appearance of the embedded instance of the electronic non-word processing application within the electronic word processing document. Data associated with the electronic non-word processing application embedded within the electronic word processing document may be stored within one or more storage media, which may be associated with different entities. For example, a first storage medium may be associated with a developer, host, or other organization associated with the electronic word processing application. As another example, a second storage medium may be associated with a developer, host, or other organization associated with the electronic non-word processing application. In some embodiments, the first storage medium may store metadata or other structural-related data associated with the embedded instance of the electronic non-word processing application. Additionally or alternatively, the second storage medium may store content data associated with the embedded instance of the electronic non-word processing application. Of course, other storage arrangements are possible.

Consistent with some disclosed embodiments, including those disclosed above, the electronic word processing document (e.g., with the electronic non-word processing application embedded therein) and/or other digital information may be stored in a storage medium, such as storage 130 and/or repository 230-1 of FIG. 2. The electronic word processing document (e.g., with the electronic non-word processing application embedded therein) and/or other digital information may be retrieved (e.g., according to instructions executed by processing circuitry 110 of FIG. 1) and transmitted between and/or within devices (e.g., across network 210 or bus 105), such as between user device 220-1 and computing device 100 or between memory 120 and storage 130 within computing device 100.

In some embodiments, storing the electronic word processing document with the electronic non-word processing application embedded therein may thereby enable multiple entities accessing the electronic word processing document to achieve the functionality of the electronic non-word processing application from within the electronic word processing document. Enabling multiple entities accessing the electronic word processing document to achieve the functionality of the electronic non-word processing application from within the electronic word processing document may include permitting multiple entities (e.g., users, accounts, user groups, devices, systems, networks, organizations) to retrieve, view, edit, or otherwise interact with the electronic word processing document having the electronic non-word processing application embedded therein. Enabling multiple entities accessing the electronic word processing document to achieve the functionality of the electronic non-word processing application from within the electronic word processing document may also include displaying an interactable visualization associated with the electronic non-word processing application to the multiple entities and permitting the multiple entities to interact with the electronic non-word processing application (e.g., through the visualization). In some embodiments, interactions with the embedded electronic non-word processing application may cause a change to digital information associated with the electronic non-word processing application, which may in turn cause a change in a visualization displayed by the electronic non-word processing application embedded within the electronic word processing document, which may be displayed simultaneously at multiple devices, user accounts, web browsers, systems, or other entities. For example, a device may retrieve the electronic word processing document and present it (e.g., display, permit interaction with) to multiple other devices, accounts, and/or users (e.g., in response to validating requests to access the electronic word processing document). Presenting the electronic word processing document may include displaying the electronic word processing document, permitting interaction with the electronic word processing document (e.g., according to one or more permissions), determining an appearance of the electronic word processing document, determining one or more interfaces associated with the electronic word processing application (e.g., associated with respective functionalities of the electronic word processing application), determining one or more interfaces associated with the electronic non-word processing application (e.g., associated with respective functionalities of the electronic non-word processing application), or otherwise indicating information associated with the electronic word processing document. Each version of the electronic word processing document presented may include an instance of the electronic non-word processing application embedded in the electronic word processing document. For example, each instance of the embedded non-word processing application may permit one or more inputs, as discussed above, that cause one or more functionalities of the electronic non-word processing application to occur. In some embodiments, each instance of the embedded non-word processing application may be live, interactable, and/or dynamic, such that multiple users may interact with their respective instances simultaneously (e.g., users using user devices). Additionally or alternatively, each instance of the embedded non-word processing application may perform one or more functionalities associated with the electronic non-word processing application (discussed above).

Consistent with some disclosed embodiments, including those disclosed above, a computing device 100 of FIG. 1 may access an electronic word processing document and cause display of electronic word processing document and/or an electronic non-word processing application embedded therein (e.g., according to instructions stored at memory 120 and executed by processing circuitry 110). An electronic word processing document may be stored in memory 120 and/or storage 130. In some embodiments, an electronic word processing document may be accessed by and/or displayed at multiple devices, such as user device 220-1 and user device 220-2 as shown in FIG. 2.

Figure 7:
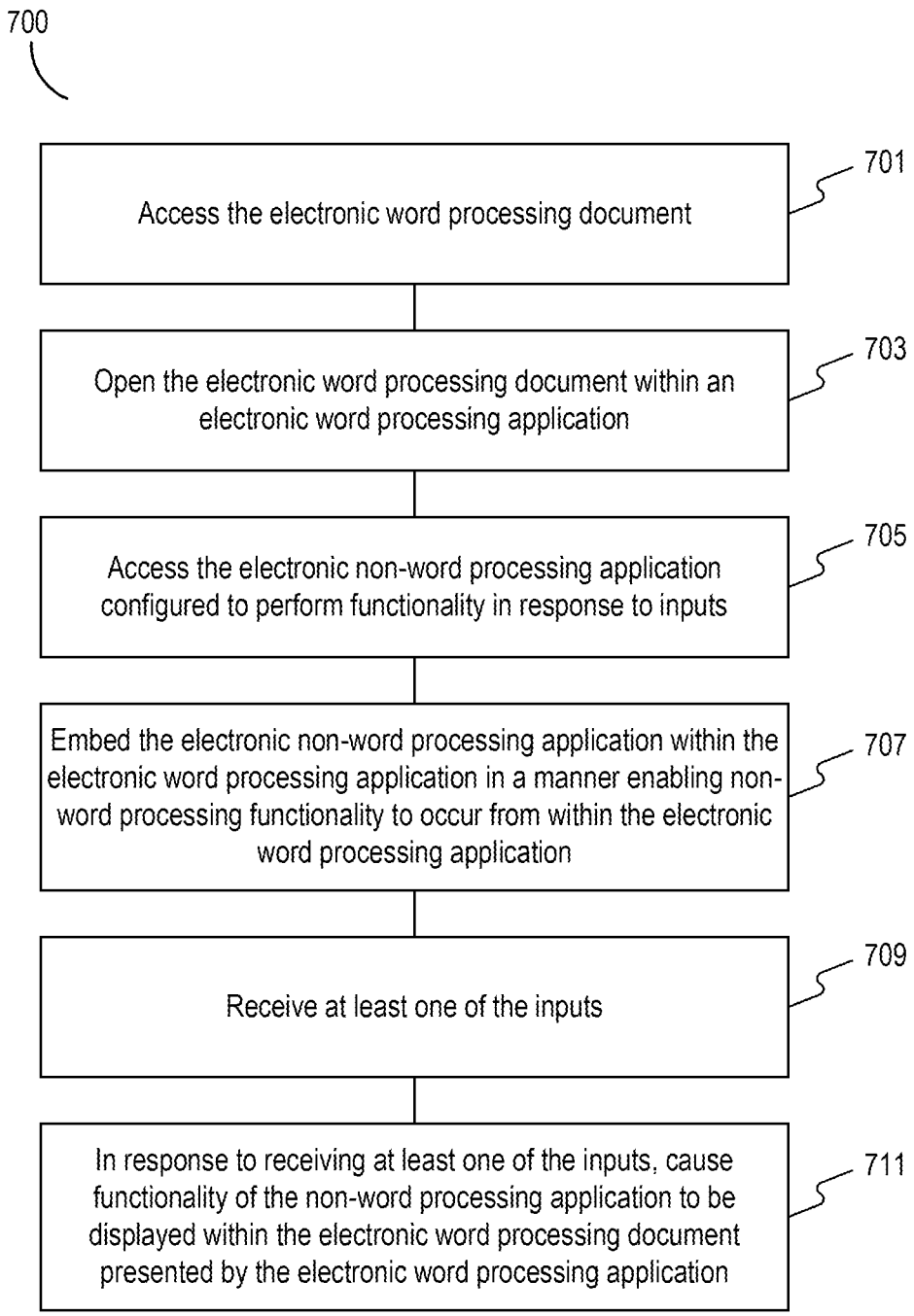
FIG. 7 is a block diagram of an example process for embedding and running an electronic non-word processing application within an electronic word processing document, consistent with some embodiments of the present disclosure.

FIG. 7 illustrates a block diagram of an example process 700 for embedding and running an electronic non-word processing application within an electronic word processing document, consistent with embodiments of the present disclosure. While the block diagram may be described below in connection with certain implementation embodiments presented in other figures, those implementations are provided for illustrative purposes only, and are not intended to serve as a limitation on the block diagram. As examples of the process are described throughout this disclosure, those aspects are not repeated or are simply summarized in connection with FIG. 7. In some embodiments, the process 700 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 4, 5, and/or 6, by way of example. In some embodiments, some aspects of the process 700 may be implemented as software (e.g., program codes or instructions) that are stored in a memory (e.g., the memory portion 122 in FIG. 1) or a non-transitory computer-readable medium. In some embodiments, some aspects of the process 700 may be implemented as hardware (e.g., a specific-purpose circuit). In some embodiments, the process 700 may be implemented as a combination of software and hardware.

FIG. 7 includes process blocks 701 to 701. At block 701, a processing means (e.g., the processing circuitry 110 in FIG. 1) may access an electronic word processing document (e.g., electronic word processing document 402 in FIGS. 4 and 5). At block 703, the processing means may open the electronic word processing document within an electronic word processing application (e.g., causing electronic word processing document 402 to be within electronic word processing application interface 400, which may be run by an electronic word processing application). An electronic word processing document 402 (e.g., electronic word processing document 402) may be associated with various electronic word processing functionalities, which may be interactable through an interface (e.g., electronic word processing application interface 400), such as a print function, a formatting function (e.g., a margin setting, a line spacing setting, a font setting, and/or any other setting configured to determine an appearance aspect of an electronic word processing document), a sharing function, a zoom function, and/or any other operation performable by an electronic word processing application to change data associated with an electronic word processing document.

At block 705, the processing means may access the electronic non-word processing application, which may be configured to perform functionality in response to inputs. As discussed above, the electronic non-word processing application may also include at least one of a communications interface, a graphics presentation editor, a graphing application, or a portal to a third-party application. In some embodiments, access the electronic non-word processing application may include accessing data (e.g., over a network) that may be used to populate at least a portion of an embedded electronic non-word processing application (e.g., electronic non-word processing application 500). In some embodiments, the processing means may select and/or access the electronic non-word processing application in response to an input received at an application identification interface (e.g., option menu 404).

At block 707, the processing means may embed the electronic non-word processing application (e.g., electronic non-word processing application 500) within the electronic word processing application (e.g., as shown within electronic word processing application interface 400) in a manner enabling non-word processing functionality to occur from within the electronic word processing application. Consistent with disclosed embodiments, the processing means may embed the electronic non-word processing application (e.g., electronic non-word processing application 500) within the electronic word processing application by embedding the electronic non-word processing application within an electronic word processing document hosted by the electronic word processing application. In some embodiments, the processing means may embed the electronic non-word processing application the electronic word processing application in response to an input received at an application identification interface (e.g., option menu 404). In some embodiments, the processing means may embed the electronic non-word processing application the electronic word processing application within a particular block (e.g., block 602).

At block 709, the processing means may receive at least one of the inputs, which may be received while the electronic non-word processing application (e.g., electronic non-word processing application 500) is displayed within the electronic word processing application. For example, and consistent with disclosed embodiments, the processing means may receive an input within an electronic non-word processing application (e.g., electronic non-word processing application 500).

At block 711, the processing means may cause functionality of the electronic non-word processing application (e.g., electronic non-word processing application 500) to be displayed within the electronic word processing document (e.g., electronic word processing document 402) presented by the electronic word processing application (e.g., within electronic word processing application interface 400). In some embodiments, the processing means may cause functionality of the electronic non-word processing application to be displayed within the electronic word processing document in response to receiving at least one of the inputs (such as an input received at block 609).

In electronic word processing systems, it may be beneficial to employ automatic changes to electronic word documents based on externally detected occurrences. In many instances, synthesizing information across multiple applications and/or efficiently editing electronic word processing documents can be difficult due to dispersion of data and rigidness of electronic word processing applications. Therefore, there is a need for unconventional innovations for helping to seamlessly change word processing documents based on externally detected occurrences.

Such unconventional approaches may enable computer systems to automatically change an electronic word processing document based on occurrences occurring outside of or within the electronic word processing document. By using automatic logic to edit an electronic word processing document, the electronic word processing document may be edited more rapidly and accurately compared to using tedious manual techniques. In some disclosed embodiments, an electronic word processing application may be communicably linked to electronic non-word processing applications, enabling detection of occurrences with respect to those electronic non-word processing applications and automatic editing of the electronic word processing document; features not achieved in conventional systems. In some disclosed embodiments, occurrences specific to a particular portion of an electronic word processing document may be detected and automatic actions may be taken in response, allowing for pinpoint and rapid tailoring of electronic word processing document editing, occurrence detection, and responsive actions. This may, for example, reduce unnecessary responsive actions related to an electronic word processing document. Automatic edits to an electronic word processing document may not only enhance the content of the electronic word processing document itself, but also related information, such as by automatically updating permission settings, changing a display configuration, transmitting information, or other automatic changes to stored information associated with the electronic word processing document. In some embodiments, using automatic changes to electronic word documents or automatic data transmissions based on detected occurrences may increase the efficiency and operations of workflow management functionality.

Thus, the various embodiments the present disclosure describe at least a technological solution, based on improvement to operations of computer systems and platforms, to the technical challenge of changing an electronic word document based on detected occurrences.

Disclosed embodiments may involve systems, methods, and computer-readable media for automatically altering information within an electronic document based on an externally detected occurrence. The systems and methods described herein may be implemented with the aid of at least one processor or non-transitory computer readable medium, such as a CPU, FPGA, ASIC, and/or any other processing structure(s) or storage medium, as described herein. For ease of discussion, at least one processor executing various operations is described below, with the understanding that aspects of the operations apply equally to methods, systems, devices, and computer-readable media. The discussed operations are not limited to a particular physical and/or electronic instrumentality, but rather may be accomplished using one or more differing instrumentalities.

An electronic document may include a file or other data structure configured to store information and/or present the information in a visual manner. For example, an electronic document may include a file that is configurable or configured to store text, a character, an image, a table, a graph, and/or any other displayable visualization or combination thereof. An electronic document may be configurable to be displayed (e.g., by an electronic word processing application) in a visual form, for example within an interface, which may be displayed, such as at user device 220-1, using a processing device (e.g., processing circuitry 110). In some embodiments, an electronic document may be associated with (e.g., displayable by, configurable by, accessible through) an electronic document application, such as an electronic word processing application. An electronic document application may include a program, command, script, module, widget, instruction set, and/or any code configured to carry out an operation associated with an electronic document.

Automatically altering information within an electronic document may include inserting, removing, changing the content of, re-positioning, re-formatting, or otherwise changing the visual appearance of at least one of: text, a graphic, a background, a link, a data structure, a video, metadata, block, a margin, or any other information displayable by the electronic document. In some embodiments, altering information within the electronic document may be implemented by at least one processor without manual intervention. For example, at least one processor may determine that one or more parameters are satisfied and may automatically cause the altering of information within the electronic document. Additionally or alternatively, automatically altering information within the electronic document may include altering information embedded in the electronic document that influences information displayed within the electronic document. For example, a web-accessible video displayed within an electronic document may have an associated web address embedded in a portion of the electronic document, and when the embedded web address is changed, a different web-accessible video may be displayed.

An externally detected occurrence may include a change in information stored and/or displayed by a source external to the electronic document, such as a status of a user account, a status of a file, an occurrence of a time (e.g., a calendar date, time of day, day of the week, atomic clock time, or any other indication of a point or period in time), a computerized action taken by a device, and/or any other event detectable by a computing device, or any combination thereof. For example, an externally detected occurrence may include a change made by a user and/or device through a third-party application. A third-party application may include a data-hosting service, a project management service, a tracking program, and/or any program, script, command, module, widget, instruction set, graphical interface, or computer functionality defined by, hosted by, maintained by, or otherwise influenced by a party distinct from a party associated with an application associated with the electronic document (e.g., an electronic word processing application). In some embodiments, a third-party application may be communicably connected to an application associated with the electronic document (e.g., an electronic word processing application). For example, one or more APIs may communicably link a third-party application to an application associated with the electronic document. For instance, an API hosted by the third-party application, or the application associated with the electronic document, may transmit an API call to a service hosted by the other application, and may receive data in response (e.g., data indicating a change in information). In some embodiments, an externally detected occurrence may include addition, deletion, or alteration of particular content. For example, an externally detected occurrence may include an addition of a particular word or phrase to a document, such as an addition of the word "urgent," "important," the name of a particular product or service, the name of a particular project, the name of a particular individual, the name of a particular entity, or any other string of text defined as an input condition for an electronic rule. As another example, an externally detected occurrence may include a change made to a particular subset of an electronic word processing document, such as a particular block, a particular group of lines of text, a particular image, a particular page, a particular portion of content between two blocks, a particular embedded application, metadata associated with any thereof, or any amount of content or space within the electronic word document that can be changed. In some embodiments, an externally detected occurrence may be associated with a condition of an electronic rule, discussed further below.

Some embodiments may involve instances where at least one processor is configured to access an electronic word processing document. An electronic word processing document may include a file that is configurable to store text, a character, an image, a table, a graph, and/or any other displayable visualization or combination thereof. An electronic word processing document may be configurable to be displayed (e.g., by an electronic word processing application) in a visual form, for example within an interface, consistent with disclosed embodiments. An electronic word processing document may also include any characteristic of an electronic document, discussed above. Consistent with some disclosed embodiments, the at least one processor may be configured to access an electronic word processing document. Accessing an electronic word processing document may include retrieving the electronic word processing document from a storage medium, such as a local storage medium or a remote storage medium. A local storage medium may be maintained, for example, on a local computing device, on a local network, or on a resource such as a server within or connected to a local network. A remote storage medium may be maintained in the cloud, or at any other location other than a local network. In some embodiments, accessing the electronic word processing document may include retrieving the electronic word processing document from a web browser cache. Additionally or alternatively, accessing the electronic word processing document may include accessing a live data stream of the electronic word processing document from a remote source. In some embodiments, accessing the electronic word processing document may include logging into an account having a permission to access the document. For example, accessing the electronic word processing document may be achieved by detecting an interaction with (e.g., a mouse click, keyboard input, touchscreen touch, or other input in response to which a signal may be produced) an indicator associated with the electronic word processing document, such as an icon or file name, which may cause the system to retrieve (e.g., from a storage medium) a particular electronic word processing document associated with the indication. In some embodiments, accessing the electronic word processing document may include displaying the electronic word processing document. For example, the electronic word processing document may be displayed by an electronic word processing application, such as within an interface rendered by a web browser.

Figure 11:
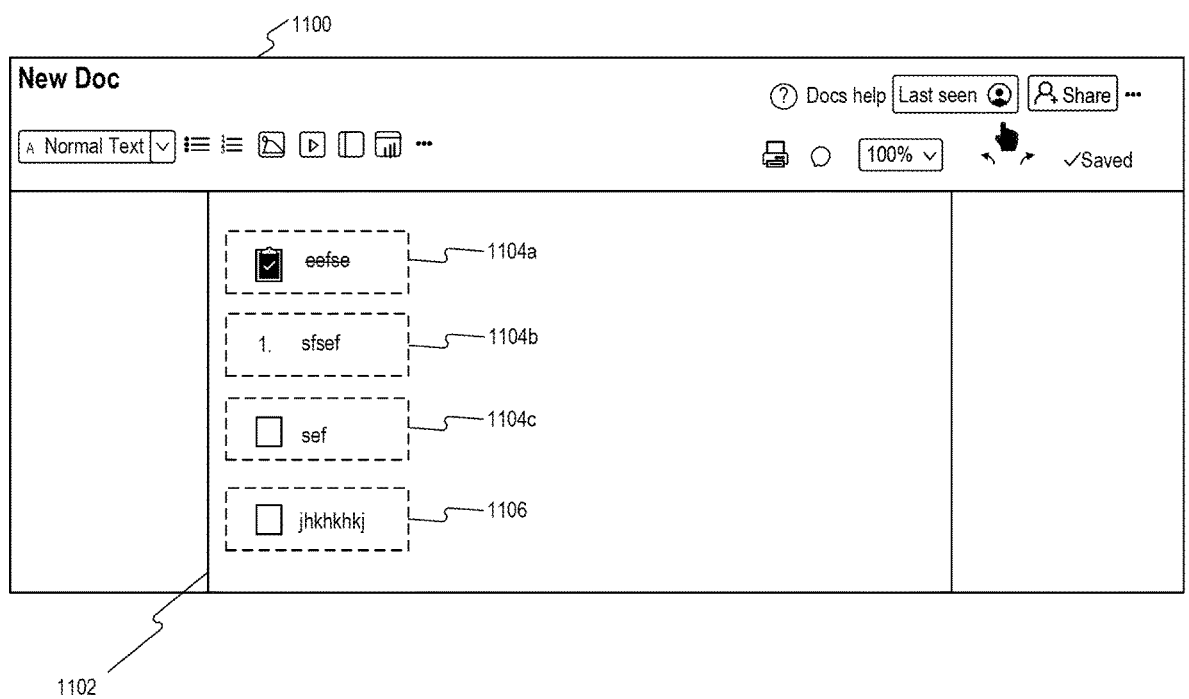
FIG. 11 illustrates an example of an electronic word processing application interface having an electronic word processing document, consistent with some embodiments of the present disclosure.

In FIG. 2, a computing device 220-1 may send a request to access an electronic word processing document that may be stored in, for example, repository 230-1. For example, as shown in FIG. 11, electronic word processing application interface 1100 may render electronic word processing document 1102, which may include text, a character, an image, a table, a graph, a data structure, and/or any other displayable visualization, including an electronic non-word processing application, discussed earlier above. Electronic word processing application interface 1100 may be shown on a display, such as a display communicably connected to processing circuitry 110 (as shown in FIG. 1). Electronic word processing document 1102 may include one or more blocks, discussed further herein.

Consistent with some disclosed embodiments, the at least one processor may be configured to display an interface presenting at least one tool for enabling an author of an electronic word processing document to define an electronic rule triggered by an external network-based occurrence. Displaying an interface may include configuring and causing the visual presentation of one or more interactable visual elements, which may be configured to detect an input (e.g., a user input) and cause the execution of an operation in response, which may be executed by a processing device (e.g., processing circuitry 110). For example, an interface may include a rendering of at least one virtual button, menu, slider, scroll bar, field, search bar, graphic, animation (e.g., a GIF file), and/or any other visual element with which a user may generate input to an application. In some embodiments, an interface may be displayed and re-rendered based on a received input, as will be discussed further herein. For example, an input received on a menu option indicating a template for configuring a particular electronic rule may cause the display of an interface having configuration options for the particular electronic rule. A tool may include a program, a rule, an interactable visual element (e.g., graphic), a script, a module, a widget, an instruction set, and/or any code configured to determine information for an electronic rule, or combination thereof. In some embodiments, a tool may include an interactable visual element, such as a button or a field, which, when interacted with by a user (e.g., through a mouse and/or keyboard input), may cause the execution of a command associated with configuring an electronic rule. The displayed interface as discussed above may present one or more tools as options for selection. An electronic rule may include an if-then statement, a condition, an information source identifier (e.g., URL, IP address, API identifier, client identifier, identifier of a portion of a web page), event listener initialization information, a user identifier, an account identifier, a device identifier, a system identifier, a program, a script, a call, a method (e.g., a Java or other computer programming language method), a conditional instruction, a command, an operation, an input variable, an output variables, an automation associated with an underlying logical rule as described herein, or any other relationship between at least one variable and a computerized action. In some embodiments, an electronic rule may include one or more input conditions, which, if satisfied, cause a particular output. For example, if a processing device detects that a condition for an electronic rule is satisfied, the processing device may perform an operation to change data (e.g., a particular output), such as content data or structure data associated with an electronic word processing document. Additionally or alternatively, an electronic rule may include multiple alternate condition sets, such that if one of the condition sets (which may each include one or more conditions) is satisfied, the electronic rule may produce an output, even if another one of the condition sets is not satisfied (e.g., its conditions are not met). Enabling an author of the electronic word processing document to define an electronic rule may include generating an interactable interface element, detecting an input (e.g., to an interactable interface element), configuring an interface, configuring a set of code (e.g., an electronic rule framework, electronic rule, application), opening a document (e.g., within a web browser), retrieving data (e.g., associated with a user, a user account, a document, a system, a device, an application, an information source), and/or any other operation to facilitate determination or preservation of a parameter for an electronic rule. An author of the electronic word processing document may include an originator of, owner of, editor of, or other entity with access permission to, the electronic word processing document.

An external network-based occurrence may include a change in data associated with an application (e.g., an object tracking application, such as a flight tracking application, a weather source, a sensor reading, or any other data accessible through an application), a change in data associated with a web page, a change in data associated with a website, a change in a file (e.g., a change in file content, a change in file structure, a change in file appearance, a change in file size), a change to a setting (e.g., a permission setting, an account setting, a group setting, a device setting), a set time and/or date being reached (e.g., a due date, a set time prior to a due date), an externally detected occurrence (described above), or any other informational change detectable by a directly or indirectly network-connected device. For example, data displayed by and/or stored by an entity associated with a news web page may change (e.g., text related to a news story may change). As another example, text, graphics, or other information indicating a location of a shipping package may be changed at an application or a web page. As yet an additional example, a label associated with a project or task (e.g., completion of a stage of development, a message sent or received, a transaction, a product or service sent or received, a sale) may be updated within a third-party application. The network-based occurrence may be said to be external when the occurrence occurs independently or separately from the electronic word processing document and/or the information contained within it. In some embodiments, an external network-based occurrence may occur at a database management service (e.g., DBMS 235-1) and/or a repository (e.g., repository 230-1), which may be remote from a device detecting an external network-based occurrence and/or implementing an electronic rule (e.g., user device 220-2).

An electronic rule being triggered by an external network-based occurrence may include executing (e.g., by a processing device) an operation (e.g., a conditional instruction) in response to a condition meeting a threshold. An operation of an electronic rule may include any functionality such as transmitting a communication (e.g., an API call), receiving a communication (e.g., data to use for updating an electronic file), constructing an API call, translating data (e.g., translating data from one API format to another API format, such as according to a data mapping), parsing data, pulling data, re-arranging data, changing data (e.g., data associated with an electronic word processing document), displaying data (e.g., an alert notification), or any other function that can influence data displayable at a device. For example, an electronic rule being triggered by an external network-based occurrence may include receiving a communication from an API indicating that data at a source has changed, and implementing a change to an electronic word processing document in response. In some embodiments, an electronic rule may be triggered, or attempted to be triggered (e.g., determining if electronic rule conditions are met, and triggering the electronic rule if they are) periodically at a defined frequency. Additionally or alternatively, an electronic rule may be triggered based on a request created in response to a user input. For example, a user may select an interactable graphical element associated with an electronic rule, and a processing device may cause an output associated with the electronic rule in response to the user selection. Additionally or alternatively, an electronic rule may be triggered based on an event listener. For example, an event listener may detect a change to data (e.g., an HTML object), which may satisfy a condition for the electronic rule and cause an output to be produced, such as by prompting a processing device (e.g., processing circuitry 110) to execute a conditional instruction.

In some embodiments, an external network-based occurrence may include a change to a locally-stored or a cloud-stored file. A change to a file may include a modification in file content text, file formatting, or file metadata, file type, file location, a combination of locations of the file, one or more users associated with the file, a user permission associated with the file, a file data structure within or otherwise associated with a file, or any other difference between two points in time between attributes of the file, or any combination thereof. For example, at one point or points in time a file may include a first combination of material or information (e.g., text, lines, paragraphs, blocks, embedded non-word processing applications, or any other word processing displayable feature) and at a second point or points in time may include a second combination of material or information, which may differ from the first combination. A locally-stored file may include a file accessible to a device across a LAN, a file stored at a database on a LAN, a file stored in a cache (e.g., a web browser cache), a file stored on a storage device of a device (e.g., a device at which a conditional instruction associated with the file is executed), or any other material stored on a storage device that is accessible to a connected component or a device on a particular machine or through the use of a LAN connection (e.g., without transmission of the file across the internet). A cloud-stored file may include a file stored at a storage medium accessible to other devices across an internet connection, cellular network connection, satellite connection, or any other WAN communication connection. For example, a cloud-stored file may be stored at a storage medium associated with an entity that hosts (e.g., stores, displays, implements) one or more electronic rules, which may be associated with one or more files, documents, accounts, users, groups, networks, projects, or combination thereof. Additionally or alternatively, a cloud-stored file may be stored at a repository located remotely. In some embodiments, cloud-stored files may be indexed according to a file identifier, document identifier, permission identifier, account identifier, user identifier, group identifier, network identifier, project identifier, date of creation, date of last edit, or combination thereof. A file or portion of a file (e.g., one or more blocks), whether locally-stored, cloud-stored, or otherwise, may be encrypted prior to, during, or after storage. A file or portion of a file (e.g., one or more blocks) may also be decrypted to permit access, editing, or other operations, by a particular device, user, account, group, network, or any other entity. Additionally or alternatively, a file or portion of a file (e.g., one or more blocks) may be decrypted to permit implementation of an electronic rule, such as performing an edit to the file, or other conditional instruction, consistent with disclosed embodiments.

In FIG. 1 for example, a locally-stored file may be stored at a memory 120 of user device 220-1. A cloud-stored file may additionally or alternatively be stored at repository 230-1 as shown in FIG. 2.

Aspects of this disclosure may include, in displaying at least one interface, at least one processor being configured to present a logical template for constructing an electronic rule. Presenting a logical template for constructing the electronic rule may include causing the system to visually display a logical sentence structure (e.g., automation) for further configuration of an underlying logical rule, consistent with the description herein. For example, the logical template may include at least one configuration of electronic rule parameters, electronic rule parameter (e.g., a condition, a conditional instruction, output action), electronic rule parameter constraint (e.g., a time window or other condition), relationship between electronic rule parameters, chart, expandable tree (e.g., of electronic rule parameters), interactable (e.g., clickable) user interface area (e.g., a button), menu (e.g., drop-down menu) search bar, field, graph (e.g., graphical depiction of an electronic rule), text, graphic, animation, line, web, cluster, any other visual representation of at least a portion of an electronic rule, or any combination thereof. In some embodiments, a logical template may include a data structure representing and/or configured to implement an electronic rule. Additionally or alternatively, a logical template may include a visual representation of an electronic rule and/or at least one tool for constructing an electronic rule. For example, a logical template may include a layout of at least one condition, at least one computerized action, and at least one relationship between the two. In some embodiments, a logical template may include a button, which, upon receiving an input (e.g., mouse click), may add a field to the logical template (e.g., a field to associate with a particular electronic rule parameter). Additionally or alternatively, a logical template may include a drop-down menu, search bar, other input area, or combination thereof, which may use one or more inputs (e.g., keyboard entries) to search and/or display options for an electronic rule template. For example, based on one or more characters entered to an interface (e.g., a displayed representation of a field), a drop-down menu may display electronic rule parameters (e.g., conditions, conditional instructions) associated with (e.g., including overlapping characters with) the one or more characters. A selection of (e.g., mouse click on) one of the electronic rule parameters may cause the electronic rule parameter to be added to an electronic rule (e.g., adding segment of logic to an electronic rule being constructed). Based on at least one interaction with the logical template, an electronic rule (discussed above) may be constructed. For example, an electronic rule may be constructed to include one or more parameters (e.g., conditions and conditional instructions, discussed further below) corresponding to inputs made within an interface, consistent with disclosed embodiments.

Consistent with some disclosed embodiments, the logical template may include at least one field for designating an external source. A field may include a label, a segment of a data record, a data structure, or any other organizational representation that may indicate the content or value of a variable within a logical template. For example, a field may designate an external source, such as a source of information (e.g., information related to an input condition of an electronic rule) that can potentially trigger execution of a conditional instruction, such as by a processing device (e.g., processing circuitry 110). For instance, a field may hold, represent, or otherwise indicate a website, web page, document, URL, file, user account, application, widget, block, entity, any other displayer of information, or any portion and/or combination thereof. As one example, a field may indicate a web page URL as an external source of information. In another example, an automation may be presented as a template with empty fields for further configuration by a user to link the automation and its underlying logical rule to different sets of information, such as a column of data. Designating the external source may include any selection of information and linking it to the logical template for the underlying logical rule to act on the selection of information. Designating the external source may involve placing a definition of a variable within a field, placing an identifier of a displayer of information within a field, logically connecting an identifier of the external source with a condition of an electronic rule, storing an identifier of an external source (e.g., as part of a logical template and/or electronic rule), or any other action to associate the external source with an electronic rule or portion thereof. For example, a data structure may include a variable definition of a condition for an electronic rule and an external source identifier, and may logically connect the variable definition with the external source identifier. An external source may include a web page, website, file, data storage medium, network, organization, application, or other entity that may display or otherwise provide access to information relevant to an electronic rule (e.g., information associated with at least one condition for an electronic rule).

Figure 8:
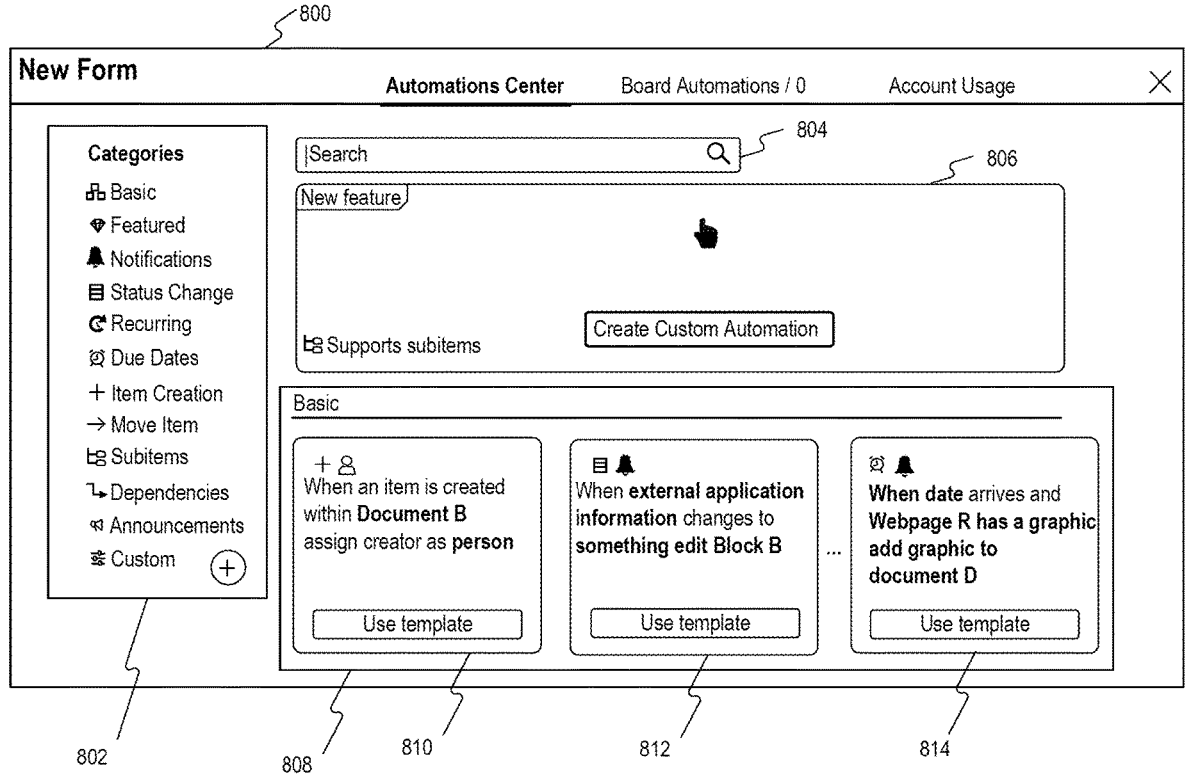
FIG. 8 illustrates an example of an electronic rule template interface, consistent with some embodiments of the present disclosure.
Figure 9:
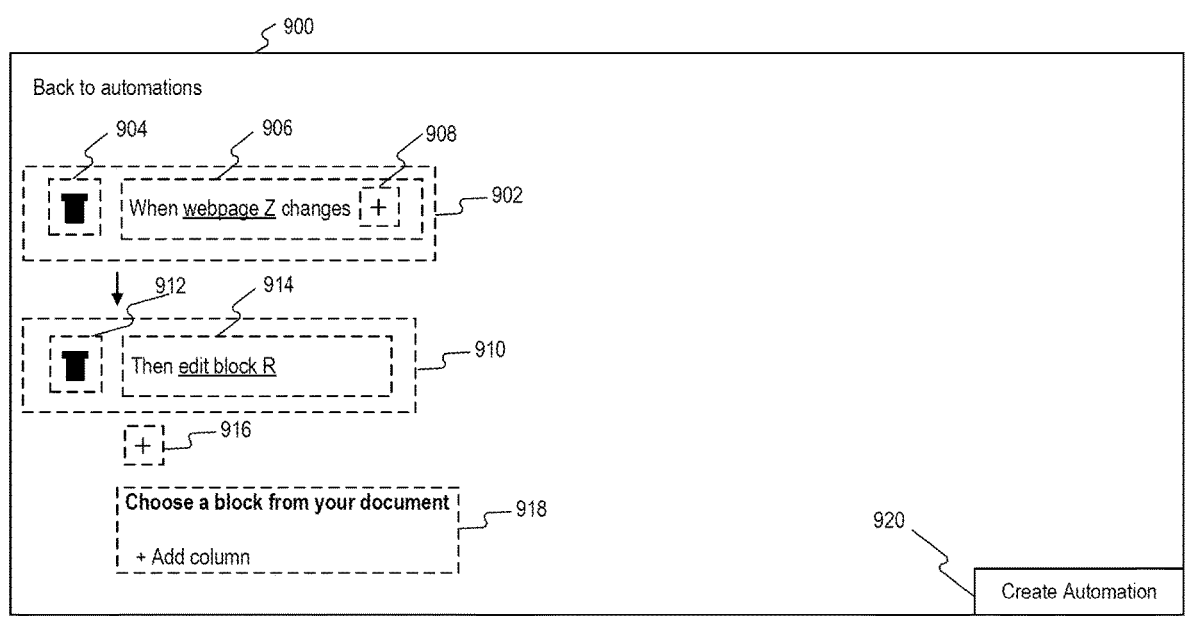
FIG. 9 illustrates an example of an electronic rule construction interface, consistent with some embodiments of the present disclosure.

For example in FIGS. 1 and 2, an external source may be a service (e.g., DBMS 235-1), a storage medium (e.g., repository 230-1), or a device (e.g., computing device 100). FIGS. 8 and 9 illustrate exemplary interfaces associated with defining an electronic rule, which may be shown at a display, such as a display communicably connected to processing circuitry 110 (as shown in FIG. 1). FIG. 8 depicts interface 800, which may include one or more interactable elements to facilitate construction of an electronic rule. For example, interface 800 may include category input area 802, which may indicate one or more categories, which may relate to respective types of electronic rule templates. When category input area 802 is interacted with by a user (e.g., the system detects a mouse click or other gesture from the user), a particular set of templates and/or tools may be displayed, which may be associated with a category selected by the user (e.g., a category indicated within the category input area 802). Interface 800 may also include a search area 804, which may include a search bar or other interactable graphical element that allows a user to search for one or more electronic rule templates or other information related to establishing an electronic rule. For example, a user may type one or more search terms into search area 804, possibly followed by a mouse click or keyboard input, which may initiate the return of search results for an electronic rule template, an electronic rule condition, an electronic rule output, or any other electronic rule parameter. Interface 800 may also include a custom template area 806, which may be associated with displaying one or more tools enabling the creation of an electronic rule. For example, selection of (e.g., a mouse click on) custom template area 806 may cause interface 900 to be displayed. In some embodiments, interface 800 may also include logical template information area 808, which may include graphical elements indicating information about templates, such as template indicator 810 and template indicator 812, up through template indicator 814. In other words, any number of logical templates may be referenced within information area 808 in any form, such logical sentence structures representing underlying logical rules. In some embodiments, when a selection is received at include template information area 808, interface 900 may be displayed, such as with predefined electronic rule parameters (e.g., input conditions, outputs, or any other part of an electronic rule, as discussed above).

FIG. 9 depicts interface 900, which may be configured to receive one or more inputs related to generating, editing, or otherwise configuring an electronic rule. One or more inputs may be received in response to a user interaction with an interactable graphical element. For example, interface 900 may include condition area 902, which may include a deletion initiator 904, a condition input area 906, and condition addition area 908. Of course, multiples of any of these may be displayed within interface 900. Deletion initiator 904 may cause (e.g., upon selection) removal of a condition area 902 and/or deletion of an electronic rule or electronic rule parameter (e.g., associated with condition area 902). Condition input area 906 may be configured to receive one or more inputs establishing one or more parameters related to an electronic rule, consistent with disclosed embodiments. In some embodiments, selection of (e.g., a mouse click on) condition input area 906 may cause the display of a menu of condition options. Condition input area 906 may also display text or other visual indicator of a condition, which may have been selected from a menu. Condition addition area 908 may be configured to receive an input to prompt addition of a parameter (e.g., condition) to an electronic rule. In some embodiments, selection of condition addition area 908 may cause (e.g., upon selection, such as through a mouse click) the generation of another condition area 902 within interface 900.

Interface 900 may also include action area 910, which may include a deletion initiator 912 and an action input area 914. Similar to deletion initiator 904, deletion initiator 912 may cause (e.g., upon selection) removal of an action input area 914 and/or deletion of an electronic rule or electronic rule parameter (e.g., an output action or other operation to be performed when an electronic rule is triggered, consistent with disclosed embodiments). Action input area 914 may be configured to receive one or more inputs establishing one or more parameters (e.g., output actions, such as conditional instructions), related to an electronic rule, consistent with disclosed embodiments. In some embodiments, selection of (e.g., a mouse click on) action input area 914 may cause the display of a menu of action output options. Action input area 914 may also display text or other visual indicator of an output action, which may have been selected from a menu. Interface 900 may also include action addition area 916, may be configured to receive an input to prompt addition of a parameter (e.g., output action, such as a conditional instruction) to an electronic rule, consistent with disclosed embodiments.

Interface 900 may also include block identification area 918, which may be configured to receive an input related to selection of a block (discussed further herein). For example, selection of (e.g., a mouse click on) block identification area 918 may cause the display of a menu, graph, visual depiction of an electronic word processing document, or other visual depiction related to a block. In some embodiments, a user may select a block within a visual depiction, to associate the block with an electronic rule. Additionally or alternatively, a user may select a position within an electronic word processing document to associate with an electronic rule (e.g., a position relative to one or more blocks, relative to lines of text, relative to a page, relative to a paragraph, or positioned with respect to any part of a document). Interface 900 may also include an electronic rule creation initiator 920. In some embodiments, interaction with (e.g., a mouse click on) electronic rule creation initiator 920 may cause generation of an electronic rule, consistent with disclosed embodiments.

In some embodiments, at least one processor may be configured to activate or deactivate an electronic rule. Activating or deactivating an electronic rule may include changing a Boolean value associated with the electronic rule (e.g., a Boolean value that is part of an electronic rule's metadata), changing metadata, changing a rule parameter, or otherwise permitting or preventing an electronic rule from implementing a conditional instruction. For example, an interface may include one or more interactable visual elements, such as visual toggle switches, which may correspond to different electronic rules, and which a user may toggle to activate and/or deactivate the corresponding electronic rule. In response to interaction with an interactable visual element (e.g., toggle switch), the at least one processor may activate or deactivate a corresponding electronic rule.

Figure 10:
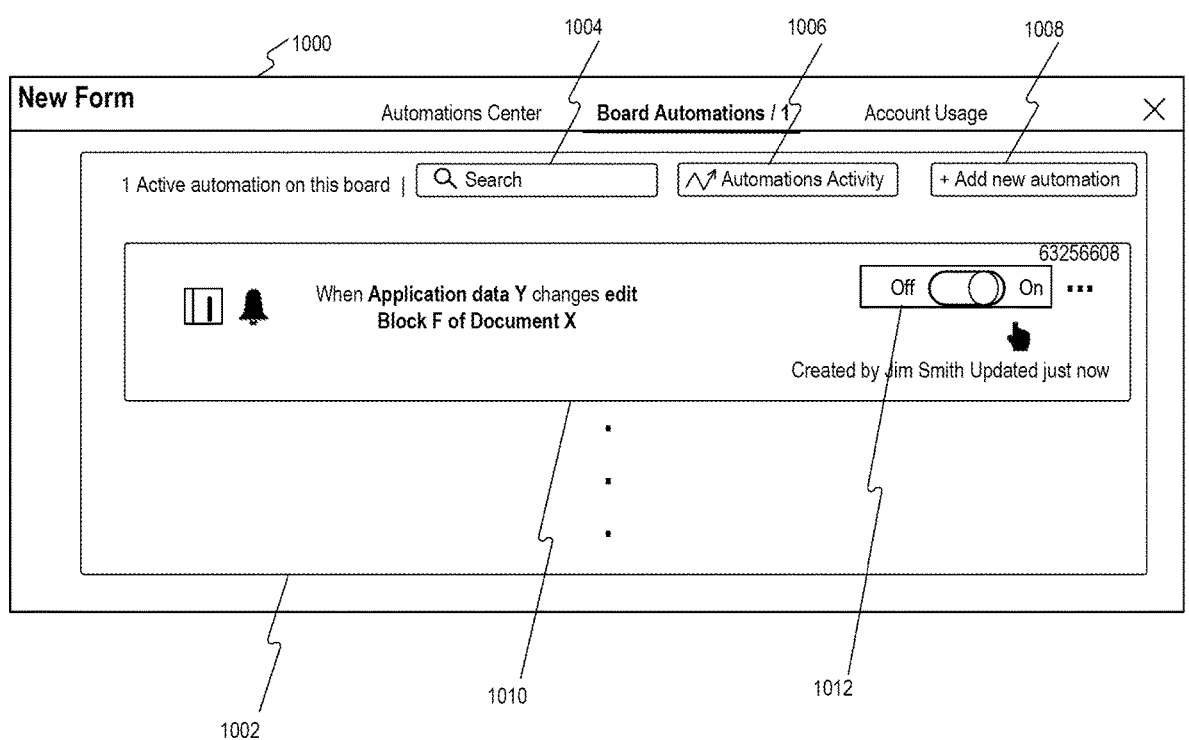
FIG. 10 illustrates an example of an electronic rule configuration list interface, consistent with some embodiments of the present disclosure.

For example, in FIG. 10, interface 1000 includes an electronic rule display area 1002, which may display text, graphics, interactable graphical elements, or other visual indicators of one or more electronic rules, as well as other graphical user elements for manipulating and/or visualizing aspects related to electronic rules. Interface 100 may be shown at a display, such as a display communicably connected to processing circuitry 110 (as shown in FIG. 1). For example, electronic rule display area 1002 may include a search bar 1004, which may permit an input of text, which at least one processor may in turn use to search a database or other storage medium for one or more electronic rules or templates, which may be shown within electronic rule display area 1002. Electronic rule display area 1002 may also include an electronic rule activity tracker button 1006, which, when selected, may cause the display indicators activities taken with respect to one or more electronic rules. For example, the at least one processing device may cause the display of an indicator of at least one of a time of a rule triggering, a circumstance surrounding a rule triggering, one or more conditions that triggered a conditional instruction, a conditional instruction implemented (e.g., a document changed and/or a change made to the document), a change made to an electronic rule, a user associated with a change made to an electronic rule, or any other change made to an electronic rule or made based on implementation of an electronic rule. Electronic rule display area 1002 may also include an electronic rule construction initiation button 1008, which, when selected, may cause the at least one processor to display an interface or other tool for use in constructing an electronic rule, consistent with disclosed embodiments. For example, electronic rule construction initiation button 1008, when selected, may cause the at least one processor to display interface 800 and/or interface 900 as shown in FIGS. 8 and 9. Electronic rule display area 1002 may also include at least one electronic rule visualization area 1010, which may show one or more aspects associated with a particular electronic rule. For example, electronic rule display area 1002 may include at least one instance of text, a graphic, an animation, a graph, a chart, or another visualization displaying information associated with an electronic rule (e.g., an indication of a parameter of an electronic rule). For example, electronic rule display area 1002 may include at least one visual element indicating an electronic rule condition, at least one visual element indicating an output action (e.g., conditional instruction or any other computerized action), and at least one visual element indicating at least one relationship between the two. Electronic rule display area 1002 may also include at least one electronic rule toggle 1012, which may be displayed within an electronic rule visualization area 1010. For example, an electronic rule toggle 1012 may be associated with a corresponding electronic rule, and may, when interacted with (e.g., clicked on using a mouse), cause at least one processor to activate or deactivate the associated electronic rule, consistent with disclosed embodiments.

In some embodiments, the at least one processor may be further configured to access an internet communications interface. An internet communications interface may include any presentation of a visualization of information (as discussed above) for establishing a link to internet based data such as via a wired communication connection between components, a wired communication connection between devices, a wireless communication connection between devices, a network adapter, an API, a router, a switch, an application, a web browser, or any combination thereof. For example, the at least one processor may access a web browser to communicate with a remote device, such as by using a wired (at least in part) connection over the internet.

Aspects of this disclosure may include the at least on processor being further configured to access an internal network communications interface. An internal network communications interface may include any presentation of a visualization of information (as discussed above) for establishing a link to information located in a local repository. An internal network communications interface may involve establishing this linked via at least one of: an internet browser, a network adapter, an application, an API, a LAN connection, a virtual private network (VPN) connection, or any other internet communications interface described above. For example, a user of a device may connect to another device through a LAN connection, such as by using a web browser or application, to connect to a local device (e.g., another device on a common system to the user's device), such as a database or other storage medium. Such a connection may allow multiple devices to quickly access documents, files, and other data, and may also allow for more rapid implementation of a conditional instruction (e.g., caused by the triggered electronic rule). For example, an internal network communications interface may allow for faster conditional editing of an electronic word processing document Consistent with some disclosed embodiments, including those disclosed above, a network may include network 210, across which devices may send or receive data, such as user device 220-1 and repository 230-1 in FIG. 2. In some embodiments, a device may transmit or receive data according to instructions executed by a processing device, such as processing circuitry 110 as shown in FIG. 1. In some embodiments, signal transmissions may be sent or received using network device 140, and may travel through bus 105.

In some embodiments, an external network-based occurrence may include a change to an internet web page, which may be accessible and/or accessed (e.g., by at least one processor) using the internet communications interface. A change to an internet web page may include a change in HTML, source code associated with the internet web page, a change in text, displayed by the internet web page, a change to the web page's URL, a change to metadata associated with the web page, a change in an arrangement of a graphic, chart, video, or other visualization on the web page, a change in audio information associated with the web page, or any other visual or auditory information presented by the web page. Any of these changes may serve as an external network-based occurrence, as discussed previously above, for causing operations to be carried out in an electronic word processing document in response to the change being detected.

Consistent with some disclosed embodiments, the at least one processor may be configured to receive a conditional instruction to edit an electronic word processing document in response to the network-based occurrence. A conditional instruction may include an operation, command, function, call, method, script, module, code, or any computerized action that may be executed based on satisfaction of one or more conditions, as discussed above, as part of underlying action associated with an electronic rule. For example, when an event listener detects an event (e.g., a condition is satisfied), it may cause (e.g., according to the electronic rule) the execution of a conditional instruction. For example, the conditional instruction may be an output that is triggered by the electronic rule when one or more conditions are satisfied. In some embodiments, the at least one processor may receive the conditional instruction with a reference to the electronic rule (e.g., a rule identifier, an account identifier, a document identifier, a user identifier, a group identifier, an application identifier, or combination thereof). Additionally or alternatively, the at least one processor may receive the electronic rule itself, which may include the conditional instruction. Receiving a conditional instruction may include, accessing the conditional instruction (e.g., from local storage) via a stored electronic rule, retrieving the conditional instruction from a remote storage device, running an application (or other computer program), establishing a connection, or any other action to access the conditional instruction. Receiving the conditional instruction may involve retrieving the instruction from the stored electronic rule upon detection of an external network-based occurrence meeting a predefined threshold associated with the electronic rule, discussed in further detail below. In some embodiments, the instruction to edit may include at least one of adding text, modifying text, deleting text, rearranging text, adding a graphic within text; inserting video within text, inserting an image within text, or inserting audio information within text. For example, text within an electronic word processing document may be added, deleted, or rearranged. As another example, a graphic, video, image, or audio information may be inserted between lines of text, blocks, non-word processing applications, or other visual information insertable into an electronic word processing document. Additionally or alternatively, the instruction edit may include moving text, adding a data structure (e.g., a block, table, structure associated with an embedded application), removing a data structure, modifying content data of a data structure, changing metadata associated with a data structure, adding an electronic non-word application, altering an electronic non-word application, deleting an electronic non-word application, changing a permission associated with the electronic word processing document, and/or any other operation to change a visual aspect of an electronic word processing document. For example, a conditional instruction may be an instruction to create a new block at a particular position within the electronic word processing document. As another example, a conditional instruction may be an instruction to add or remove a permission associated with a particular block in the electronic word processing document. In some embodiments, a conditional instruction may be an instruction to edit an electronic word processing document in response an edit made at another electronic word processing document, consistent with disclosed embodiments. For example, a block (or other data structure) may be associated with (e.g., exist within) multiple electronic word processing documents, and an electronic rule may cause a change made at the block in one electronic word processing document to be made at another electronic word processing document.

Aspects of this disclosure may include the at least one processor being further configured to pull data from an internet web page and insert the pulled data into the electronic word processing document. Pulling data may include accessing data, copying data, associating a timestamp with data, crawling data, downloading data, parsing data (e.g., transforming data from one data format to another), condensing data (e.g., through data compression or selective extraction of data elements, such as according to a condition parameter for an electronic rule), or any action that makes data suitable for use in performing a conditional instruction. Data may include text (e.g., displayed on a web page), HTML, text (which may or may not be displayed on a web page), metadata, a graphic, an image, an animation, a video, audio information, a data structure (e.g., a data structure define in HTML code), API code, application code (e.g., a method defined in code), or any other material that may be represented in a digital format. An internet web page may include a document, file, application, dataset (e.g., combination of data, discussed above), any other information displayable within a web browser, or any combination thereof. For example, an internet web page may include a hypertext document, which may be provided by a web site and/or displayable within a web browser. Inserting the data into the electronic word processing document may include adding text, metadata, a graphic, an image, an animation, a video, audio information, a data structure (e.g., a block), any other digital information, or any combination thereof, to the electronic word processing document (e.g., within the content data represented and/or displayed by the electronic word processing document) such that the data is stored or otherwise associated with the electronic word processing document. Inserting the data into the electronic word processing document may include performing an operation represented by an instruction to edit the information contained in the electronic word processing document, consistent with disclosed embodiments. In some embodiments, editing the electronic word processing document may involve adding information to the electronic word processing document that is associated with a condition of an electronic rule. For example, a condition of an electronic rule may be a condition that text information on a web page has changed in some manner (e.g., a flight time) and the changed text information and/or associated information may be added to the word processing document. As another example, a condition of an electronic rule may be a condition that a user account identifier has been added to a list, and the user account identifier may be added to the word processing document (e.g., as in-document text).

In some embodiments, a conditional instruction may be a conditional instruction to carry out an action other than editing an electronic word document. For example, a conditional instruction may be an instruction to create a file, delete a file, change a permission, generate an alert (e.g., a pop-up window interface at a display), transmit an alert, create an email message, send an email message, change computer code (e.g., HTML, code), convert a file to a different file type, or any other instruction to alter data associated with an electronic word processing document or application associated with an electronic word processing document. For example, when an electronic word processing document is edited, an alert may be transmitted to one or more devices. As another example, when a particular block within an electronic word processing document is edited, information associated with the block (e.g., content displayed by the block) may be sent one or more devices (e.g., devices associated with user's having a permission associated with the electronic word processing document.

Consistent with some disclosed embodiments, the at least one processor may be configured to detect an external network-based occurrence. Detecting the external network-based occurrence may include requesting information (continuously or periodically) from a remote data source (e.g., through an API), accessing a web page, accessing a document, parsing data (e.g., information on a web page, HTML text, document text), receiving an alert (e.g., from an event listener), or otherwise determining information associated with a condition of an electronic rule. For example, the at least one processor may parse HTML, text of a web page for keywords or other data pertaining to a condition for an electronic rule. In some embodiments, the at least one process may compare HTML text to a version of the HTML text associated with an earlier point in time, to determine if a change corresponding to an electronic rule condition has occurred. Additionally or alternatively, an event listener may cause transmission of an indication of the external network-based occurrence to the at least one processor. Additionally or alternatively, an event API, which may be configured to communicate with one or more APIs, for example a third-party API and an API associated with editing electronic word processing documents.

Aspects of this disclosure may include the at least one processor being configured to implement a conditional instruction and thereby automatically edit an electronic word processing document. Implementing the conditional instruction may include performing an action indicated by the instruction, as discussed above. For example, when the conditional instruction is an instruction to insert a block into the electronic word processing document, the at least one processor may insert a block into the electronic word processing document. Hence, implementing the conditional instruction may thereby automatically edit the electronic word processing document (e.g., implementing the conditional instruction using an electronic rule, without manual intervention). In some embodiments, implementing the conditional instruction may not include editing the electronic word processing document, or may include at least one operation in addition to editing the electronic word processing document, as discussed above. Consistent with some disclosed embodiments, the at least one processor may be configured to implement the conditional instruction in response to the detection of the external network-based occurrence. For example, an external network-based occurrence (discussed above) may occur, and after the at least one processor detects the external network-based occurrence, it may execute an operation to carry out an output action associated with an electronic rule, as discussed above.

Additionally or alternatively, an electronic word processing document may be divided into a plurality of blocks. As discussed herein, a block may include any organizational unit of information in a digital file, such as a single text character, word, sentence, paragraph, page, graphic, or any combination thereof. In some embodiments, an electronic word processing document may include one or more blocks and/or one or more non-block instances of data, which may include unstructured data (e.g., raw text). One or more of the blocks may have at least one separately adjustable permission setting. A separately adjustable permission setting may be set with respect to one block independent from (e.g., without influencing) a separately adjustable permission setting for another block. For example, a permission setting may include a parameter that may control the ability of a user, user account, device, system, or combination thereof to access a block, view a block, use a function associated with a block, edit a block, delete a block, move a block, re-size a block, influence a block, or perform any other operation relative to a block. Permission settings for a particular block in a document may be independent from the permission settings for other blocks located in the same document. For example, a first block may have restrictive permission settings that enable only the author of the document to edit the first block while a second block may have public permission settings that enable any user to edit the second block. As a result, an author of the document may edit both the first block and the second block while a second user (e.g., not an author of the document) would be prevented from making any edits or alterations to the first block and would only be able to do so for the second block. Blocks may be considered "divided" if they are differentiable in some way. For example, blocks may be differentiated by color, font, data type, presentation type, represented by separate data structures, or may be presented in differing areas of a display and/or in differing windows.

In some embodiments, the electronic rule may be embedded within a particular block. Embedding an electronic rule within a particular block may include editing metadata associated with the particular block, adding the electronic rule or an identifier of the electronic rule to metadata associated with the particular block, storing the electronic rule (e.g., in a same storage medium as an electronic word processing document including the particular block), creating a data mapping between the electronic rule and the particular block, or otherwise associating the electronic rule with the particular block. For example, a block may include one or more fields of metadata, and the electronic rule may be inserted into a field configured to associate the electronic rule with the block, which may designate the particular block (e.g., block content or change in block content) as a condition and/or designate the particular block as a recipient of a conditional instruction (e.g., a conditional instruction to edit the block). In some embodiments, an electronic rule may remain embedded within a block, and the electronic rule will still function (e.g., be configured to execute a conditional instruction) even if the block is moved to a different position within an electronic word processing document. For example, if a block is associated with an electronic rule that causes at least one processor to edit the block in response to new information at a web page, and the block is moved from the beginning of an electronic word processing document to the end of the electronic word processing document, the block can still be edited in response to the new information (e.g., through implementation of the electronic rule, which may be represented by metadata of the block). Moreover, in some embodiments, an electronic rule may remain embedded within a block as an electronic word processing document that includes the block is scrolled (e.g., within a web browser application). In some embodiments, embedding the electronic rule within a particular block may include saving the electronic rule within an electronic word processing document that includes the particular block, but not necessarily within a portion of text displayed with the electronic word processing document is displayed. For example, the electronic rule may be saved to HTML code, metadata, or other information linked to the electronic word processing document that is not displayed when the document is open or is open within a particular viewing mode (e.g., a user mode, as opposed to a HTML editor view).

In some embodiments, information related to an electronic rule may be restricted to entities possessing permission for access to the particular block (e.g., when the electronic rule is embedded within the particular block). Information related to the electronic rule may include a condition (which may be influenced by a user, as discussed above), an instruction (e.g., a conditional instruction), a name of an electronic rule, an identifier of an electronic rule, any parameter of an electronic rule, or any combination thereof, consistent with disclosed embodiments. An entity may include a user, user account, group, device, network, network group, or any other device or individual capable of designation for using and/or configuring an electronic rule. Restricting information related to the electronic rule may include reducing or preventing an ability of an entity to view, edit, remove, or otherwise change an electronic rule or portion thereof (e.g., an electronic rule parameter). For example, if the entity is a subset of a group of users, an application running according to user account permissions associated with a user not within the subset may not be able change an electronic rule parameter associated with the electronic rule. Possessing permission for access to the particular block may include being associated with a permission through a data structure (e.g., a permission table), having a user account associated with a permission value (e.g., a Boolean value that activates or deactivates a permission), or otherwise being associated with a value that enables an action with respect to a block. For example, only a user account (or other entity) possessing permission for access to the particular block may be permitted to view a change made to the block based on an electronic rule, consistent with disclosed embodiments. As another example, only a device (or other entity) possessing permission for access to the particular block may be permitted to add a condition (or other electronic rule parameter) to an electronic rule associated with the particular block. For example, the particular block may be associated with (e.g., may include metadata relating to) at least one account identifier, device identifier, network identifier, group identifier, user identifier, or other information delineating at least one criterion, which, when satisfied, causes access to information within the particular block (e.g., an instance of the electronic non-word processing application). In another exemplary embodiment, in response to determining that an entity lacks authorization to access the particular block, the system may omit display of information in the particular block from the unauthorized entity or otherwise prevent the unauthorized entity from interacting with the information in the particular block.

For example, FIG. 11 shows exemplary interface 1100, which may display an electronic word processing document 1102, which may include one or more blocks, such as block 1104*a*, block 1104*b*, block 1104*c*, and block 1104*d*. Of course, an electronic word processing document may have any number of blocks (including zero blocks). A block, such as block 1104*c*, may be added to electronic word processing document 1102, modified (e.g., have a change in displayed content and/or non-displayed metadata), or removed from electronic word processing document 1102, such as in response to execution of a conditional instruction, consistent with disclosed embodiments. A block, such as block 1104*a*, may be associated with one or more permissions (e.g., a permission allowing a particular user to edit a parameter of an electronic rule associated with the block), as discussed above.

Figure 12:
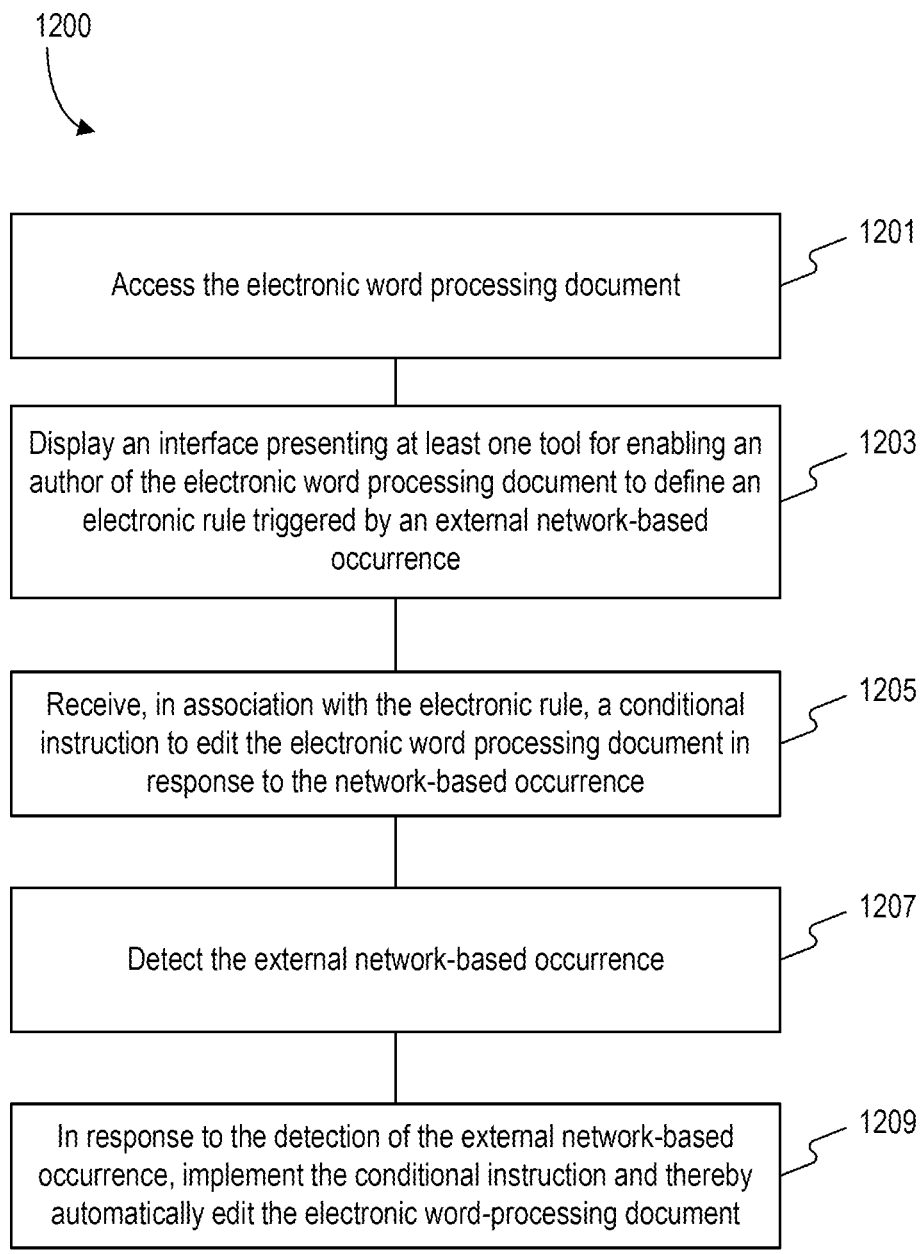
FIG. 12 is a block diagram of an example process for automatically altering information within an electronic document based on an externally detected occurrence, consistent with some embodiments of the present disclosure.

FIG. 12 depicts process 1200, represented by process blocks 1201 to 1209. At block 1201, a processing means (e.g., the processing circuitry 110 in FIG. 1) may access an electronic word processing document (e.g., electronic word processing document 1102 in FIG. 11). At block 1203, the processing means may display an interface presenting at least one tool for enabling an author of the electronic word processing document to define an electronic rule triggered by an external network-based occurrence (e.g., causing the display of interface 900). Consistent with some disclosed embodiments, the interface may include one or more interactable visual elements that may, which interacted with, cause the processing means to configure a portion of an electronic rule.

At block 1205, the processing means may receive, in association with the electronic rule, a conditional instruction to edit the electronic word processing document in response to the network-based occurrence. For example, the processing means may receive a conditional instruction to edit electronic word processing document 1102, such as by adding, removing, or changing a block (or other displayed characteristic of electronic word processing document 1102), such as block 1104*d* (as shown in FIG. 11). At block 1207, the processing means may detect the external network-based occurrence. As discussed above, the processing means may, for example, use an event listener to determine if data at a source (e.g., a web page) has changed. At block 1209, the processing means may, in response to the detection of the external network-based occurrence, implement the conditional instruction and thereby automatically edit the electronic word processing document. For example, the processing means may execute the received conditional instruction by adding text to electronic word processing document 1102 (as in FIG. 11), such as by adding text within a block.

In electronic word processing systems, it may be beneficial to employ automatic insertion of data to electronic word documents based on external sources. In many instances, rapidly synthesizing information into an electronic word processing document, such as from dynamic sources, can be difficult due to dispersion of data and rigidness of electronic word processing applications. Therefore, there is a need for unconventional innovations for helping to seamlessly insert external data into word processing documents based on external sources and applications.

Such unconventional approaches may enable computer systems to insert a dynamic object into an electronic word processing document according to configurable electronic rules linking text to objects. Having configurable rules influencing the insertion of objects into an electronic word processing document may allow for more rapid configuration of dynamic elements within the document. Additionally, by using automatic object insertion to edit an electronic word processing document, the electronic word processing document may be adjusted more rapidly and integrate dynamic information and/or external application-based features into the electronic word processing document not previously achieved. In some disclosed embodiments, an electronic word processing application may be communicably linked to external data sources, enabling automatic updating of dynamic data objects embedded within the electronic word processing document. In this manner, when data at an external source (e.g., reflected at a specific URL) changes, information within an electronic word processing document may also be automatically updating without any need for intervention. In some disclosed embodiments, an object may be associated with a particular position within editable space of an electronic word processing document, such that the object may reflect live information from an external source even while other portions of the electronic word processing document are editable or being edited. Moreover, the embedded object may continue to reflect live information even if the electronic word processing document is scrolled, even in moments where the embedded object is not displayed. Automatic data insertion through objects embedded within an electronic word processing document may enhance the content of the electronic word processing document by presenting external and/or dynamic information through visual displays not previously integrated with electronic word processing documents. In some embodiments, using automatic data insertion through embedded objects may increase the efficiency and operations of workflow management functionality.

Thus, the various embodiments the present disclosure describe at least a technological solution, based on improvement to operations of computer systems and platforms, to the technical challenge of changing an electronic word document based on detected occurrences.

Disclosed embodiments may involve systems, methods, and computer-readable media for embedding within an electronic word processing document, data derived from a source external to the electronic word processing document. The systems and methods described herein may be implemented with the aid of at least one processor or non-transitory computer readable medium, such as a CPU, FPGA, ASIC, and/or any other processing structure(s) or storage medium, as described herein. For ease of discussion, at least one processor executing various operations is described below, with the understanding that aspects of the operations apply equally to methods, systems, devices, and computer-readable media. The discussed operations are not limited to a particular physical and/or electronic instrumentality, but rather may be accomplished using one or more differing instrumentalities.

An electronic word processing document may include a file that may be configurable to store text, a character, an image, an animation, a table, a graph, and/or any other displayable visualization or combination thereof. An electronic word processing document may be configurable to be displayed (e.g., by an electronic word processing application) in a visual form, for example within an interface. For example, an electronic word processing document may be displayed by, manipulable through, or otherwise maintained by an electronic word processing application, consistent with disclosed embodiments. In some embodiments, a displayed form of an electronic word processing document may include a displayed form of information stored by the electronic word processing document, such as text, a table, an image, a graphic, or any other information stored by an electronic word processing document, consistent with disclosed embodiments. In some embodiments, an electronic word processing document may include unstructured data and/or structured data.

Embedding data within an electronic word processing document may include generating a data structure, storing information in a data structure, inserting a data structure into a file or application code, and/or rendering a display of information in the data structure within an interface (e.g., an interface hosted by the electronic non-word processing application) and/or word processing document. In some embodiments, embedding data within an electronic word processing document may include generating, receiving, and/or accessing electronic information, and may include inserting the electronic information into the word processing document. Additionally or alternatively, embedding data within an electronic word processing document may include generating a data structure and placing the data structure within the word processing document. In some embodiments, embedding data within an electronic word processing document may include determining a position within the electronic word processing document at which to embed the data. For example, an electronic word processing application may determine a location within a display of the word processing document selected by a user input (e.g., mouse click), and may determine a corresponding location within an electronic word processing document file or code, such as a location between portions of structured and/or structured data. An electronic word processing application may insert code, such as information from a data structure (e.g., with or without content data) at the determined location. Embedding data within an electronic word processing document may include ignoring and/or removing a user interface element or other data structure associated with (e.g., generated by, maintained by) the electronic word processing application via an interface associated with the electronic word processing application or via a display of an electronic word processing document that may be opened by the electronic word processing application. Additionally or alternatively, embedding data within an electronic word processing document may include configuring an embedded object to carry out its functionality without a user interface element or other data structure associated with the electronic word processing application. In some embodiments, a data structure may be associated with an external source, discussed further below.

A source external to the electronic word processing document may include a web page, a web site, a web portal, a data storage medium, a file, a sensor, or any other structure enabled to display, store, or generate data usable for embedding, independent from the electronic word processing document. For example, a web page may be hosted by a domain that is separate from (e.g., external to) a domain that hosts the electronic word processing document (e.g., through an electronic word processing document application, consistent with disclosed embodiments). As another example, a file stored in a storage medium separate from a storage medium, separate from a storage medium storing the electronic word processing document, may be considered a source external to the electronic word processing document. As yet another example, a sensor, such as a temperature sensor, weather sensor, motion sensor, location sensor, or electronic resource usage sensor, may be considered a source external to the electronic word processing document.

Data derived from a source external to the electronic word processing document may include static data, dynamic data, textual information, visual information, a file, a data structure, content data extracted from a data structure, a calculation result (e.g., a predictive value), a sensor reading, an identifier (e.g., of a user, device, project, system, data source, or network), or any other digital information conveyable by a web page or any other source of information. For example, a web page may convey (e.g., by displaying within a web browser) textual and/or visual information related to a number of physical objects (e.g., products), intangible objects (e.g., stocks, stock prices), or actions (e.g., services, projects). Additionally or alternatively, a web page may display a map identifying one or more locations of a person, group, object, building, or other thing. Additionally or alternatively, a sensor may detect a condition (e.g., temperature, motion, heat, light, sound) and store information indicating the condition to a storage device external to the electronic word processing document. In some embodiments, data derived from a source external to the electronic word processing document may include an application file stored on a storage medium. Of course, other instances of data derivable from a source external to the electronic word processing document are possible.

Consistent with some disclosed embodiments, the at least one processor may be configured to access an electronic word processing document. Accessing the electronic word processing document may include retrieving the electronic word processing document from a storage medium, such as a local storage medium or a remote storage medium. In some embodiments, accessing the electronic word processing document may include retrieving the electronic word processing document from a web browser cache. Additionally or alternatively, accessing the electronic word processing document may include accessing a live data stream of the electronic word processing document from a remote source. In some embodiments, accessing the electronic word processing document may include logging into an account having a permission to access the document. For example, accessing the electronic word processing document may be achieved by interacting with an indication associated with the electronic word processing document, such as an icon or file name, which may cause the system to retrieve (e.g., from a storage medium) a particular electronic word processing document associated with the indication.

In some embodiments, the electronic word processing document may contain text, as well as other types of data, as discussed above. Text may include any combination of one or more alphanumeric characters, non-alphanumeric characters, spaces, carriage return, tab entries, symbols, word processing bullets, or any other displayable character. In some embodiments, an electronic word processing document may contain text that is not displayed when the document is open or is open within a particular viewing mode (e.g., a user mode, as opposed to a HTML, editor view). For example, an electronic word processing document may contain HTML text that influences information displayed by the electronic word processing document (e.g., a format, embedded object, embedded widget, embedded non-word processing application) without displaying the HTML text. In some embodiments, an electronic word processing document many contain one or more blocks, as discussed herein. Containing text or other types of data may include storing text or other data within a file or other data structure, displaying text or other data (e.g., within an interface), encapsulating text or other data, or performing any other operation to digitally preserve text or other data.

Some aspects of this disclosure may include the at least one processor being configured to detect an in-line object inserted into text at a particular location. Detecting an in-line object may include discovering, discerning, or otherwise identifying some change in an in-line object. This may occur, for example, by parsing text displayed by an electronic word processing document, parsing text not displayed by an electronic word processing document (e.g., HTML, code), parsing metadata associated with an electronic word processing document, determining an identifier of an in-line object (e.g., within HTML code), or any operation of locating a data object associated with information external to the electronic word processing document. An in-line object may include any object that may be insertable between alphanumeric characters where characteristics of the object may be structured to be compatible with characteristics of the alphanumeric characters retrieved from a data structure in a repository. An in-line object may include an alphanumeric character string, space, data structure, text, defined area within an electronic word processing document, electronic link, graphic, program, script, module, widget, instruction set, graphical interface, data structure, and/or any other instance of computerized functionality different from word processing. For example, an in-line object may include a combination of letters (uppercase and/or lowercase letters), numerals, symbols, or any other characters, which may be associated with a particular object (e.g., to be inserted) and/or electronic rule (e.g., URL-based rule). An in-line object may include a data structure for which content data may be sourced and inserted into the data structure. Additionally or alternatively, an in-line object may include a graphic representing an individual or other entity. Additionally or alternatively, an in-line object may include a calendar associated with one or more individuals, projects, devices, systems, networks, or other entities.

In some embodiments, an in-line object may be interactable by a user. For example, when the in-line object is a graphic representing an individual, an electronic word processing application may cause a launching of an email or electronic chat messaging interface in response to detecting a user input (e.g., mouse click) on the graphic. In some embodiments, an in-line object may be a dynamic data object, which may source (e.g., through any combination of API calls, a web page crawler, HTML commands) and display external data, which may change. For example, an in-line object may include a stock ticker graphic, which may display "live" information, such as a present or near-present value of a stock price, which may be determined from an external data source, consistent with disclosed embodiments. Additionally or alternatively, an in-line object may include a weather widget, which may determine (e.g., by parsing an external web page) weather predictions for a particular geographical area and display the weather predictions.

In some embodiments, an in-line object may be inserted into text at a particular location. An object being inserted into text at a particular location may include an object being placed at a defined position within an electronic word document (e.g., a position relative to one or more blocks, relative to lines of text, relative to a page, relative to a paragraph, relative to a length of the electronic word processing document, positioned with respect to any part of a document, or any combination thereof), being associated with (e.g., through a data structure, HTML, code, or other data assignment tool) a defined position within an electronic word document. For example, an in-line object may be assigned (e.g., within a data structure, such as HTML source code) one or more position identifiers delimiting a placement for the in-line object within an electronic word processing document. By way of further example, an in-line object may be assigned a first position identifier associated with a first portion of an electronic word processing document (e.g., a block) and a second position identifier associated with a second portion of the electronic word processing document, and may be inserted between the first portion and the second portion.

In some embodiments, an in-line object may be inserted within an electronic word processing document at a particular location in response to one or more inputs. An input may be associated with the in-line object and/or the particular location. For example, an in-line object may be inserted into the text at a particular location in response to receiving a mouse click, keystroke, touch (e.g., on a touchscreen), scroll operation, another electronic input, or any combination thereof. In some embodiments, an in-line object may be inserted based on an input of a particular alphanumeric character string entered within the electronic word processing document, which may be associated with an object and/or electronic rule (e.g., a URL-based rule). By way of example and without limitation, entry of "$YYY" may cause a processing device to insert a stock ticker graphic (e.g., a dynamic in-line object) associated with "YYY" at the location of "$YYY" within the electronic word processing document. As another example, entry of "&99999" may cause a processing device to insert a weather widget (e.g., a dynamic in-line object) associated with a zip code of "99999" at the location of "$99999" within the electronic word processing document. In some embodiments, an in-line object may be inserted based on an input of a particular alphanumeric character string entered within the electronic word processing document followed by an input of a carriage return or tab keystroke. For example, entry of "#ASK" following by entry of a carriage return may cause a processing device to insert a hyperlinked graphic into the electronic word processing document (e.g., which, upon selection, may direct a web browser to a profile page, new email message, social media post, or other interface associated with a person having the initials of ASK). Of course, other keystroke combinations are possible. In some embodiments, an in-line object may be inserted into an electronic word processing document in response to one or more inputs received at an interface. For example, an interface showing a menu of insertable objects may be displayed in response to a mouse click (e.g., a mouse click within an electronic word processing document or associated electronic word processing application), and a processing device may insert an insertable object into an electronic word processing document in response to a selection of one of the insertable objects in the menu. Additionally or alternatively, a processing device may cause the display of a confirmation interface, which may prompt a user to input confirmation of insertion of an in-line object (e.g., in response to input of a particular alphanumeric character string entered within the electronic word processing document followed by an input of a carriage return or tab keystroke). For example, following entry of a string of characters associated with an electronic rule, a processing device may cause the display of a confirmation interface, that prompts a user to enter an input to confirm an insertion of an in-line object associated with the electronic rule, and may insert the in-line object in response to receiving the input. In some embodiments, an in-line object may be manipulable after insertion. For example, an in-line object may be dragged to a different place within an electronic word processing document (e.g., in response to a drag-and-drop input received from a mouse). Additionally or alternatively, an in-line object may be cut, copied, and/or pasted within one or more electronic word processing documents.

Figure 14:
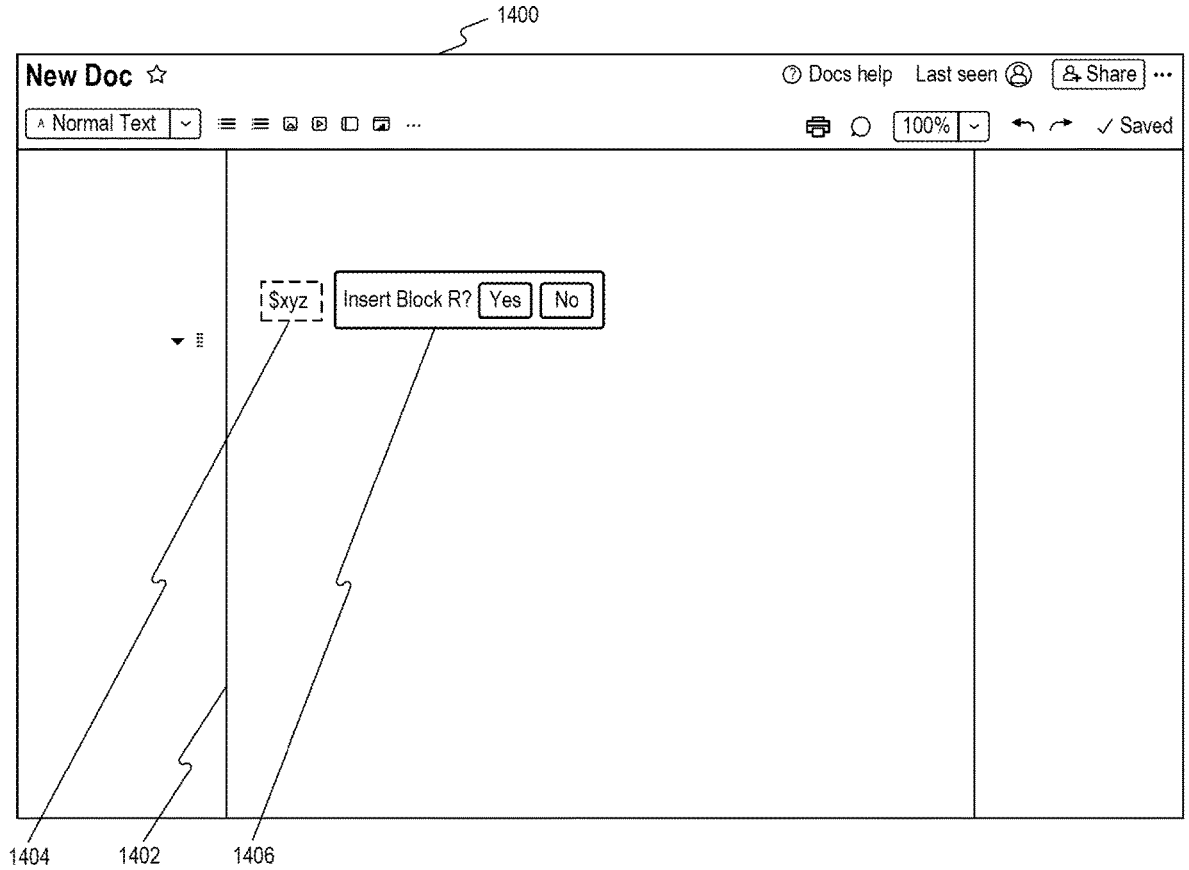
FIG. 14 illustrates an example of an electronic word processing document having text associated with a rule, consistent with some embodiments of the present disclosure.

FIG. 14 illustrates an example of an electronic word processing document having text associated with a rule. In some embodiments, electronic word processing application interface 1400 may display an electronic word processing document 1402, which may contain text, an object, a data structure, unstructured data, an embedded non-word processing application, or any other displayable information, consistent with disclosed embodiments. For example, a text string 1404 may be included in electronic word processing document 1402, such as in response to a processing device detecting keystroke entries corresponding the text string 1404. Of course, electronic word processing document 1402 may include other data patterns or displayed data apart from a text string. In some embodiments, electronic word processing application interface 1400 may display an overlay interface 1406, which may include one or more interactable graphical elements for inserting an in-line object. For example, overlay interface 1406 may include one or more buttons that cause confirming or declining of insertion of an in-line object, which may be associated with text string 1404.

In some embodiments, an in-line object may include a URL-based rule linked to a portion of the text. A URL-based rule may include an if-then statement, a condition, an information source identifier (e.g., URL, IP address, API identifier, client identifier, identifier of a portion of a web page), event listener initialization information, a user identifier, an account identifier, a device identifier, a system identifier, a program, a script, a call, a method (e.g., a Java or other computer programming language method), a conditional instruction, a command, an operation, an input variable, an output variables, an automation associated with an underlying logical rule as described herein, a relationship between at least one variable and a computerized action, or any other parameter associated with at least one variable and a computerized action in association with a resource locating identifier. In some embodiments, an electronic rule may include one or more input conditions, which, if satisfied, cause a particular output. For example, if a processing device detects that a condition for an electronic rule is satisfied, the processing device may perform an operation to change data (e.g., a particular output), such as content data or structure data associated with an electronic word processing document. Additionally or alternatively, an electronic rule may include multiple alternate condition sets, such that if one of the condition sets (which may each include one or more conditions) is satisfied, the electronic rule may produce an output, even if another one of the condition sets is not satisfied (e.g., its conditions are not met). In some embodiments, a URL-based rule may include a URL that directs a processing device to a web page containing information relevant to a condition, a conditional instruction, or other part of an electronic rule. For example, a URL-based rule may include a URL that directs a processing device a web page containing item tracking information, which may be used to update an in-line object, as discussed below.

In some embodiments, a URL-based rule may be linked to a portion of text. Being linked to a portion of text may include an association between a URL-based rule and a portion of, or position within, alphanumerical information an electronic word document (e.g., through a data structure having a text portion identifier and URL-based rule information), metadata associating a URL-based rule and a portion of, or position within, an electronic word document, code (e.g., HTML, code) of a word document being configured to place information associated with a URL-based rule at a certain location within an electronic word document, or any other electronic data representation that is configured to cause information associated with a URL-based rule to display at a location within an electronic word processing document. These aspects of URL-based rules may also apply to non-URL-based rules (e.g., rules establishing a particular storage medium as a source of information, without using a URL to locate the storage medium).

In some embodiments, the URL-based rule may include a frequency-based update component. A frequency-based update component may include at least one time period indication (e.g., a value indicating a number of seconds, minutes, hours, days, weeks, months, and/or years), a day-of-the-week indication (e.g., every Thursday), day-of-the-month indication (e.g., the 25th day of a month, the 20th day of every month), time window (e.g., between the hours of 9:00 a.m. and 11:00 a.m.), number of update occurrences, or any other delimiter of when to execute the URL-based rule, or combination thereof. A URL-based rule may be triggered according to one or more frequency-based update components, as discussed below.

In some embodiments, a URL-based rule may include information about a structure of data at an address associated with the URL in a URL-based rule. A structure of data may include at least one layout, format, table, metadata configuration, sequence of elements (e.g., HTML elements), configuration of regions on a web page (e.g., including positioning, size, contained content, or other parameter influencing a data structure or displayed content), size of a displayed element, color of a displayed element, pointer, API, or any other defined format for displaying and/or storing data, or any combination thereof that may be stored in a repository. As mentioned above, a URL-based rule may include a URL (e.g., a web page address for a source of internet located data), and data may be present at an address associated with the URL in the URL-based rule. Information about a structure of data may include text, an HTML element, any indicator of at least one parameter of a structure of data, or any combination thereof. For example, information about a structure of data may include an identification of a portion of a web page (e.g., a first half of a web page, an upper left quadrant of a web page), an HTML element identifier (e.g., an HTML <body>indicator), a column identifier (e.g., a third column), a row identifier (e.g., a fourth row), a container name, or an identification of a portion of a web site (e.g., a group of web pages, a portion of a site map). Data at an address associated with the URL in the URL-based rule may include at least one text segment (e.g., displayed at a web page), dynamic display element (e.g., indicating a current time, sensor reading, location of a movable object (e.g., an object in transit), stock price, predicted (e.g., machine predicted) value, video, image, file, graphic, chart, graph, or any data derived from a source external to the electronic word processing document stored in a repository identifiable by a locating indicator (e.g., an address), discussed above. For example, a web address may be associated with a URL, which may direct a web browser (or other application) to a web page that displays or otherwise provides access to data.

Consistent with some disclosed embodiments, a URL-based rule may be configured to select an internet located data based on context. Context may include at least one of a time of day, geographical area, history of actions (e.g., times and/or types of data changes, possibly associated with a URL or web page), web page layout, data structure, data structure configuration, data format, file, filetype, data type (e.g., text, an image, a video, a link, an advertisement banner), content (e.g., information conveyed by text, such as an identifier of a person, group, place, or object), entity associated with information (e.g., an ultimate and/or intermediate source of information, such as a URL, company, web page identifier, web site identifier, service identifier, application identifier, type of web browser), user accessing data, device accessing data, electronic rule parameter (e.g., URL-based rule parameter), any other information relevant to a selection of internet located data, or any combination thereof. Selecting the internet located data based on context may include using context to determine relevance (e.g., to an electronic rule, such as a URL-based rule) of data content stored in a repository accessible on the internet, determine relevance (e.g., to an electronic rule) of a source of data, determine relevance (e.g., to an electronic rule) of a time associated with data (e.g., determining a last update time, determining a timestamp, determining if data is stale), determine a portion of a web page displaying data relevant to an electronic rule, determine a portion of web page HTML, source code expressing data relevant to an electronic rule, determine a portion of a web page displaying data within a similarity threshold of an electronic rule parameter, determine a constraint of an electronic rule associated with a web page or URL, or otherwise applying context to direct analysis of internet located data. For example, at least one processor may determine that a portion of text (e.g., on a web page) satisfies a threshold similarity with a set of characters, words, phrases, sentences, or other alphanumeric combinations, and may select the portion of text in response to the determination. As another example, at least one processor may determine that a portion of a web page displaying an image is irrelevant to a URL-based rule having a conditional instruction to source text from a web page, and may exclude the image from possible selection. Additionally or alternatively, at least one processor may determine (e.g., by parsing data according to a URL-based rule) an identifier that satisfies a parameter of a URL-based rule, such as an identifier of an individual (e.g., a name); an identifier of an activity (e.g., a flight number, tracking number, receipt number, project name, service name), a location identifier (zip code, physical address, latitude-longitude coordinates), an identifier of a physical object (e.g., a product identification number, a vehicle identifier), or an identifier of an intangible object (e.g., stock ticker symbol, HTML element).

In some embodiments, at least one processor may be configured to select internet located data through semantic interpretation of the portion of the text and semantic interpretation of information on a web page associated with the URL-based rule. Semantic interpretation of the portion of text (in an electronic word processing document) may include identifying an alphanumeric sequence (e.g., combination of characters, symbols, words, phrases, sentences, or other alphanumeric objects) as relating to a particular entity, determining one or more alphanumeric characters (e.g., of the portion of text) satisfy a similarity threshold associated with an electronic rule (e.g., the URL-based rule), matching one or more alphanumeric characters (e.g., of the portion of text) to a parameter (e.g., of a URL-based rule), applying a natural language processing (NLP) technique to the portion of text (e.g., by, with respect to the portion of text, using a word embedding, applying an NLP machine learning model, applying a word2vec algorithm or model, applying one or more autoencoders, applying a GloVe algorithm or model). For example, at least one processor may be configured to determine that the portion of text in an electronic word processing document includes a sequence of characters that matches an individual's name or initials (or other identifier, such as an email address), or that the portion of text includes a sequence of characters matching a stock ticker symbol. Additionally or alternatively, at least one processor may determine that the portion of text includes a sequence of characters satisfying a similarity threshold (e.g., predetermined number or percentage of characters in common) with a filename or a web page URL. Additionally or alternatively, at least one processor may apply an NLP learning model to determine that the portion of text indicates a user intent to insert an in-line object corresponding to a particular piece of information (e.g., person, object, action, or any other entity that may be associated with data external to a word processing document).

Semantic interpretation of information on a web page associated with a URL-based rule may include applying a natural language processing (NLP) technique to the information on the web page, parsing text on the web page, applying an optical character recognition operation to information displayed by the web page, application, and/or file, comparing the portion of text (or an electronic rule parameter) to a portion of text displayed on (or otherwise accessible through) the web page, determining that, to within a similarity threshold, the portion of text (or an electronic rule parameter) matches a portion of text displayed on (or otherwise accessible through) the web page, or performing any other semantic interpretation operation, as discussed above with respect to semantic interpretation of the portion of text. For example, at least one processor may determine that at least one sequence of alphanumeric characters on a web page match 80% (an exemplary similarity threshold) of the portion of text or an electronic rule parameter (e.g., another sequence of alphanumeric characters). Additionally or alternatively, at least one processor may determine that a threshold number of keywords (e.g., from a URL-based word associated with the portion of text) are displayed on (or otherwise accessible through) the web page. Additionally or alternatively, at least one processor may determine that one or more keywords (e.g., from a URL-based word associated with the portion of text) appear within one or more threshold distances of each other (e.g., within a number of characters, within a number of words, within a number of sentences, within a same sentence, within a same paragraph, within a pixel distance) on the web page.

Consistent with some disclosed embodiments, at least one processor may be further configured to present a user interface for constructing a URL-based rule. Presenting a user interface for constructing a URL-based rule may include launching an application, determining an information display parameter (e.g., a display size, a display resolution, a selected template associated with a set of rule parameters, a user preference), generating visual information to display, displaying at least one interactable visual element, or performing any other operation to cause the display of a user interface capable of receiving at least one input for constructing logical rules and associating them with links to access data stored in a repository. In some embodiments, a URL-based rule (or any other electronic rule) may be associated with a portion of text through an electronic rule, such as a macro, which may be user-defined. For example, a processing device may construct an electronic rule that associates a string of text (or other data pattern) to a particular object.

Figure 13:
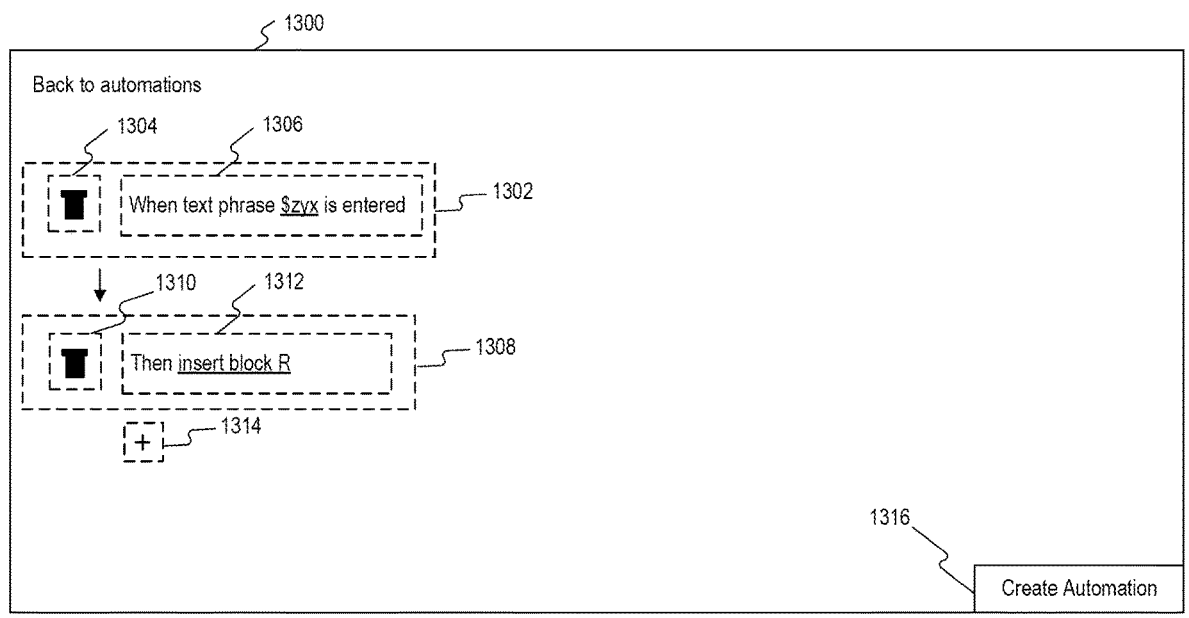
FIG. 13 illustrates an example of an electronic insertion rule construction interface, consistent with some embodiments of the present disclosure.

A processing device may construct an electronic rule in response to one or more inputs received at an interface (e.g., a presented interface). For example, FIG. 13 illustrates an example of an electronic insertion rule construction interface 1300, which may be configured to receive one or more inputs related to generating, editing, or otherwise configuring an electronic rule. One or more inputs may be received in response to a user interaction with an interactable graphical element. For example, interface 1300 may include condition area 1302, which may include a deletion initiator 1304, a condition input area 1306. Of course, multiples of any of these may be displayed within interface 1300. Deletion initiator 1304 may cause (e.g., upon selection) removal of a condition area 1302 and/or deletion of an electronic rule or electronic rule parameter (e.g., associated with condition area 1302). Condition input area 1306 may be configured to receive one or more inputs establishing one or more parameters related to an electronic rule (e.g., a string of text associated with triggering data insertion), consistent with disclosed embodiments. In some embodiments, selection of (e.g., a mouse click on) condition input area 1306 may cause the display of a menu of condition options. Condition input area 1306 may also display text or other visual indicator of a condition, which may have been selected from a menu.

Interface 1300 may also include action area 1308, which may include a deletion initiator 1310 and an action input area 1312. Similar to deletion initiator 1304, deletion initiator 1310 may cause (e.g., upon selection) removal of an action input area 1312 and/or deletion of an electronic rule or electronic rule parameter (e.g., an output action or other operation to be performed when an electronic rule is triggered, consistent with disclosed embodiments). Action input area 1312 may be configured to receive one or more inputs establishing one or more parameters (e.g., a URL, data source, and/or an output action, such as a conditional instruction, which may be an instruction to insert data), related to an electronic rule, consistent with disclosed embodiments. In some embodiments, selection of (e.g., a mouse click on) action input area 1312 may cause the display of a menu of action output options. Action input area 1312 may also display text or other visual indicator of an output action, which may have been selected from a menu. Interface 1300 may also include action addition area 1314, may be configured to receive an input to prompt addition of a parameter (e.g., output action, such as a conditional instruction) to an electronic rule, consistent with disclosed embodiments. Interface 1300 may also include an electronic rule creation initiator 1316. In some embodiments, interaction with (e.g., a mouse click on) electronic rule creation initiator 1316 may cause generation of an electronic rule, consistent with disclosed embodiments.

Consistent with some disclosed embodiments, at least one processor may be configured to execute a URL-based rule to retrieve internet located data corresponding to the URL-based rule. Retrieving internet located data may include accessing data, copying data, associating a timestamp with data, crawling data, downloading data, parsing data (e.g., transforming data from one data format to another), condensing data (e.g., through data compression or selective extraction of data elements, such as according to a condition parameter for an electronic rule), or any action that makes data suitable for use in performing a conditional instruction. Executing the URL-based rule to retrieve internet located data may include carrying out the underling logical rule of the URL-based rule to carry out the action of accessing and transmitting internet located data for at least one processor to further manipulate or store in a repository. Executing the URL-based rule may be carried out manually (e.g., initiated by a user) or may be carried out automatically in response to a condition meeting a threshold, such as a detection of an update or at a defined time interval as discussed above. Internet located data may include at least one of text (e.g., displayed on a web page), HTML, text (which may or may not be displayed on a web page, and which may be contained in HTML source code), metadata, a graphic, an image, an animation, a video, audio information, an email, a data structure (e.g., a data structure define in HTML code), API code, application code (e.g., a method defined in code), any other material that may be represented in a digital format, or any combination thereof retrieved from a repository accessible on the internet. Internet located data may be displayed at and/or accessible from (e.g., through parsing HTML source code) a web page. By way of example and without limitation, internet located data may include information related to, or be otherwise associated with: a physical object (e.g., a product), a service, an item identifier, a device identifier, a location (e.g., a zip code, latitude and longitude coordinates, a physical address), a prediction (e.g., weather data, a predicted arrival time, a predicted completion time), unstructured text, an itinerary, a plan, a map, an entity (e.g., a company name), an individual (e.g., a name, birth date, title). In some embodiments, internet located data may be dynamic (e.g., a stock price, a location of a plane in flight). In some embodiments, internet located data may be associated with a particular source or entity, such as a physical object (e.g., a product), a service, an individual, a group, a company, a website, a URL, a web page, an IP address, or any other tangible or intangible thing that may be associated with a dynamic piece of data. For example, at least one processor may locate internet data using at least one identifier associated with an in-line object. For instance, an in-line object may display and/or be associated with (e.g., through metadata, a data structure, or other underlying data representation, which may be linked to an in-line object) at least one identifier, such as a URL, a physical object identification number, a device identifier, a tracking number, a location identifier (e.g., a zip code, a street address, etc.), an individual identifier, or any other data value that may indicate, at least in part, a source of information for an in-line object, which the at least one processor may use to locate internet data. By way of example, an in-line object may be associated with metadata including a tracking number for a physical object in transit, and the at least one processor may the tracking number to determine a source of information (e.g., a web page) associated with information to insert into the electronic word processing document (e.g., within the in-line object, at a location of the in-line object, or overlaying the in-line object. Additionally or alternatively, internet located data may be stored at a remote storage medium and accessed through a web page, API, an FTP interface, any other data transfer interface, or any combination thereof.

Some aspects of this disclosure may include at least one processor being configured to insert a retrieved internet located data into text at a particular location. Inserting the retrieved internet located data into the text at the particular location may include adding, changing, moving, and/or removing: text, metadata, a graphic, an image, an animation, a video, audio information, a data structure (e.g., a block), any other digital information, or any combination thereof, to the electronic word processing document (e.g., as content data represented and/or displayed by the electronic word processing document) such that the data is stored or otherwise associated with the electronic word processing document. For example, the at least one processor may add the retrieved internet located data between characters of text, between lines of text, between blocks, between data structures, and/or at a relative position within an electronic word processing document. For example, the at least one processor may be configured to replace the alphanumeric character string at a particular location within the at least one electronic word processing document, and then add the internet retrieved data at the particular location, such as by adding an in-line object indicating the internet retrieved data. In some embodiments, inserting the retrieved internet located data may include adding a data structure to the electronic word processing document, with the data structure displaying the retrieved internet located data (e.g., as content data). Additionally or alternatively, inserting the retrieved internet located data may include generating a graphic displaying data retrieved from an external source (e.g., internet located data).

Aspects of this disclose may include at least one processor being configured to replace an alphanumeric character string with retrieved internet located data. Replacing the alphanumeric character string with the retrieved internet located data may include removing the alphanumeric character string from the electronic word processing document, generating a data structure, placing a visual element or other representation of information in an electronic word processing document (e.g., at a place from which the alphanumeric character string was removed, a defined position with an electronic word processing document), overlaying a visual element or other representation of information on top of the alphanumeric character string in the electronic word processing document, or any other operation to change an as-displayed alphanumeric character string. In some embodiments, the at least one processor may be configured to replace the alphanumeric character string with a data structure and then populate the data structure with the retrieved internet location data. For example, the at least one processor may remove the alphanumeric character string at a position in an electronic word processing document, insert a dynamic data graphic at the position, and cause the dynamic data graphic to display the retrieved internet location data. For example, at least one processor may replace a text string of #TRACK-MAP with a data structure configured to a map and/or list of locations, and may populate the map and/or list using location information of a physical object obtained by accessing a remote source (e.g., retrieving information across the internet using a URL).

Figure 15:
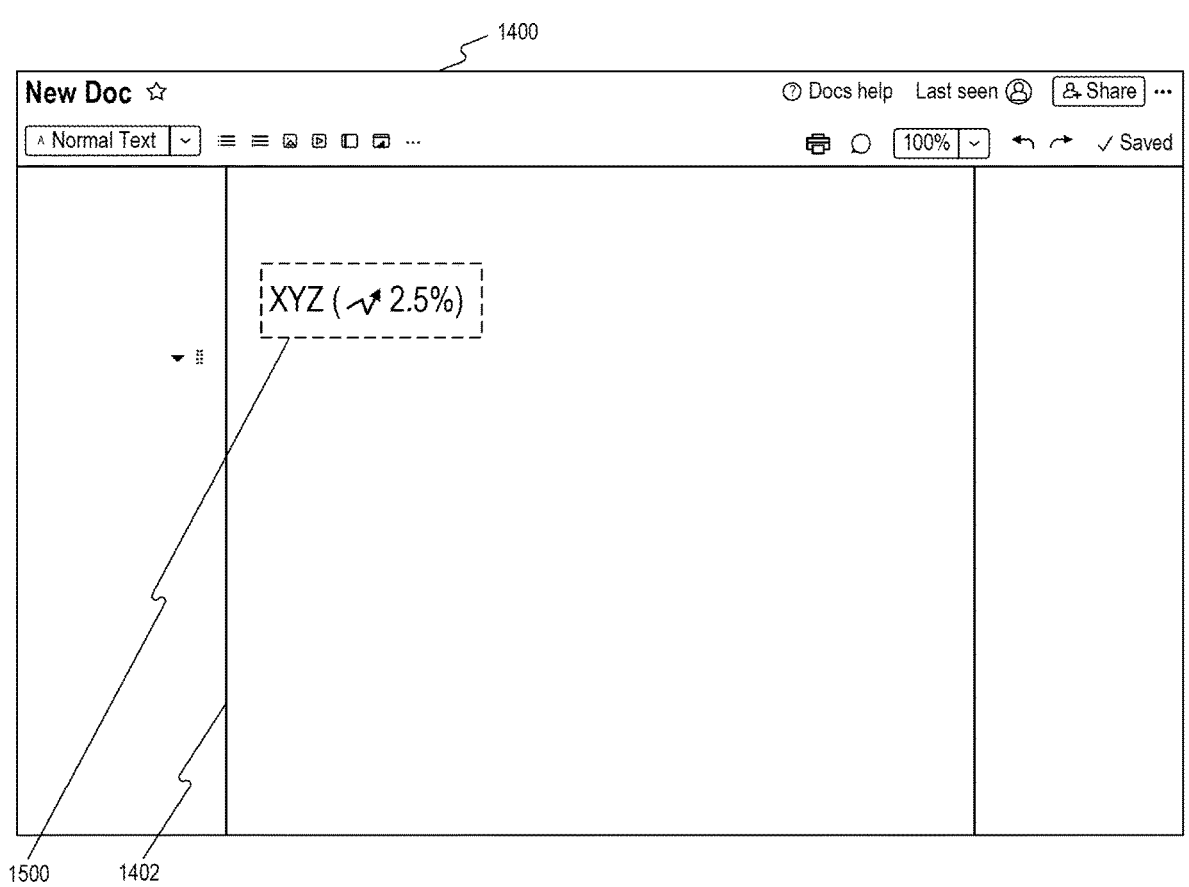
FIG. 15 illustrates an example of an electronic word processing document having an inserted object, consistent with some embodiments of the present disclosure.

As shown in FIG. 15, electronic word processing application interface 1400 may display an electronic word processing document 1402, which may be editable through one or more inputs, consistent with disclosed embodiments. Electronic word processing document 1402 may also include in-line object 1500, which may have been inserted into electronic word processing document 1402 according to one or more inputs (e.g., to electronic insertion rule construction interface 1300). As discussed above, in-line object 1500 may be a dynamic object that changes appearance periodically and/or based on a trigger (e.g., execution of an electronic rule). For example and as shown in FIG. 15, in-line object 1500 may be a stock ticker graphic that may, for instance, update an increase or decrease in a value of a stock in response to data retrieved from an external source. Of course, other dynamic or static in-line objects may also be included in electronic word processing document 1402, as discussed above.

Consistent with some disclosed embodiments, the at least one processing may be configured to trigger a URL-based rule each time an electronic word processing document is launched. Triggering the URL-based rule may include executing (e.g., by a processing device) an operation (e.g., a conditional instruction) in response to a condition meeting a threshold (or a combination of conditions meeting a combination of thresholds). An operation of a URL-based rule may include any functionality such as transmitting a communication (e.g., an API call), receiving a communication (e.g., data to use for updating an electronic file), constructing an API call, translating data (e.g., translating data from one API format to another API format, such as according to a data mapping), parsing data, pulling data, re-arranging data, changing data (e.g., data associated with an in-line object in an electronic word processing document), adding data (e.g., generating and/or inserting into an electronic word processing document any or all of: text, an object, a block, or other visualization of information), displaying data (e.g., as an in-line object), or any other function that can influence data displayable at a device. For example, a URL-based rule may be triggered by a communication from an API indicating that data at a source has changed. Additionally or alternatively, a URL-based rule may be triggered by a processing device parsing data at a source to determine that the data has changed (e.g., using a web page crawler, event listener). In some embodiments, the URL-based rule may be triggered each time the electronic word processing document is launched. Launching the electronic word processing document may include verifying authorization to access the electronic word processing document (e.g., according to a permission) accessing the electronic word processing document, downloading the electronic word processing document, displaying the word processing document (e.g., through an electronic word processing application). In some embodiments, launching the electronic word processing document may cause (e.g., according to an API call, HTML, code, or other instruction) execution of an operation to trigger a URL-based rule. For example, the electronic word processing document may be associated with a set of startup instructions, and the triggering of the URL-based rule may be included in the set of startup instructions.

In some embodiments, a URL-based rule may be triggered when a threshold of the frequency-based update component is met. A threshold of a frequency-based update component may include an amount of time (e.g., measured according to a time period indication, as discussed above), a time period, a point in time, or any other delimiter of when to execute the URL-based rule, as discussed above. For example, a threshold of a frequency-based update component may include a value indicating daily at 9:00 a.m. Triggering a URL-based rule when the threshold of the frequency-based update component is met may include comparing a current time value to a time value indicated by the threshold, determining if a current time value matches or exceeds a threshold time value, and/or any aspect of triggering a URL-based rule discussed above. For example, the at least one processor may determine that a URL-based rule includes a frequency-based update component of daily at 9:00 a.m., may determine that a current time is 8:55 a.m., and may delay triggering the URL-based rule for five minutes. Additionally or alternatively, the at least one processor may trigger a URL-based rule based on a history of triggering the rule (e.g., a record generated and stored when a URL-based rule is triggered). For example, the at least one processor may determine that a URL-based rule includes a frequency-based update component of daily (e.g., a 24-hour time period indicator), may determine that the URL-based was last triggered 25 hours ago, may determine that 25 hours exceeds a threshold of 24 hours, and may, based on the determination of the 24-hour time period being exceeded, trigger the URL-based rule. As another example, the at least one processor may determine that a URL-based rule includes a frequency-based update component of weekly, may determine that the URL-based was last triggered 30 hours ago (e.g., based on an electronic word processing document being launched), may determine that 30 hours does not exceed a threshold of one week, and may, based on the determination of the one-week time period not being met or exceeded, not trigger the URL-based rule. Additionally or alternatively, a URL-based rule may be triggered based on a request created in response to a user input. For example, a user may select an interactable graphical element associated with a URL-based rule, and a processing device may cause an output associated with the URL-based rule in response to the user selection. Additionally or alternatively, a URL-based rule may be triggered based on an event listener. For example, an event listener may detect a change to data (e.g., an HTML, object), which may satisfy a condition for the URL-based rule and cause an output to be produced, such as by prompting a processing device (e.g., processing circuitry 110) to execute a conditional instruction.

Figure 16:
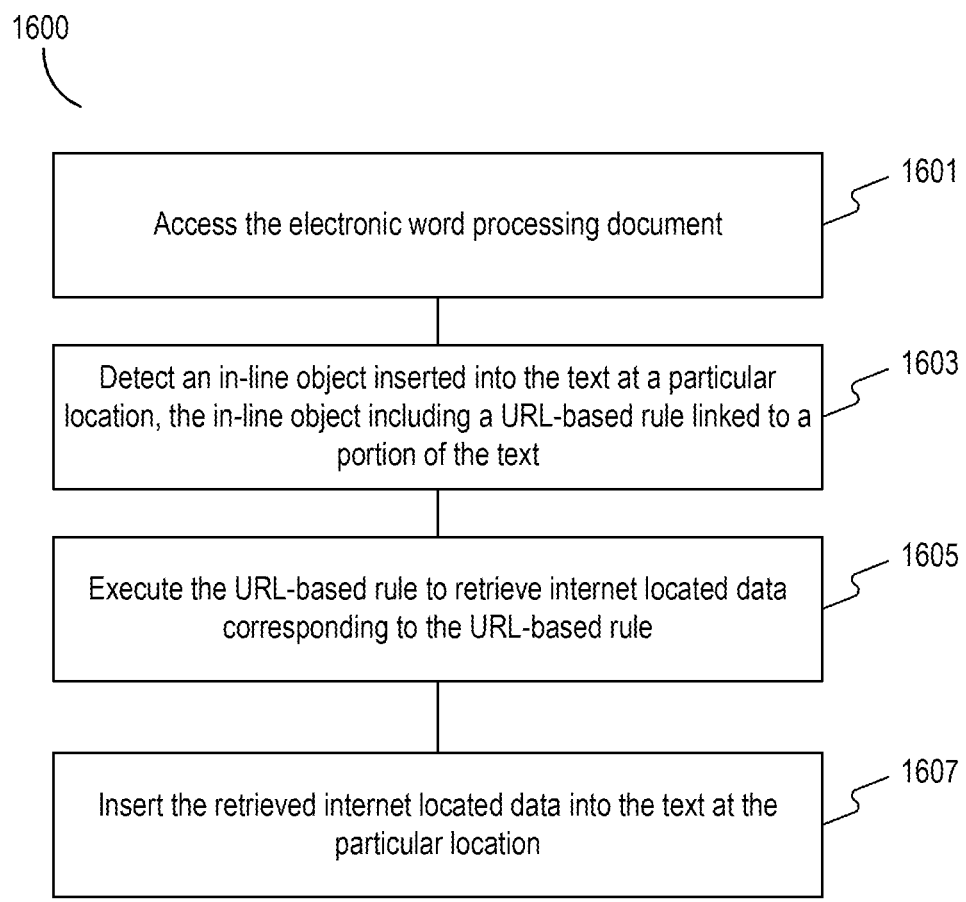
FIG. 16 is a block diagram of an example process for embedding within an electronic word processing document, data derived from a source external to the electronic word processing document, consistent with some embodiments of the present disclosure.

FIG. 16 depicts process 1600, represented by process blocks 1601 to 1607. At block 1601, a processing means (e.g., the processing circuitry 110 in FIG. 1) may access an electronic word processing document (e.g., electronic word processing document 1402 in FIG. 14), consistent with disclosed embodiments. At block 1603, the processing means may detect an in-line object inserted into the text at a particular location (e.g., in-line object 1500 in FIG. 15). Consistent with some disclosed embodiments above, the in-line object may include a URL-based rule linked to a portion of text. In some embodiments, the processing means may detect an in-line object within an electronic word processing document (e.g., electronic word processing document 1402 in FIG. 14), which may be displayed in, or otherwise accessible by, an electronic word processing application interface (e.g., electronic word processing application interface 1400 in FIG. 15).

At block 1605, the processing means may execute the URL-based rule to retrieve internet located data corresponding to the URL-based rule, consistent with disclosed embodiments. For example, user device 220-1 may retrieve internet located data from computing device 100 or DBMS 235-1 in FIG. 2. At block 1607, the processing means may insert the retrieved internet located data into the text at the particular location. For example, the processing means may insert the retrieved internet located data into a portion of an electronic word processing document (e.g., electronic word processing document 1402 in FIG. 14), consistent with disclosed embodiments.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

accessing the electronic word processing document;
    opening the electronic word processing document within an electronic word processing application;

accessing the electronic non-word processing application,
the electronic non-word processing application including at least one of a communications interface, a graphics presentation editor, a graphing application, or a portal to a third-party application;
wherein the electronic non-word processing application is configured to perform functionality in response to inputs;
embedding the electronic non-word processing application within the electronic word processing application in a manner enabling non-word processing functionality to occur from within the electronic word processing application;
while the electronic non-word processing application is displayed within the electronic word processing application, receiving at least one of the inputs;
in response to receiving at least one of the inputs, causing functionality of the non-word processing application to be displayed within the electronic word processing document presented by the electronic word processing application;
storing the electronic word processing document with the electronic non-word processing application embedded therein to thereby enable multiple entities accessing the electronic word processing document to achieve the functionality of the electronic non-word processing application from within the electronic word processing document;
wherein the electronic non-word processing functionality that occurs within the electronic word processing document includes at least one of sending or receiving data over a network;
wherein embedding the electronic non-word processing application includes displaying a functional instance of the electronic non-word processing application interlineated between text of the electronic word processing document;
in response to a scrolling command, scrolling within the electronic word processing document such that a functional instance of the electronic non-word processing application scrolls together with text within the electronic word processing document;
wherein embedding the electronic non-word processing application includes presenting the electronic non-word processing application in a module window;
wherein the module window is linked to a location within the electronic word processing document, such that during scrolling through the electronic word processing document, the module window scrolls with text of the electronic word processing document;
wherein the electronic word processing document is divided into a plurality of blocks, each block having at least one separately adjustable permission setting;
wherein, when the electronic non-word processing application is embedded within a particular block, access to the electronic non-word processing application is restricted to entities possessing permission for access to the particular block;
accessing an electronic word processing document;
displaying an interface presenting at least one tool for enabling an author of the electronic word processing document to define an electronic rule triggered by an external network-based occurrence;
receiving, in association with the electronic rule, a conditional instruction to edit the electronic word processing document in response to the external network-based occurrence;
detecting the external network-based occurrence;
in response to the detection of the external network-based occurrence, implementing the conditional instruction and thereby automatically edit the electronic word processing document;
accessing an internet communications interface;
wherein the external network-based occurrence includes a change to an internet web page;
pulling data from the internet web page and inserting the pulled data into the electronic word processing document;
wherein in displaying the at least one interface, presenting a logical template for constructing the electronic rule, the logical template including at least one field for designating the external source;
wherein the instruction to edit includes at least one of adding text, modifying text, deleting text, rearranging text, adding a graphic within text, inserting video within text, inserting an image within text, or inserting audio information within text;
accessing an internal network communications interface;
wherein the external network-based occurrence includes a change to a locally-stored or a cloud-stored file;
wherein the electronic word processing document is divided into a plurality of blocks, each block having at least one separately adjustable permission setting;
wherein, when the electronic rule is embedded within a particular block, information related to the electronic rule is restricted to entities possessing permission for access to the particular block;
accessing the electronic word processing document;
wherein the electronic word processing document contains text;
detecting an in-line object inserted into the text at a particular location, the in-line object including a URL-based rule linked to a portion of the text;
executing the URL-based rule to retrieve internet located data corresponding to the URL-based rule;
inserting the retrieved internet located data into the text at the particular location;
triggering the URL-based rule each time the electronic word processing document is launched;
wherein the URL-based rule includes a frequency-based update component;
wherein the URL-based rule is triggered when a threshold of the frequency-based update component is met;
wherein the in-line object includes an alphanumeric character string;
replacing the alphanumeric character string with the retrieved internet located data;
wherein the URL-based rule includes information about a structure of data at an address associated with a URL in the URL-based rule;
presenting a user interface for constructing the URL-based rule; and
wherein the URL-based rule is configured to select the internet located data based on context, through semantic interpretation of the portion of the text and semantic interpretation of information on a web page associated with the URL-based rule.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for embedding within an electronic word processing document, data derived from a source external to the electronic word processing document, the system comprising:
at least one processor configured to:
access the electronic word processing document, wherein the electronic word processing document contains text;
detect an in-line object inserted into the text at a particular location, the in-line object including a URL-based rule linked to a portion of the text;
execute the URL-based rule to retrieve internet located data corresponding to the URL-based rule; and
insert the retrieved internet located data into the text at the particular location.

2. The system of claim 1, wherein the at least one processor is further configured to trigger the URL-based rule each time the electronic word processing document is launched.

3. The system of claim 1, wherein the URL-based rule includes a frequency-based update component, and wherein the URL-based rule is triggered when a threshold of the frequency-based update component is met.

4. The system of claim 1, wherein the in-line object includes an alphanumeric character string and wherein the at least one processor is further configured to replace the alphanumeric character string with the retrieved internet located data.

5. The system of claim 1, wherein the URL-based rule includes information about a structure of data at an address associated with a URL in the URL-based rule.

6. The system of claim 1, wherein the at least one processor is further configured to present a user interface for constructing the URL-based rule.

7. The system of claim 1, wherein the in-line object is configured to source the internet located data using at least one of an Application Programming Interface (API) call, a web page crawler, or a HyperText Markup Language (HTML) command.

8. The system of claim 6, wherein the at least one processor is further configured to present the user interface for constructing the URL-based rule in response to an input within the electronic word processing document.

9. The system of claim 1, wherein the URL-based rule is configured to select the internet located data based on context, through semantic interpretation of the portion of the text and semantic interpretation of information on a web page associated with the URL-based rule.

10. The system of claim 1, wherein the retrieved internet located data is inserted into the text at the particular location while a part of the electronic word processing document not including the particular location is editable.

11. The system of claim 1, wherein the internet located data includes dynamic data.

12. A non-transitory computer readable medium containing instructions that when executed by at least one processor, perform operations for embedding within an electronic word processing document, data derived from a source external to the electronic word processing document, the operations comprising:
   accessing the electronic word processing document, wherein the electronic word processing document contains text;
   detecting an in-line object inserted into the text at a particular location, the in-line object including a URL-based rule linked to a portion of the text;
   executing the URL-based rule to retrieve internet located data corresponding to the URL-based rule; and
   inserting the retrieved internet located data into the text at the particular location.

13. The non-transitory computer readable medium of claim 12, wherein the operations further include triggering the URL-based rule each time the electronic word processing document is launched.

14. The non-transitory computer readable medium of claim 12, wherein the URL-based rule includes a frequency-based update component, and wherein the URL-based rule is triggered when a threshold of the frequency-based update component is met.

15. The non-transitory computer readable medium of claim 12, wherein the in-line object includes an alphanumeric character string and wherein the operations include replacing the alphanumeric character string with the retrieved internet located data.

16. The non-transitory computer readable medium of claim 12, wherein the URL-based rule includes information about a structure of data at an address associated with a URL in the URL-based rule.

17. The non-transitory computer readable medium of claim 12, wherein the operations further include presenting a user interface for constructing the URL-based rule.

18. The non-transitory computer readable medium of claim 12, wherein the URL-based rule is configured to select the internet located data based on context, through semantic interpretation of the portion of the text and semantic interpretation of information on a web page associated with the URL-based rule.

19. A method for embedding within an electronic word processing document, data derived from a source external to the electronic word processing document, the method comprising:
   accessing the electronic word processing document, wherein the electronic word processing document contains text;
   detecting an in-line object inserted into the text at a particular location, the in-line object including a URL-based rule linked to a portion of the text;
   executing the URL-based rule to retrieve internet located data corresponding to the URL-based rule; and
   inserting the retrieved internet located data into the text at the particular location.

20. The method of claim 19, further comprising triggering the URL-based rule each time the electronic word processing document is launched.

21. The method of claim 19, wherein the URL-based rule includes a frequency-based update component, and wherein the URL-based rule is triggered when a threshold of the frequency-based update component is met.

22. The method of claim 19, wherein the in-line object includes an alphanumeric character string and wherein the method further comprises replacing the alphanumeric character string with the retrieved internet located data.

23. The method of claim 19, wherein the URL-based rule includes information about a structure of data at an address associated with a URL in the URL-based rule.

24. The method of claim 19, wherein the URL-based rule is configured to select the internet located data based on context, through semantic interpretation of the portion of the text and semantic interpretation of information on a web page associated with the URL-based rule.

\* \* \* \* \*